US006301693B1

(12) United States Patent
Naylor et al.

(10) Patent No.: US 6,301,693 B1
(45) Date of Patent: *Oct. 9, 2001

(54) NON-LINEAR OPTIMIZATION SYSTEM AND METHOD FOR WIRE LENGTH AND DELAY OPTIMIZATION FOR AN AUTOMATIC ELECTRIC CIRCUIT PLACER

(75) Inventors: William C. Naylor, San Jose; Ross Donelly, Sunnyvale; Lu Sha, San Jose, all of CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/216,632

(22) Filed: Dec. 16, 1998

(51) Int. Cl.$^7$ ........................................... G06F 17/50
(52) U.S. Cl. ................................... 716/10; 716/5
(58) Field of Search .................... 716/1, 2, 4, 5, 716/6, 8, 9, 10, 18, 11; 703/2

(56) References Cited

U.S. PATENT DOCUMENTS

| | | | |
|---|---|---|---|
| 3,622,762 | * 11/1971 | Dyer et al. ............................ | 235/150 |
| 5,519,627 | 5/1996 | Mahmood et al. ................... | 364/488 |
| 5,838,583 | 11/1998 | Varadarajan et al. ................ | 364/491 |
| 5,847,969 | 12/1998 | Miller et al. ......................... | 364/491 |
| 5,892,688 | 4/1999 | Scepanovic et al. ................. | 364/491 |

OTHER PUBLICATIONS

Rajan et al., "Conjugate Gradient Method for Adaptive Nonlinear Filtering," IEEE, pp 1327–1330, 1995.*
W. Press et al.; "Numerical Recipes in C"; The Art of Scientific Computing; Ch. 7, *Random Numbers*; Cambridge University press, Cambridge, New York, no date, no page #.

S. Kirkpatrick, et al.; "Optimization By Simulated Annealing"; May 13, 1983, vol. 220, #4598; IBM Thomas J. Watson Research Center, Yorktown Heights, New York, 70 page #.

(List continued on next page.)

*Primary Examiner*—Matthew Smith
*Assistant Examiner*—Leigh Marie Garbowski
(74) *Attorney, Agent, or Firm*—Wagner, Murabito&Hao LLP

(57) ABSTRACT

A computer implemented process for automatic creation of integrated circuit (IC) geometry using a computer. The present invention includes a general unconstrained non-linear optimization method to generate coarse placement of cells on a 2-dimensional silicon chip or circuit board. In one embodiment, the coarse placer can also be used to automatically size cells, insert and size buffers, and aid in timing driven structuring of the placed circuit. The coarse placer is used in conjunction with other automatic design tools such as a detailed placer and an automatic wire router. A master objective function (MOF) is defined which evaluates a particular cell placement. A non-linear optimization process finds an assignment of values to the function variables which minimizes the MOF. The MOF is a weighted sum of functions which evaluate various metrics. An important metric for consideration is the density metric, which measures how well spread out the cells are in the placement. Other component functions are wire-length, which measures total linear wire-length, delay, which measures circuit timing, and power, which measures circuit power consumption. The barrier metric penalizes placements with cells outside the allowed placement region. A conjugate-gradient process utilizes both the MOF and its gradient to determine a next cell placement. The gradient is the vector of partial derivatives of the MOF with respect to all variables. The non-linear optimization process calls the MOF and gradient function subroutines and uses the results to minimize the MOF.

29 Claims, 66 Drawing Sheets

OTHER PUBLICATIONS

Kleinhans et al.; "Gordian: VLSI Placement By Quadratic Programming and Slicing Optimization"; Mar. 1991, vol. 10, #3; IEEE Transactions on Computer–Aided Design, no page #.

Tsay et al.; "Proud: A Fast Sea–Of–Gates Placement Algorithm"; 1988; Dept. of EECS & the Electronics Research Lab, University of CA, Berkeley, CA., no page #.

D. Luenberger; "Linear & Nonlinear Programming"; 2nd Edition; Ch. 8, *Conjugate Direction Methods*; Stanford University; Addison–Wesley Publishing Company; Reading, Mass.; Menlo Park, CA., no date, no page #.

Nash et al.; "Linear & Nonlinear Programming"; 1996, The McGraw–Hill Companies, Inc., no page #.

D. Luenberger; "Linear & Nonlinear Programming"; 2nd Edition; Ch. 9, *Quasi–Newton Methods*; Stanford University; Addison–Wesley Publishing Company; Reading, Mass.; Menlo Park, CA., no date, no page #.

D. Luenberger; "Linear & Nonlinear Programming"; 2nd Edition; Ch. 7, *Basic Descent Methods*; Stanford University; Addison–Wesley Publishing Company; Reading, Mass.; Menlo Park, CA., no date, no page #.

W. Press et al.; "Numerical Recipes In C";; The Art of Scientific Computing; Ch. 10, *Minimization or Maximization of Functions*; Cambridge University Press, Cambridge, New York, no date, no page #.

D. Luenberger; "Linear & Nonlinear Programming"; 2nd Edition; Ch. 12, *Penalty & Barrier Methods*; Stanford University; Addison–Wesley Publishing Company; Reading, Mass.; Menlo Park, CA, no date, no page #.

Bentley; Multidimensional Binary Search Trees Used For Associative Searching; Stanford University; Sep. 1975, vol. 18, #9, no page #.

Finkel et al.; "Quad Trees, A Data Structure For Retrieval On Composite Keys"; Acta Informatica 4, 1–9(1974) Springer–Verlag 1974, no page #.

R. Hitchcock, Sr; "Timing Verification & the Timing Analysis Program"; IBM General Technology Division, Endicott, New York; 19th Design Automation Conference, 1982, no page #.

Pillage et al.; "Asymptotic Waveform Evaluation for Timing Analysis"; IEEE Transactions on Computer–Aided Design, vol. 9, #4, Apr. 1990, no page #.

Rubenstein et al.; "Signal Delay in RC Tree Networks"; IEEE Transactions on Computer–Aided Design, vol. CAD–2, #3, Jul. 1983, no page #.

Sha et al.; "An Analytical Algorithm for Placement of Arbitrarily Sized Rectangular Blocks"; Stanford Electronics Lab, Stanford University, AEL 204 Stanford, CA 1985, no page #.

Eisenmann et al.; "Generic Global Placement & Floorplanning"; Institute of Electronic Design Automation Technical University, Munich Germany '98, no page #.

* cited by examiner $$\frac{\partial}{\partial x_i} \log\_sum\_exp_j(x_i, alpha) = \frac{e^{(x_i/alpha)}}{\sum_j e^{(x_j/alpha)}}$$

FIGURE 12A

$$\frac{\partial}{\partial x_i} \text{wire\_len (net)} = \frac{e^{\left(\frac{x_i}{\text{alpha}}\right)}}{\sum_{\text{net pins} j} e^{\left(\frac{x_j}{\text{alpha}}\right)}} - \frac{e^{\left(\frac{-x_i}{\text{alpha}}\right)}}{\sum_{\text{net pins} j} e^{\left(\frac{-x_j}{\text{alpha}}\right)}}$$

FIGURE 12B

$$\text{DENSITY\_PENALTY} = \iint\limits_{\substack{\text{ALL ALL} \\ x \quad y}} \text{PENALTY\_FOR\_GRID}\left(\sum\limits_{\substack{\text{ALL} \\ \text{CELLS}}} \text{POTENTIAL}_{\text{CELL}}(x-x_{\text{CELL}}, y-y_{\text{CELL}}) - \text{AVERAGE\_POTENTIAL}\right) dxdy$$

FIGURE 16A

$$\text{DENSITY\_PENALTY} = \int_{\substack{\text{ALL} \\ x}} \int_{\substack{\text{ALL} \\ y}} \left( \sum_{\substack{\text{ALL} \\ \text{CELLS}}} \text{POTENTIAL}_{\text{CELL}}(x-x_{\text{CELL}}, y-y_{\text{CELL}}) - \text{AVERAGE\_POTENTIAL} \right)^2 dxdy$$

FIGURE 16B

$$\text{DENSITY\_PENALTY} = 2 \sum_{\substack{\text{ALL} \\ \text{CELLS PAIRS} \\ \text{CELL1} \neq \text{CELL2} \\ \text{AND CELL1} \\ \text{POTENTIAL} \\ \text{INTERSECTS} \\ \text{CELL2} \\ \text{POTENTIAL}}} \iint_{\substack{\text{ALL} \\ x}} \iint_{\substack{\text{ALL} \\ y}} \left( \text{POTENTIAL}_{\text{CELL1}}(x-x_{\text{CELL1}}, y-y_{\text{CELL1}}) \cdot \text{POTENTIAL}_{\text{CELL2}}(x-x_{\text{CELL2}}, y-y_{\text{CELL2}}) \right) dxdy$$

FIGURE 16C worst_path_delay=max [ worst_path_delay_of_pin(i) + stage_delay(pin(i), out_pin) ]
_of_out_pin
of all pins
immediately
preceding out_pin
in timing graph

FIGURE 18 worst_path_delay=log_sum_exp [ worst_path_delay_of_pin(i) + stage_delay(pin(i), out_pin), alpha ]
_of_out_pin       of all pins
                  immediately
                  preceding out_pin
                  in timing graph

FIGURE 19A worst_delay=log_sum_exp [worst_path_delay (endpoint(i)), alpha]
of all
end points

FIGURE 19B

$$\text{stage\_delay} = k \sum_{i=0}^{n-1} \sum_{j=i}^{n-1} R_i \, C_j$$

FIGURE 21

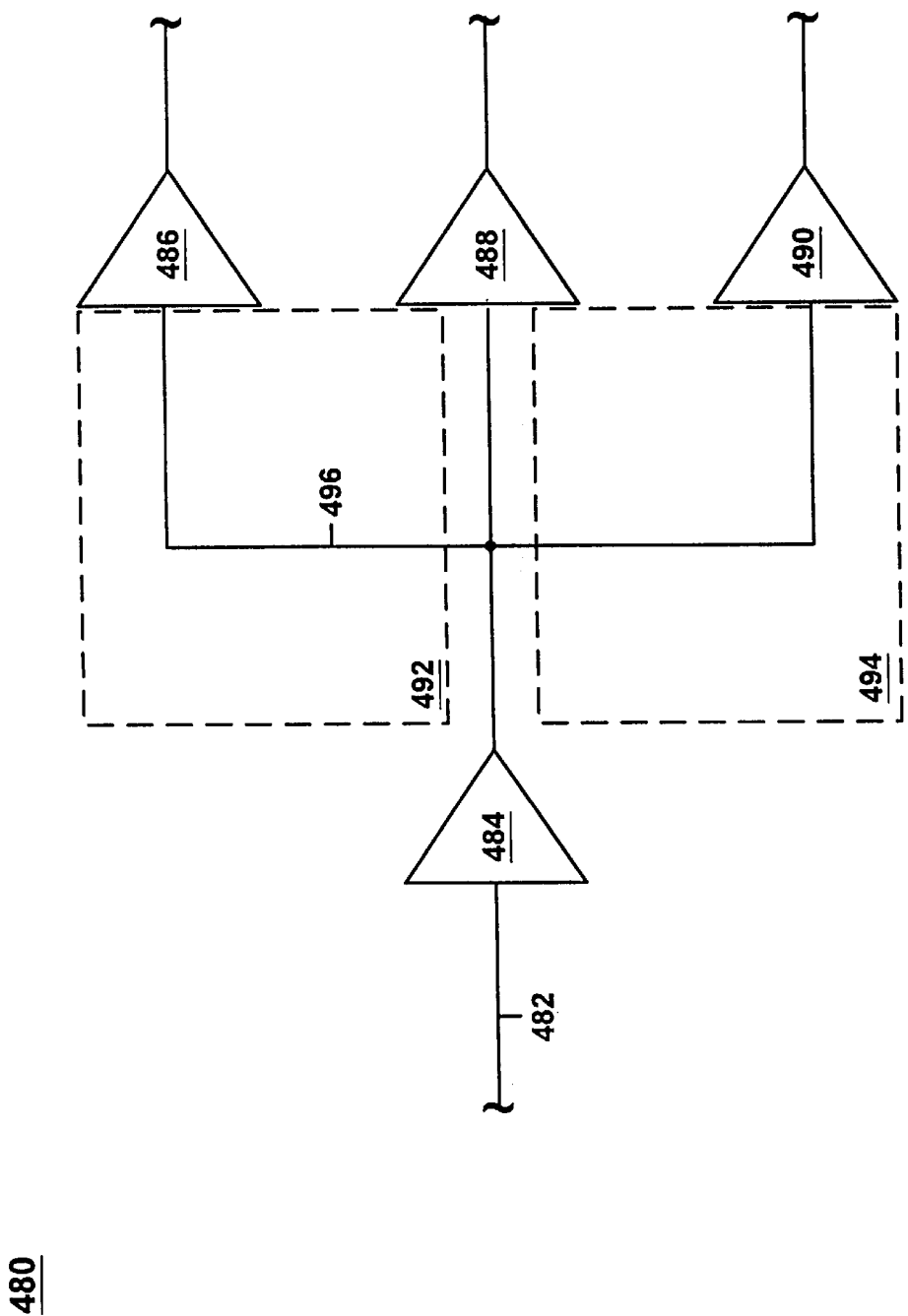

510

```
ENTER
  ↓
┌─────────────────────────────────────────────────────────────┐
│ PERFORM BREADTH FIRST FORWARD TRAVERSAL THROUGH TIMING MODEL│
│  FROM TIMING START POINTS TO TIMING END POINTS TO COMPUTE,  │
│  USING THE DELAY OBJECTIVE FUNCTION, THE WORST PATH DELAY   │
│                       AT EACH POINT                         │
│                            512                              │
└─────────────────────────────────────────────────────────────┘
  ↓
┌─────────────────────────────────────────────────────────────┐
│   USE A REVERSE BREADTH-FIRST TRAVERSAL, STARTING AT THE END│
│    POINTS, COMPUTE THE PARTIAL DERIVATIVE OF THE DELAY      │
│   OBJECTIVE FUNCTION WITH RESPECT TO THE TIMING END POINTS' │
│                    WORST PATH DELAY                         │
│                           514                               │
└─────────────────────────────────────────────────────────────┘
  ↓
┌─────────────────────────────────────────────────────────────┐
│  FOR ALL OTHER PINS, CONTINUE REVERSE BREADTH-FIRST         │
│  TRANSVERSAL AND COMPUTE THE PARTIAL DERIVATIVE OF THE      │
│  DELAY OBJECTIVE FUNCTION WITH RESPECT TO THE PIN WORST     │
│                PATH DELAYS FOR EACH PIN                     │
│                           516                               │
└─────────────────────────────────────────────────────────────┘
  ↓
┌─────────────────────────────────────────────────────────────┐
│  COMPUTE DERIVATIVE OF DELAY OBJECTIVE FUNCTION WITH        │
│              RESPECT TO STAGE DELAYS                        │
│                         518                                 │
└─────────────────────────────────────────────────────────────┘
  ↓
┌─────────────────────────────────────────────────────────────┐
│ USE ABOVE TO BACKCOMPUTE THE DERIVATIVE OF THE DELAY        │
│ OBJECTIVE FUNCTION WITH RESPECT TO NET RESISTANCES AND      │
│ CAPACITANCES AND GATE DRIVE RESISTANCES AND GATE DRIVE      │
│ CAPACITANCES AND GATE RECEIVING RESISTANCES AND GATE        │
│               RECEIVING CAPACITANCES                        │
│                         520                                 │
└─────────────────────────────────────────────────────────────┘
  ↓
┌─────────────────────────────────────────────────────────────┐
│ DIFFERENTIATE RESISTANCE AND CAPACITANCE FORMULATIONS WITH  │
│ RESPECT TO: (1) (X AND Y) COORDINATE LOCATIONS; AND (2)     │
│                   SIZES FOR CELLS                           │
│                         522                                 │
└─────────────────────────────────────────────────────────────┘
  ↓
┌─────────────────────────────────────────────────────────────┐
│ COMBINE ABOVE TO YIELD: (1) CONTRIBUTION TO THE GRADIENT    │
│ FROM THE (X,Y) COORDINATES THROUGH THE DELAY; AND (2)       │
│ CONTRIBUTION TO THE GRADIENT FROM THE SIZE THROUGH THE DELAY│
│                         524                                 │
└─────────────────────────────────────────────────────────────┘
  ↓
RETURN
```

FIGURE 24

$$\frac{\partial \, mof}{\partial \, circuit\_delay} = W_T$$

FIGURE 25A

$$\frac{\partial \text{mof}}{\partial \text{endpoint\_delay}_i} = \frac{\partial \text{mof}}{\partial \text{circuit\_delay}} \cdot \frac{\partial}{\partial \text{endpoint\_delay}_i} \text{log\_sum\_exp}(\text{endpoint\_delay}_i, \text{alpha})$$

$$= W_T \frac{e^{\frac{(\text{endpoint\_delay}_i)}{\text{alpha}}}}{\sum_j e^{\frac{(\text{endpoint\_delay}_j)}{\text{alpha}}}}$$

FIGURE 25B

$$\frac{\partial \text{mof}}{\partial \text{delay\_of\_pin}} = \sum_{\substack{\text{all pins} \\ \text{fanned} \\ \text{out to} \\ \text{by pin}}} \left( \frac{\partial \text{mof}}{\partial \text{delay\_of\_fanned\_out\_pin}} \cdot \frac{\partial}{\partial \text{delay\_of\_pin}} \left( \frac{\text{delay\_of\_pin}_i}{\underset{\substack{\text{log\_sum\_exp} \\ \text{all pins } i, \\ \text{immediately} \\ \text{preceding} \\ \text{fanned\_out\_pin} \\ \text{in timing graph}}}{+ \text{stage\_delay (pin } i, \\ \text{fanned\_out\_pin) alpha}} \right) \right)$$

FIGURE 26A

$$\frac{\partial \text{mof}}{\partial \text{delay\_of\_fanned\_out\_pin}} = \sum_{\substack{\text{all pins} \\ \text{fanned} \\ \text{out to} \\ \text{by pin}}} \left( \frac{e^{\left(\frac{\text{delay\_of\_pin} + \text{stage\_delay}(\text{pin}_i, \text{fanned\_out\_pin})}{\text{alpha}}\right)}}{\sum_{\substack{\text{all pins} \\ \text{immediately} \\ \text{preceding} \\ \text{fanned\_out\_pin} \\ \text{in timing graph}}} e^{\left(\frac{\text{delay\_of\_pin}_i + \text{stage\_delay}(\text{pin}_i, \text{fanned\_out\_pin})}{\text{alpha}}\right)}} \right)$$

FIGURE 26B

NON-LINEAR OPTIMIZATION SYSTEM AND METHOD FOR WIRE LENGTH AND DELAY OPTIMIZATION FOR AN AUTOMATIC ELECTRIC CIRCUIT PLACER

BACKGROUND OF THE INVENTION

1. Field of the Invention

The present invention relates to the field of electronic design automation (EDA). More specifically, the present invention relates to techniques for cell placement and other optimizations used in the design and fabrication of integrated circuit devices.

2. Related Art

An electronic design automation (EDA) system is a computer software system used for designing integrated circuit (IC) devices. The EDA system typically receives one or more high level behavioral descriptions of an IC device (e.g., in HDL languages like VHDL, Verilog, etc.), as represented by HDL 12 of FIG. 1, and translates this high level design language description into netlists of various levels of abstraction. At a higher level of abstraction, a generic netlist is typically produced based on technology independent primitives. The generic netlist can be translated into a lower level technology-specific netlist based on a technology-specific library that has gate-specific models for timing and power estimation. A netlist describes the IC design and is composed of nodes (elements) and edges, e.g., connections between nodes, and can be represented using a directed cyclic graph structure having nodes which are connected to each other with signal lines. A single node can have multiple fan-ins and multiple fan-outs. The netlist is typically stored in computer readable media within the EDA system and processed and verified using many well known techniques. One result is a physical device layout in mask form which can be used to directly implement structures in silicon to realize the physical IC device, step 28 of FIG. 1.

The rapid growth of the complexity of modern electronic circuits has forced electronic circuit designers to rely upon computer programs to assist or automate most steps of the design process. Typical circuits today contain hundreds of thousands or millions of individual pieces or "cells." Such a design is much too large for a circuit designer or even an engineering team of designers to manage effectively manually.

FIG. 1 shows a typical system 10 of computer programs used to automate the design of electronic circuits. Within system 10, the designer first produces a high-level description 12 of the circuit in a hardware description language such as Verilog or VHDL. Then this high-level description 12 is converted into a netlist 16a using a computer implemented synthesis process 14 such as a the "Design Compiler" by Synopsys of Mountain View, Calif. A netlist 16a is a description of the electronic circuit which specifies what cells compose the circuit and which pins of which cells are to be connected together using wires ("nets"). Importantly, the netlist 16a does not specify where on a circuit board or silicon chip the cells are placed or where the wires run which connect them together. Determining this geometric information is the function of an automatic placement process 18 and an automatic routing process 22, both of which are shown in FIG. 1 and are typically computer programs.

Next, the designer supplies the netlist 16a into the computer implemented automatic cell placement process 18 of FIG. 1. The automatic placement computer program 18 finds a location for each cell on a circuit board or silicon chip. The locations are specified, typically, in two dimensional spatial coordinates, e.g., (x, y) coordinates, on the circuit board or silicon chip. The locations are typically selected to optimize certain objectives such as wire length, wire routibility, circuit speed, circuit power consumption, and/or other criteria, subject to the condition that the cells are spread evenly over the circuit board or silicon chip and that the cells do not overlap with each other. The output of the automatic cell placement process 18 includes a data structure 20 including the (x, y) position for each cell of the IC design. In some cases, the netlist 16a is modified and a new netlist 16b is generated. In other cases, the netlist 16b is the same as netlist 16a.

Next, the designer supplies the netlist 16a and the cell location data structure 20, generated by the placement program 18, to a computer implemented automatic wire routing process 22. This computer program 22 generates wire geometry within data structure 24. The wire geometry data structure 24 and cell placement data structure 20 together are used to make the final geometric database needed for fabrication of the circuit as shown by process 28.

FIG. 2 illustrates the subprocesses of the automatic placement process 18 in more detail. Typically, placement is done in 2 steps including a first coarse placement process 30, then detailed a placement process 34. The coarse placement process 30 finds approximate cell locations which optimize the desired metrics and spreads cells evenly across the silicon chip or circuit board. In the output data structure 32, some cells still overlap and no cells are in legal site locations, so the coarse placement 30 needs to be legalized before the circuit can be fabricated. The detailed placement 34 inputs the data structure 32 output by the coarse placement 32 and generates the detailed placement 20, discussed in FIG. 1, which does not have overlap and all are located on legal sites.

FIG. 3A shows an example coarse placement 40a including the positions of cells A–I. The detailed placer process 34 changes cell locations a small amount in order to make the placement able to be manufactured. Generally, it is best to move cells as small a distance as possible to avoid disturbing the coarse placement result. Some detailed placer programs also attempt to further optimize the metrics used to drive coarse placement. An example detailed placement 40b is shown in FIG. 3B illustrating the new locations of cells A–I. As shown, the cells A–I in FIG. 3B are more aligned along the horizontal rows.

Other prior art methods of finding coarse placement are described. The early methods of performing coarse placement used some variety of simulated annealing as described in a journal article entitled, "Optimization by Simulated Annealing," by S. Kirkpatrick, C. Gelatt, M. Vecchi, which appeared in "Science," May 13, 1983, Volume 220, Number 4598, on pages 671–680. Simulated annealing is a general method of finding good solutions to complex combinatorial optimization problems with a wide variety objective functions. Simulated annealing works by proposing random small changes to the current placement and accepting the changes with probability as shown by equation (1) below:

$$\text{probability of acceptance} = 1, \text{ if } \Delta\text{objective is} \leq 0 \quad e-(\Delta\text{objective}/\text{temperature}), \text{ if } \Delta\text{objective} > 0 \qquad (1)$$

operation, changes that are not accepted are rejected, and undone. A control parameter "temperature" is used to control the number of acceptances. Temperature starts high and decreases toward 0 as the optimization proceeds. The optimization concludes when the temperature reaches 0.

Simulated annealing has many advantages. Simulated annealing based placement algorithms can combine both coarse and detailed placement in a single step. It can be shown (e.g., in a conference paper entitled, "Convergence of the Annealing Algorithm," by M. Lundy and A. Mees, which appeared in "Proceedings of the Simulated Annealing Workshop," 1984) that simulated annealing converges to an optimal solution with probability 1, if run for a long enough amount of time. Simulated annealing can optimize a wide variety of objective functions.

However, simulated annealing has more recently lost favor as a method of coarse placement because of the following disadvantages. First, for circuits larger than a few thousand cells, simulated annealing does not achieve a good result unless run for a prohibitively long amount of time. Circuits today have hundreds of thousands or millions of cells. Second, for various technical reasons, simulated annealing is not able to optimize circuit timing very effectively. As circuit sizes have grown and geometries have decreased in size, circuit timing has become progressively more important in determining a good placement. Simulated annealing does continue to be a competitive method for detailed placement.

The shortcomings of simulated annealing for coarse placement have motivated the development of quadratic-partition algorithms for coarse placement as described in a journal article entitled, "GORDIAN: VLSI Placement by Quadratic Programming and Slicing Optimization," by Jurgen Kleinhans, Georg Sigl, Frank Johannes, Kurt Antreich, which appeared in "IEEE Transactions on Computer-Aided Design," Vol. 10, No. 3, March 1991 on pages 356–365 and a conference paper entitled, "PROUD: A Fast Sea-Of-Gates Placement Algorithm," by Ren-Song Tsay, Ernest Kuh, Chi-Ping Hsu, which appeared in "Proceedings of 25th ACM/IEEE Design Automation Conference," 1988, paper 22.3, on pages 318–322.

The below pseudo code shows an outline of a quadratic-partition coarse placement program.

```
/* entire chip is single partition */
loop until partitions are small enough
{
    for all partitions {
        minimize_quadratic_wire_length_in_partition
    }
    for all partitions {
        divide_partitions_into_2_partitions
    }
}
```

This prior art process is based on the observation that the problem of placing cells to minimize sum-of-squared wire lengths can be solved quickly and exactly for large problems using standard techniques. Partitioning is used to guarantee that the cells are spread evenly across the silicon chip or circuit board.

Equation (2) gives a formula for the sum-of-squared wire length of a cell placement.

$$\text{total\_wire\_len} = \sum_{(i,j)} weight_{ij}[(cell_ix - cell_jx)^2 + (cell_iy - cell_jy)^2] \quad (2)$$

where cell i and cell j have connected pins $weight_{ij}$=weight of wire from cell i to cell j selected by user $cell_ix$=cell i's x coordinate $cell_iy$=cell i's y coordinate $cell_jx$=cell j's x coordinate $cell_jy$=cell j's y coordinate Equation (2) for total wire length is a quadratic form with a positive-semi-definite Hessian. Therefore, the total squared wire length can be minimized directly, or differentiated with respect to cell locations, and then solved as a system of linear equations using standard techniques. There is a requirement that some cells be in fixed locations (for example, the circuit's input/output ports can be fixed on the periphery of the silicon chip); otherwise, the optimal placement is to place all cells in exactly the same location and have all wires zero length.

However, minimizing total squared wire length does not spread cell area evenly across the chip. Partitioning accomplishes this. FIGS. 4A–4C illustrate an example of using partitioning to spread cell area evenly across a rectangle. FIG. 4A shows one solution within chip boundary 42 to the minimum sum-of-squared wire length problem for cells A–D. Cell area is heavily skewed toward the left. FIG. 4B shows the addition of a vertical partition line 43 which divides cell area into regions 42a and 42b. The cell areas in 42a and 42b are made equal by placement of the partition line 43 although the partition line 43 does not divide the rectangle 42 in half. In FIG. 4C, the partition line 43 has been assumed to divide the rectangle into equal halves and the cells A–D moved accordingly. Each half-rectangle 42a and 42b is also a rectangle and can be partitioned again. The selection of the position of the partition line (e.g., always moved one half of the pertinent distance) can be very arbitrary.

In the quadratic portioning process (as represented by the algorithm outlined in the pseudo code above), all cells start out in a rectangle which is the entire silicon chip or circuit board. This rectangle is partitioned into 2 rectangles. Each of these 2 rectangles gets partitioned into 2 rectangles, etc., until each rectangle contains a small number of cells (e.g., 20 cells). Usually, the process alternates between vertical and horizontal partition lines for each iteration of the main loop.

Quadratic partitioning placement runs relatively quickly on large circuits but its formulation is very inflexible. It can only optimize weighted sum-of-squared wire length. However, this metric is really the wrong objective. Namely, what is important in cell placement is wire routibility, circuit timing, power consumption, etc. Quadratic wire length is a poor approximation for these metrics. It is possible to approximate these metrics somewhat better by changing wire weights to emphasize wires that seem to be more important to make short. For example, wires on the critical timing path can have higher weight in order to improve the timing of the critical path. However, this second approach is still a poor approximation to the true objective function that placement should optimize. Also, the selection of the position of the partition line location is arbitrary and unfortunately can introduce non-optimal artifacts in the placement along the partition lines.

Accordingly, what is needed is a more effective coarse placement process. What is further needed is a coarse placement process that optimizes cell placement while emphasizing wire routability and circuit timing rather than emphasizing a quadratic minimization relationship. What is needed is a coarse placement process that addresses the problems of the prior art methods as discussed above. In view of the above needs, the present invention provides a novel coarse cell placement system for increasing the efficiency of an IC design process to thereby provide a faster, more cost effective and more accurate IC design process by producing chips with better wire routability, better timing and better power consumption. These and other advantages of the present invention not specifically mentioned above will become clear within discussions of the present invention presented herein.

SUMMARY OF THE INVENTION

A computer implemented process is described herein for automatic creation of integrated circuit (IC) geometry using a computer. In particular, the present invention includes a method to generate coarse or approximate placement of cells on a 2-dimensional silicon chip or circuit board. The coarse placer can also be used to automatically size cells, insert and size buffers, and aid in timing driven structuring of the placed circuit. The coarse placer can be used in conjunction with other automatic design tools such as a detailed placer and an automatic wire router.

The present invention includes a process that can be implemented as a computer program that uses general unconstrained non-linear optimization techniques to find a coarse placement of cells on a circuit board or silicon chip. A master objective function (MOF) is defined which evaluates the goodness of a particular cell placement. A non-linear optimization process finds an assignment of values to the function variables which minimizes the MOF. The MOF is chosen so that values of variables which minimize the MOF correspond to a good coarse placement.

In particular, the MOF is a weighted sum of functions which evaluate various metrics. An important metric for consideration is the density metric, which measures how well spread out the cells are in the placement. Other component functions are wire-length, which measures total linear wire-length, delay, which measures circuit timing, and power, which measures circuit power consumption. The barrier metric penalizes placements with cells outside the allowed placement region.

The present invention implements the MOF as a computer program subroutine in the preferred embodiment. A conjugate-gradient process utilizes both the MOF and its gradient to determine a next cell placement. In the preferred embodiment, the gradient of the MOF is also implemented as a computer program subroutine. The gradient is the vector of partial derivatives of the MOF with respect to all variables. The non-linear optimization process calls the MOF and gradient function subroutines and uses the results to minimize the MOF. A smoothing variable, alpha, is used to alter the MOF through multiple passes of the conjugate-gradient process where alpha is altered on each pass until the process terminates or convergence is reached.

In one implementation, the variables of the optimization are the (x and y) coordinates of all of the cells to represent 2-dimensional placement. The result is a placement of cells. In other embodiments, adding variables to represent other parameters of the circuit implementation combine additional optimizations with placement. One such additional variable within the present invention is cell size. Adding a variable for each cell size gives simultaneous placement and cell sizing. Adding a variable to each wire branch for buffer area gives simultaneous placement and buffer insertion. Adding a variable to each wire branch for buffer tree depth gives simultaneous placement and buffer tree balancing. Timing-driven structuring of fanout-free-trees can be modeled by adding a variable to each input of the fanout-free-tree to represent the depth of that input of the tree.

The present invention has the following advantages over the prior art methods. First, the present invention can solve large placement problems (e.g., 200,000 cells) in reasonable computer run time (e.g., 4 hours). Second, the present invention achieves better quality placements because it much more accurately models the metrics to be optimized than the prior art methods. Third, the present invention achieves better overall quality IC chip design because the present invention can simultaneously optimize placement, sizing, buffering, and timing-driven-structuring, and make appropriate tradeoffs between these different and often conflicting methods of circuit improvement. Lastly, the present invention achieves better quality because the present invention requires no partitioning step which typically introduces placement artifacts into prior art designs. The density function, described further below, advantageously ensures that cells are spread out evenly across the chip.

BRIEF DESCRIPTION OF THE DRAWINGS

FIG. 12A illustrates the derivative of the log_sum_exp function used in the wire length objective portion of the MOF of the present invention.

FIG. 12B illustrates the gradient of the wire length objective function used in the wire length objective portion of the MOF of the present invention.

FIG. 16A and FIG. 16B and FIG. 16C illustrate relationships for computing penalty functions of the density objective function for a gridless embodiment of the present invention.

FIG. 18 is a classical static timing analysis formulation for worst path delay computation.

FIG. 19A is a timing formulation used by the present invention to determine the worst path delay of an output pin.

FIG. 19B is a timing formulation used by the present invention to determine the signal propagation delay through the path of a circuit design having the worst timing delay.

FIG. 21 is a formulation used to compute the stage delay through a circuit having known resistance and capacitance according to the Elmore-Rubenstein-Penfield model.

FIG. 23 illustrates an exemplary net and illustrates the rectangles used by the present invention to determine half-perimeter formulations for resistance and capacitance determinations.

FIG. 24 is a flow diagram illustrating steps performed by the present invention in computing the gradient of the delay objective function.

FIG. 25A illustrates the partial derivative of the MOF with respect to circuit delay, which is the weight, wT.

FIG. 25B illustrates the partial derivative of the MOF with respect to the end point delay (the delay values at the end points of the netlist).

FIG. 26A and FIG. 26B illustrate the partial derivative of the MOF with respect to the delay at any point within the netlist.

DETAILED DESCRIPTION OF THE INVENTION

Figure 1:
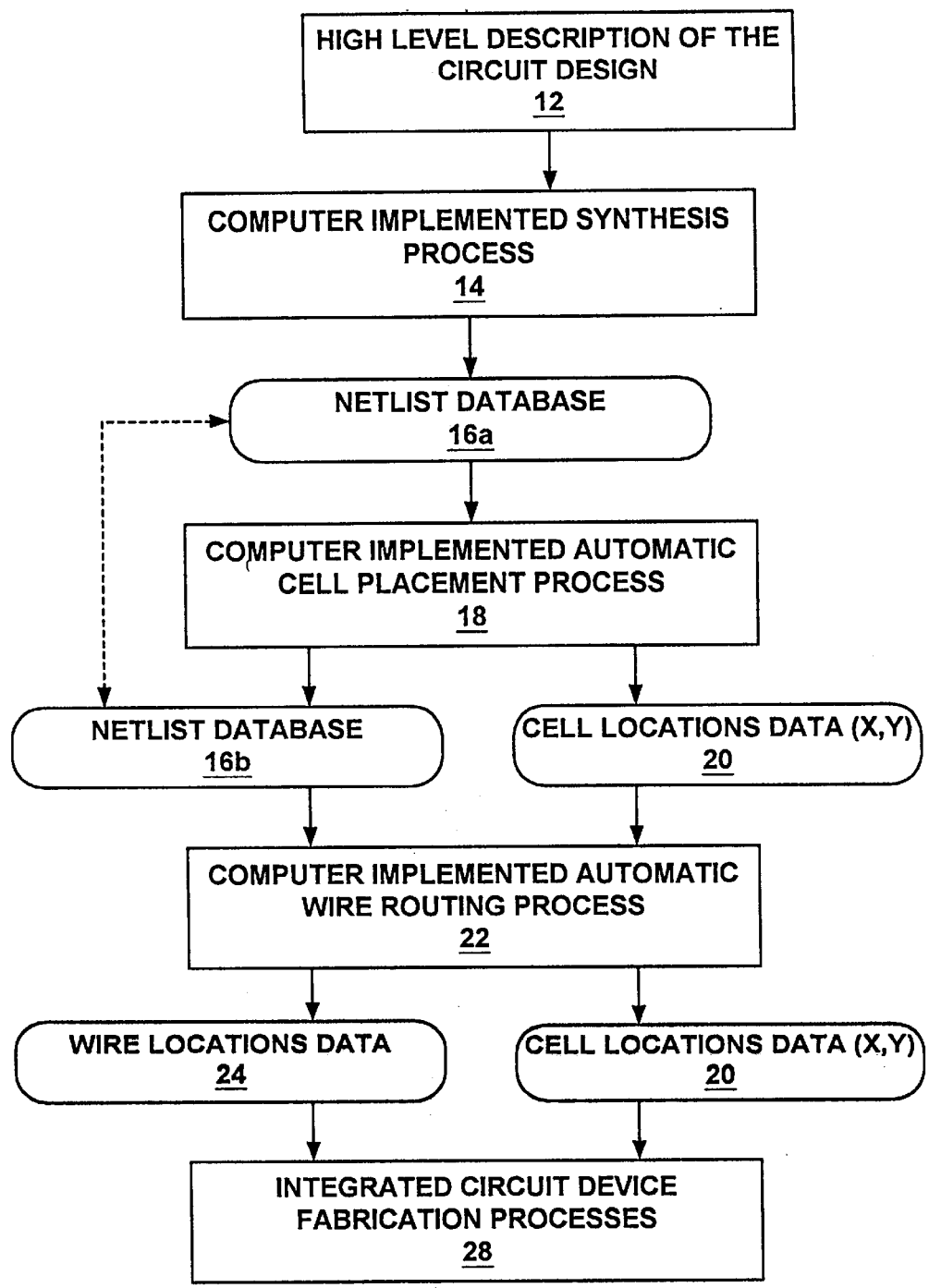
FIG. 1 illustrates a process for automatically converting a high level circuit description into an integrated circuit device including an automatic cell placement process.
Figure 2:
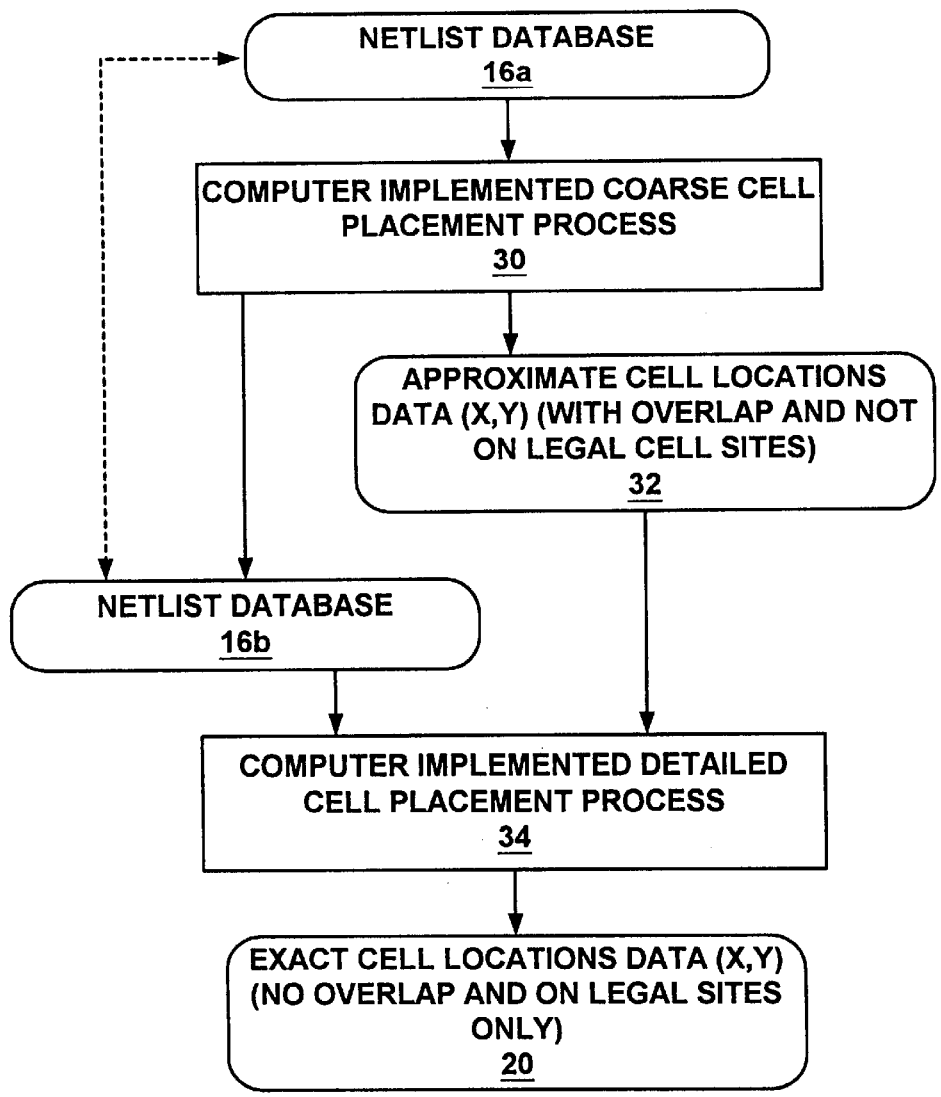
FIG. 2 illustrates steps involved in the automatic cell placement process of FIG. 1.
Figure 3A:
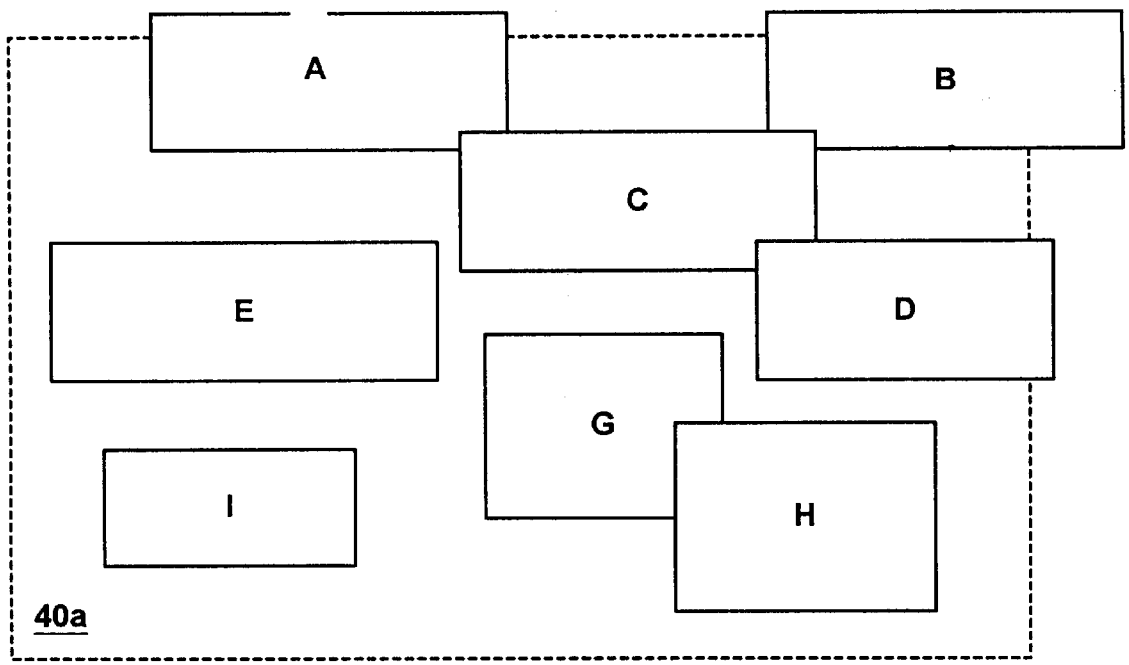
FIG. 3A is an exemplary layout as produced by the coarse cell placement subprocess of the automatic cell placement process of FIG. 2.
Figure 3B:
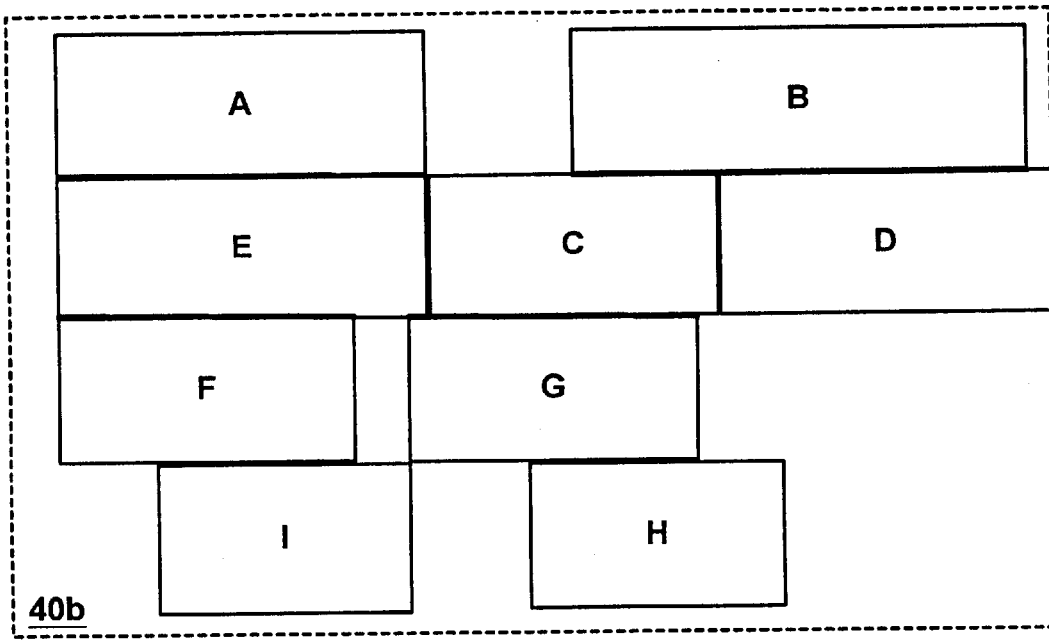
FIG. 3B is an exemplary layout as produced by the detailed cell placement subprocess of the automatic cell placement process of FIG. 2.
Figure 4A:
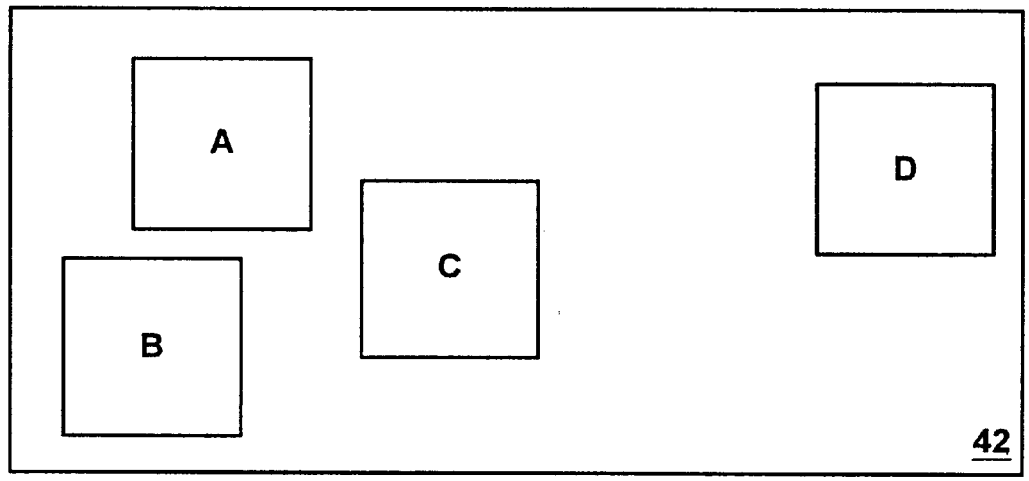
FIG. 4A, FIG. 4B and FIG. 4C illustrate exemplary IC layouts as generated as a result of automatic partitioning processes.
Figure 4B:
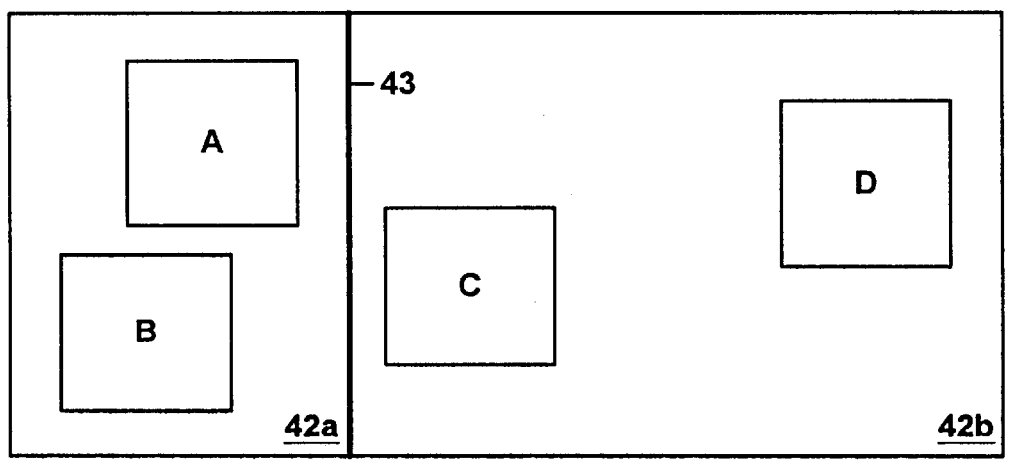
Figure 4C:
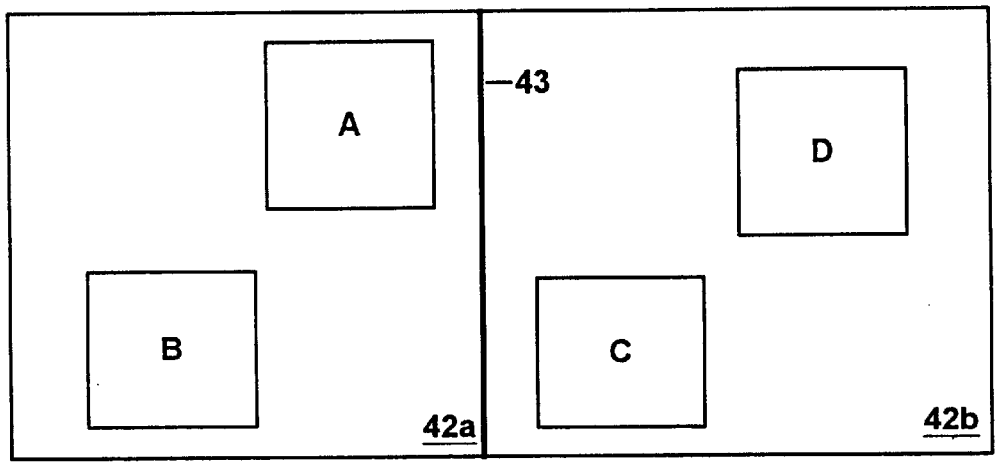

In the following detailed description of the present invention, a non-linear optimization system for automatic electronic circuit placement, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system (e.g., FIG. 7, FIG. 8, FIG. 15 and FIG. 24), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform 112

Aspects of the present invention, described below, are discussed in terms of steps executed on a computer system (e.g., processes 300, 210, 370 and 510 ). These steps are implemented as program code stored in computer readable memory units of a computer system and are executed by the processor of the computer system. Although a variety of different computer systems can be used with the present invention, an exemplary general purpose computer system 112 is shown in FIG. 5.

In general, computer system 112 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user. Data storage device 104 can include one or more removable magnetic or optical storage media (e.g., diskettes, tapes) which are computer readable memories. Memory units of system 112 include 102, 103 and 104.

Figure 5:
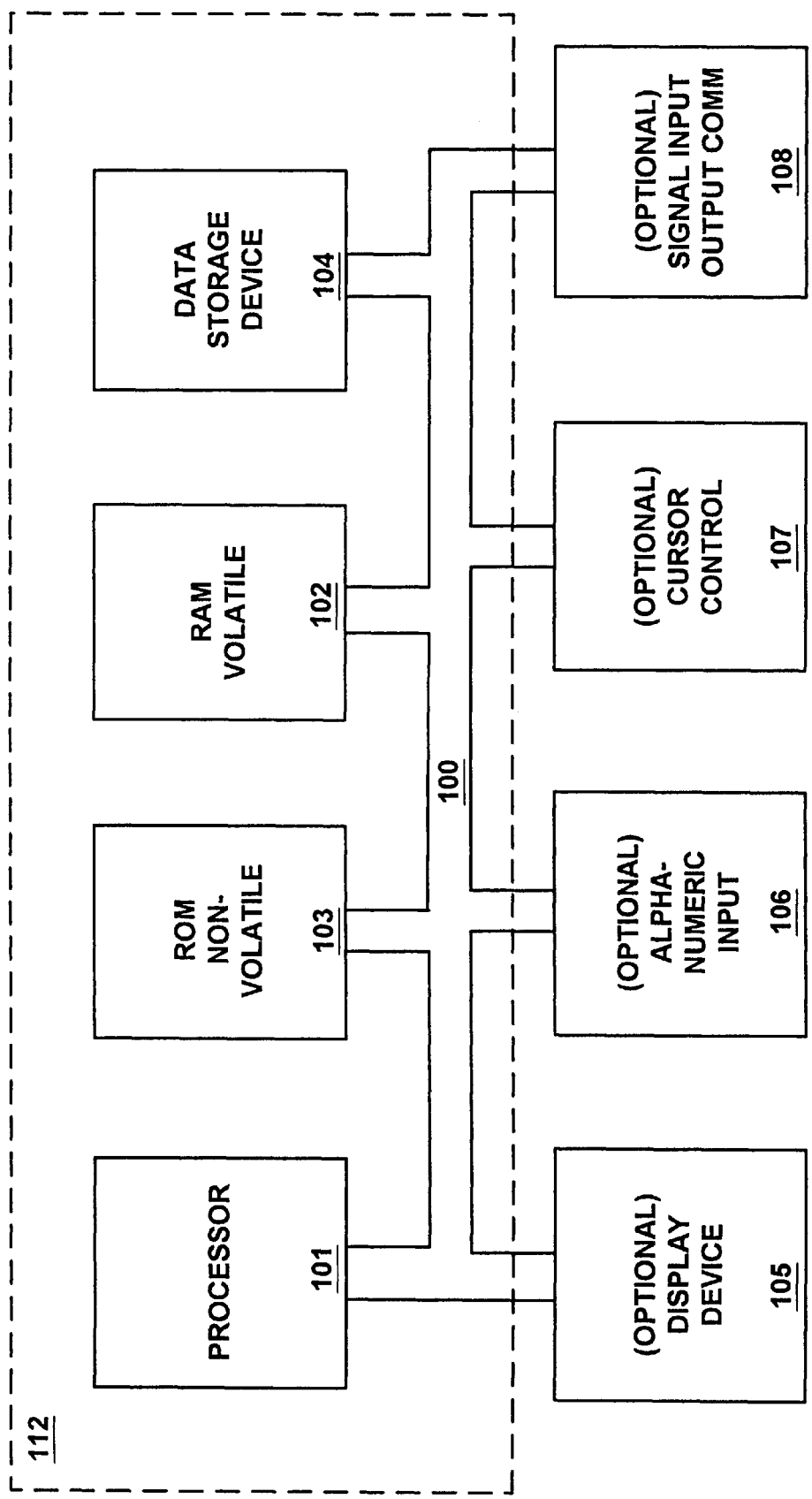
FIG. 5 illustrates a general purpose computer system on which embodiments of the present invention can be implemented.

Also included in computer system 112 of FIG. 5 is an alphanumeric input device 106 including alphanumeric and function keys coupled to the bus 100 for communicating information and command selections to the central processor 101. Computer system 112 also includes a cursor control or directing device 107 coupled to the bus for communicating user input information and command selections to the central processor 101. Computer system 112 can also include an optional signal generating device 108 coupled to the bus 100 for interfacing with other networked computer systems. The display device 105 utilized with the computer system 112 of the present invention may be a liquid crystal device, other flat panel display, cathode ray tube, or other display device suitable for creating graphic images and alphanumeric characters recognizable to the user.

Coarse Cell Placement System of the Present Invention

The present invention includes a process that can be implemented as a computer program that uses general unconstrained non-linear optimization techniques to find a coarse placement of cells on a circuit board or silicon chip. A master objective function (MOF) is defined which evaluates the quality of a particular cell placement. In effect, the MOF measures the "goodness" of the particular cell placement. A non-linear optimization process 300 (FIG. 8) of the present invention finds an assignment of values to the function variables which minimizes the MOF. The MOF is chosen so that values of variables which minimize the MOF correspond to a good coarse placement.

In particular, the MOF is a weighted sum of functions which evaluate various metrics. An important metric taken into consideration within the MOF is the density function which measures how well spread out the cells are in the placement. Other component functions of the MOF are a wire-length function which measures total linear wire-length, a delay function which measures circuit timing, and a power function which measures circuit power consumption. The barrier metric or "boundary function," penalizes placements with cells outside the allowed placement region. The MOF is shown below as equation (3), where the notation "* vars" denotes vector variables:

$$\text{MOF}(*\text{vars})=wb*\text{barrier}(*\text{vars})+wd*\text{density}(*\text{vars})+wL*\text{wire\_len}(*\text{vars})+wT*\text{delay}(*\text{vars})+wp*\text{power}(*\text{vars}) \qquad (3)$$

where the w terms are constants and *vars include:
- (x, y) coordinates of cells, pins for cell placement
- size of cells and buffers for sizing
- buffer area of wire for buffer insertion
- buffer tree depth on wire branch for buffer tree balancing
- logic tree depth on logic tree input for timing driven structuring Each of the terms of the MOF are described in more detail below. In one embodiment, if only (x, y) coordinates are used in the variables, and delay and power are ignored, then a placer is realized.

The present invention implements the MOF and its solution process as computer program subroutines in the preferred embodiment. A conjugate-gradient process utilizes both the MOF and its gradient (and a smoothing element) to determine a next cell placement. The gradient, *g, is the vector of partial derivatives of the MOF with respect to all variables. Shown below is an expression, f(*x), for the MOF of the present invention and the gradient, *g, for this function is shown as equation (4):

$$f(*x)=f(x_0, x_1, x_2, \ldots x_{n-1}) \qquad (3)$$

$$*g=(\partial f/\partial x_0, \partial f/\partial x_1, \partial f/\partial x_2, \ldots, \partial f/\partial x_{n-1}) \qquad (4)$$

In the preferred embodiment, the gradient of the MOF is also implemented as a computer program subroutine. The gradient of a function points to the most increase in the function and, therefore, the negative of the gradient points in the direction of the most decrease in the function.

Figure 6:
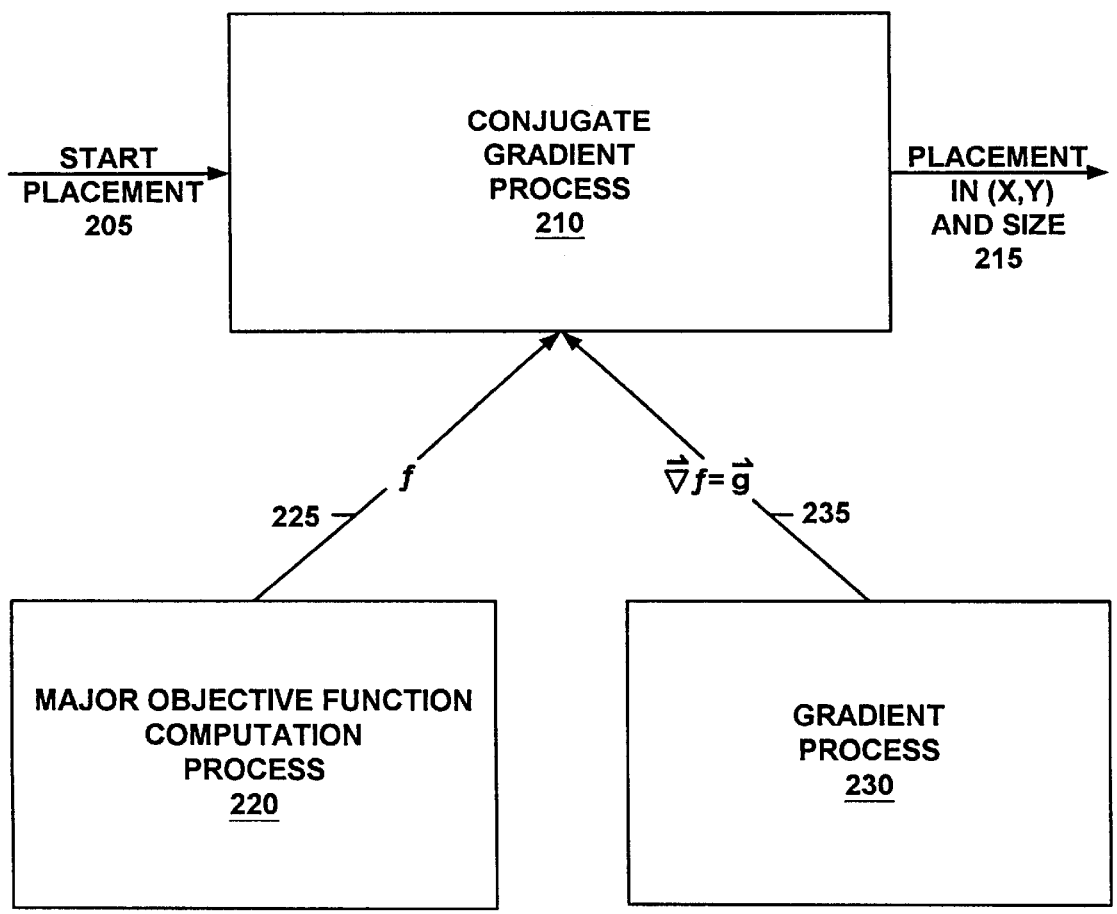
FIG. 6 is a data flow diagram of the coarse placement process of the present invention including data flow from the major objective function and the gradient process to the conjugate-gradient process.
Figure 7:
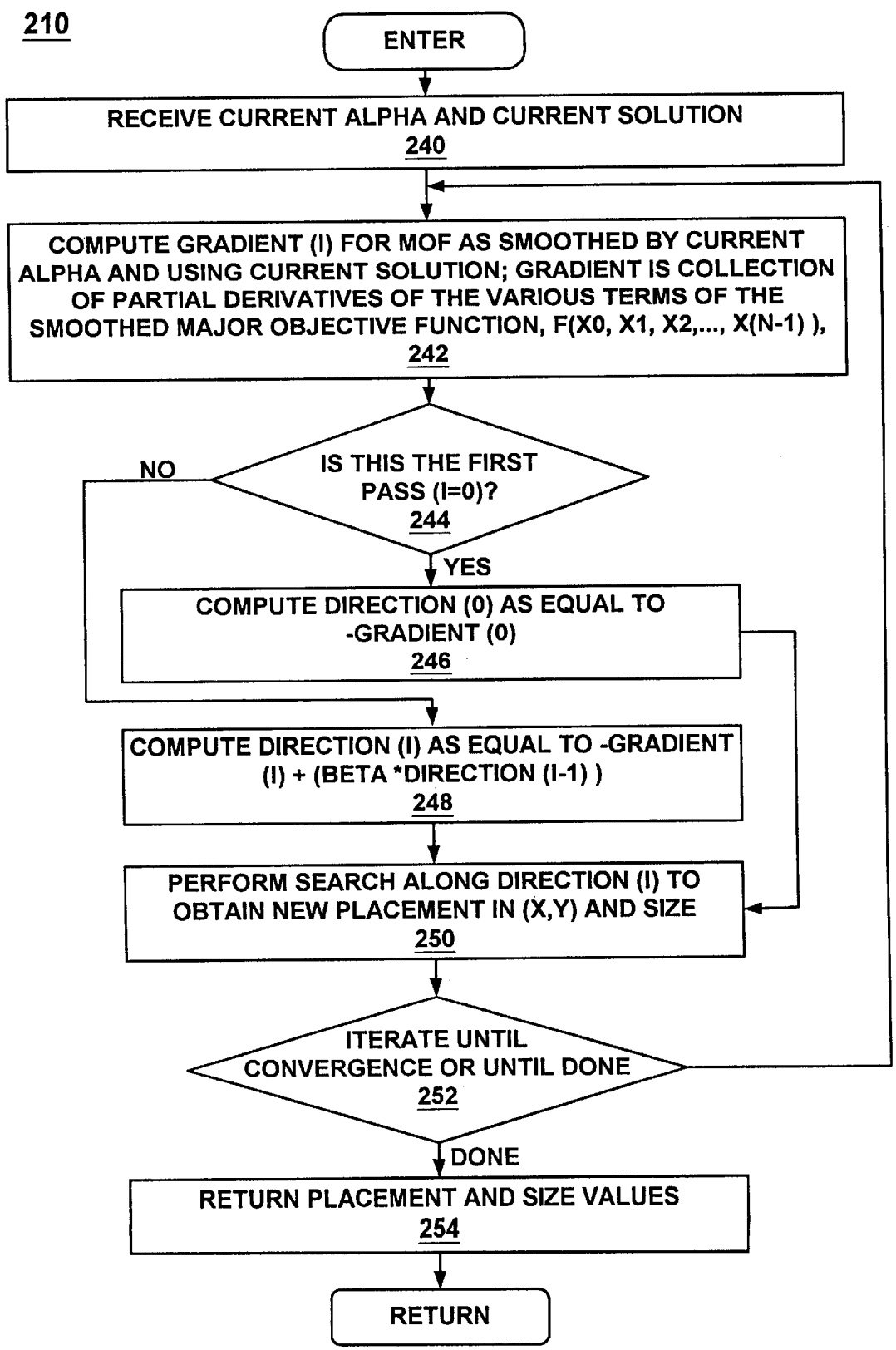
FIG. 7 is a flow diagram illustrating steps of the conjugate gradient process of the present invention.
Figure 8:
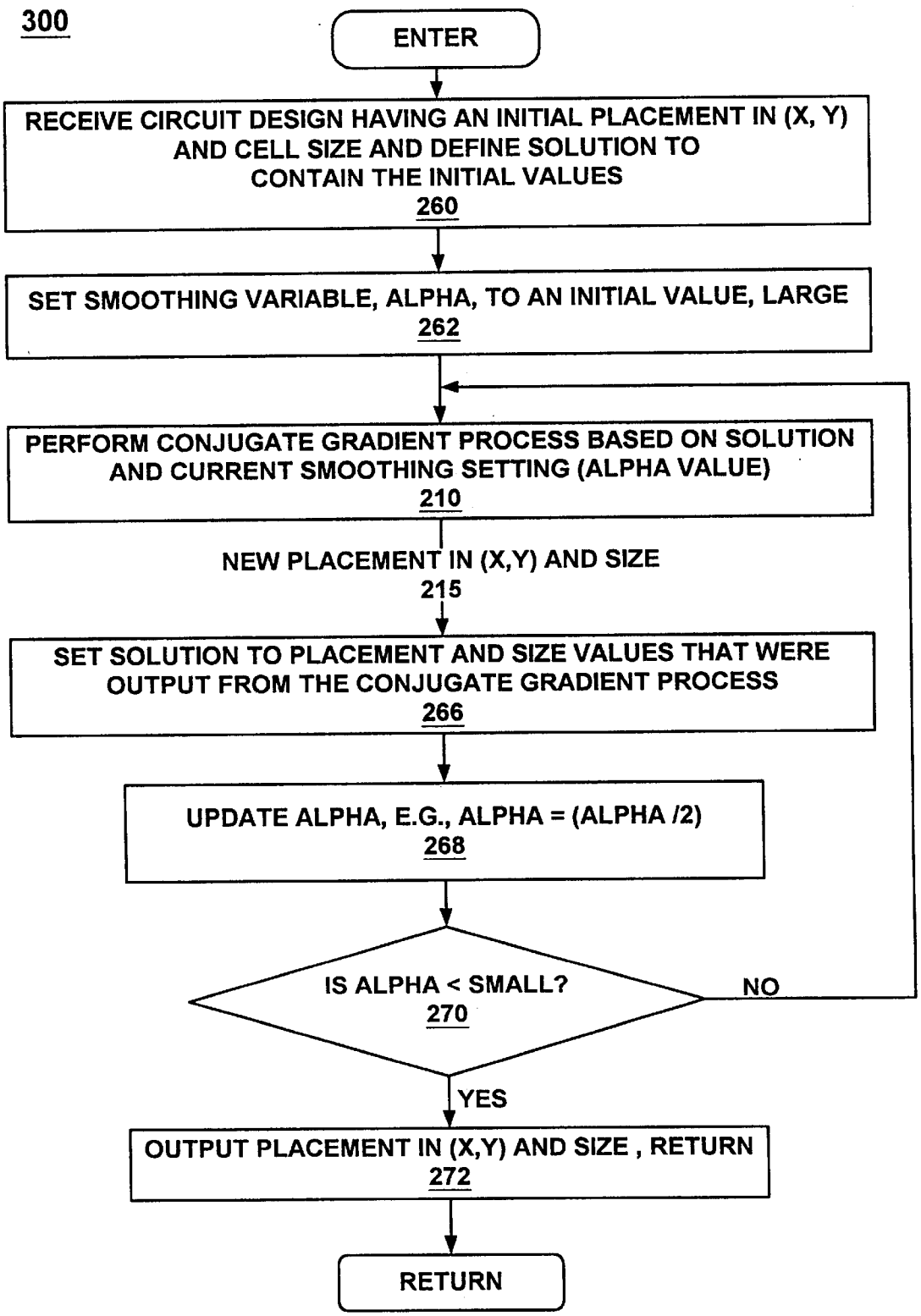
FIG. 8 is a flow diagram illustrating steps of the coarse placement process of the present invention.

As shown in the data flow diagram of FIG. 6, the MOF process 220 transmits results of the MOF function, f, over data path 225 to the CG process 210 (FIG. 7). Data from gradient computations, *g, of process 230, are transmitted over data path 235 to the CG process 210. Gradient information over data path 235 is used to indicate particular directions that are searched to reach a minimum of the MOF. Therefore, the coarse placer 300 of the present invention calls the non-linear optimization process 210 that calls the MOF process 220 and gradient process 230 and uses the results to minimize the MOF. The CG process 210 receives an initial cell placement and size 205 and generates a new placement and size 215. A smoothing variable, alpha, is used to alter the MOF through multiple passes of the conjugate-gradient process where alpha is altered on each pass until the process terminates or convergence is reached (FIG. 8).

In one embodiment of the present invention, the variables of the optimization are the x and y coordinates of all of the cells to represent 2-dimensional placement. The result is a placement of cells. Adding variables to represent other parameters (e.g., cell size and buffering) of the circuit implementation combine additional optimizations with placement. One such additional variable within the present invention is cell size. Adding a variable for each cell size gives simultaneous placement and cell sizing. Adding a variable to each wire branch for buffer area gives simultaneous placement and buffer insertion. Adding a variable to each wire branch for buffer tree depth gives simultaneous placement and buffer tree balancing. Timing-driven structuring of fanout-free-trees can be modeled by adding a variable to each input of the fanout-free-tree to represent depth of that input of the tree.

Conjugate-Gradient Process 210. The preferred embodiment of the present invention uses the conjugate-gradient (CG) process 210 as shown in FIG. 7 to optimize the major objective function (MOF). Process 210 is implemented as instruction code stored within computer readable memory units of system 112. The CG process 210 is a memory and run-time efficient method to minimize a continuous and differentiable function. The CG process 210 determines the minimum of a smoothed version of the MOF and in so doing, requires the gradient and the alpha value. The alpha value indicates a level of smoothing that is performed on the smoothed version of the MOF.

Smoothing is performed on the MOF as a result of the following rationale. First, the CG process 210 cannot directly handle non-differentiable functions like the function 280a shown in FIG. 9A. By passing function 280a through a low pass filter (e.g., smoothing), a function 280b results and is differentiable. The level of smoothing performed is based on the alpha value. Secondly, the CG process 210 cannot directly handle constraints such as the constraint 282a shown in FIG. 9B. The present invention applies barrier or "penalty" functions, that are based on the alpha value, to achieve the result shown as 282b. Lastly, the CG process 210 can become trapped in a local minimum 285a of function 284a of FIG. 9C. Smoothing function 284a to function 284b aids in allowing the CG process 210 in finding the true minimum at 285b.

The CG process 210 does not require that the MOF be quadratic or even convex, but convexity does guarantee convergence to a global minimum. The CG process 210 does require that the function be continuous and this requirement is satisfied within the present invention. Other methods are known for minimizing unconstrained non-linear functions such as quasi-Newton processes, see "Linear and Nonlinear Programming", second edition, by David Luenberger, Addison-Wesley Publishing, Reading, Mass., 1989, ISBN 0-201-15794-2, pages 260–281 and Newton-Raphson processes, see "Linear and Nonlinear Programming", second edition, by David Luenberger, Addison-Wesley Publishing, Reading, Mass., 1989, ISBN 0-201-15794-2, pages 225–227. In alternative embodiments, these processes can be used in place of CG process 210.

The CG process 210 finds the minimum of a function by executing a series of line minimizations. A line minimization is the one-dimensional function minimization along some direction. The result of one line minimization is used as the start point of the next line minimization. The success of CG process 210 within the present invention depends on the correct choice of search directions for the line minimizations. Generally, the CG process 210 uses the negative gradient (−*g) of the MOF as the first search direction, and a combination of the weighted sum of the negative gradient of the function and the past search direction for subsequent other search directions. This is described in more detail below.

FIG. 7 illustrates the steps of the CG process 210 of the present invention for determining the minimum of a smoothed version of the MOF. At step 240, a current alpha value is given and a current solution for the MOF is determined. Alpha determines the smoothed MOF. This information is given to process 210 from FIG. 8 (described further below). At step 242 of FIG. 7, process 210 computes the gradient, *g, for the smoothed MOF. The gradient, as described above, is computed based on partial derivatives using the current solution (e.g., the current placement and cell size information). A new gradient is therefore computed on each pass through process 210 (e.g., for each I). Each successive gradient (i) computed by the passes of the CG process 210 is typically orthogonal to the just prior computed gradient (i−1).

At step 244 of FIG. 7, if this is the first pass through (i=0), then step 248 is entered, otherwise step 246 is entered. At step 246, the current "direction(0)" is equal to the negative (−) of the gradient or −*g. Step 250 is then entered. At step 248, which is applicable to all passes but the first pass, the search direction(i) is determined by:

$$\text{direction}(i) = [-{}^*g(i) + \text{beta}{}^*\text{direction}(i-1)] \tag{5}$$

where *g(i) is the gradient of the current pass through process 210, direction(i−1) is the direction computed in the prior pass through process 210 and beta is a value discussed further below. The direction(i) value above indicates a direction only and the present invention uses a line search mechanism to determine a distance to go, along the direction(i), in order to locate a new solution. The line search is a well known function of one variable. The line search minimizes along the direction (i).

At step 250, the present invention performs the above discussed line search along the current direction (e.g., direction(0) for the first pass and direction(i) for all subsequent passes) through the smoothed MOF to determine new values for the variables of the MOF, e.g., the (x, y) coordinate placement of the cells and the size of the netlist elements.

At step 252 of FIG. 7, iteration through CG process 210 continues until some stopping point is reached. Within the preferred embodiment, there are three stopping criteria. One stopping point is after a predetermined number (e.g., i=large) of iterations have passed. A second stopping point is that the line search function is not moving very much. A third stopping point is convergence of the function, e.g., the optimized value is not changing very much over the iterations. If a stopping point is not reached, then step 242 is entered for the next pass and the pass counter, i, is incremented. At step 254, a particular solution, e.g., (x, y) coordinate placement and cell size, is returned as based on the inputs received at 240. Therefore, within process 210, optimization is performed along the direction(i), a new gradient is computed and these are performed in iteration until convergence.

To compute the beta value used in equation (5), the preferred embodiment uses the Polak-Rebiere update formula. This process is shown below:

$$\text{beta} = \frac{({}^*g(i) \times [{}^*g(i) - {}^*g(i-1)]}{[{}^*g(i-1) \times {}^*g(i-1)]} \tag{6}$$

where *g(i) is the gradient of the current pass, i, and *g(i−1) is the gradient of the previous pass, i−1. The "x" operator in equation (6) is a dot product operator and represents the function:

$$V1 \times V2 = \Sigma V1[i] V2[i]$$

where V1 and V2 are both vector quantities. Beta is therefore updated for each pass through the CG process 210. Other update formulas are known and can be used by the present invention in place of the Polak-Rebiere process. For instance, the present invention can use the Fletcher-Reeves process, see "Numerical Recipes in C," by William Press, Brian Flannery, Saul Teukolsky, William Vetterling, Cambridge University Press, Cambridge, 1990, ISBN 0-521-35465, pages 320, or the Hestenes-Stiefel process can be used, see "Linear and Nonlinear Programming," by Stephen Nash, Ariela Sofe, McGraw-Hill Companies, Inc., New York, 1996, ISBN 0-07-046065-5, page 399.

Using numeric analysis terminology, the CG process 210 converges rapidly to the global minimum of the function, f, if f is a quadratic form with the well known positive semi-definite Hessian, H, and if H has no negative eigenvalues. As recognized by the present invention, if the function f to be minimized is not a quadratic form, but it is "smoothed" enough, then it can still be locally approximated by a quadratic form and the convergence theory for quadratic forms still holds approximately. Therefore, the present invention smoothes the MOF function in order to ensure faster convergence, to make non-differentiable points differentiable, to handle constraints, and to partially neutralize the effect of local minima.

Figure 9A:
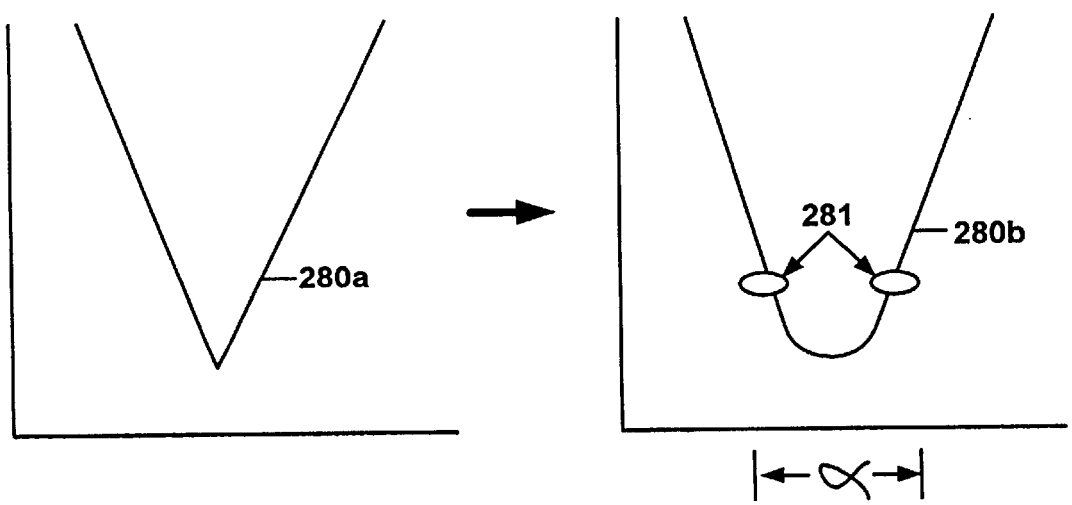
FIG. 9A, FIG. 9B and FIG. 9C respectively illustrate the results of smoothing for a non-differentiable function, a constraint and a function having local minima.
Figure 9B:
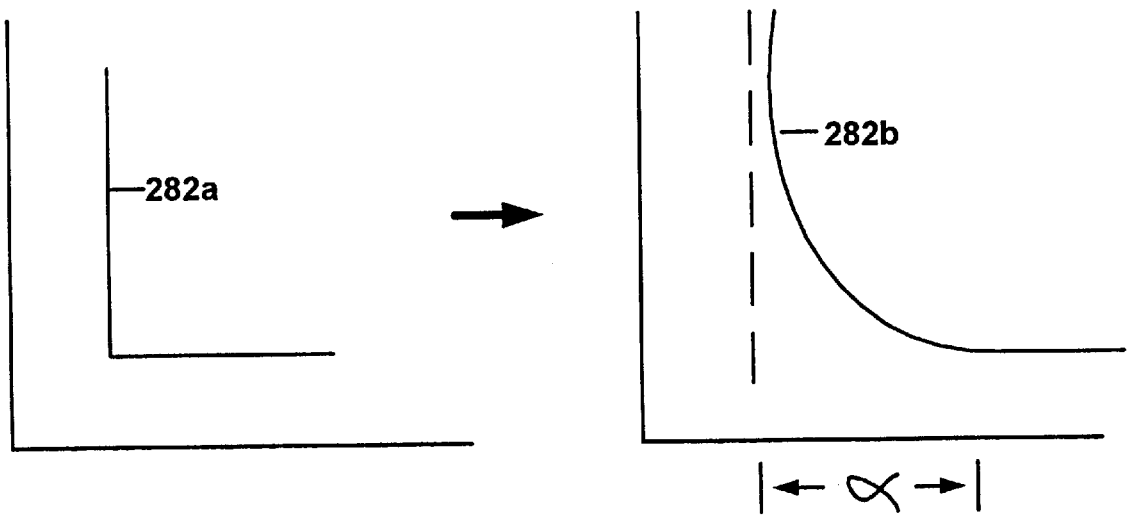
Figure 9C:
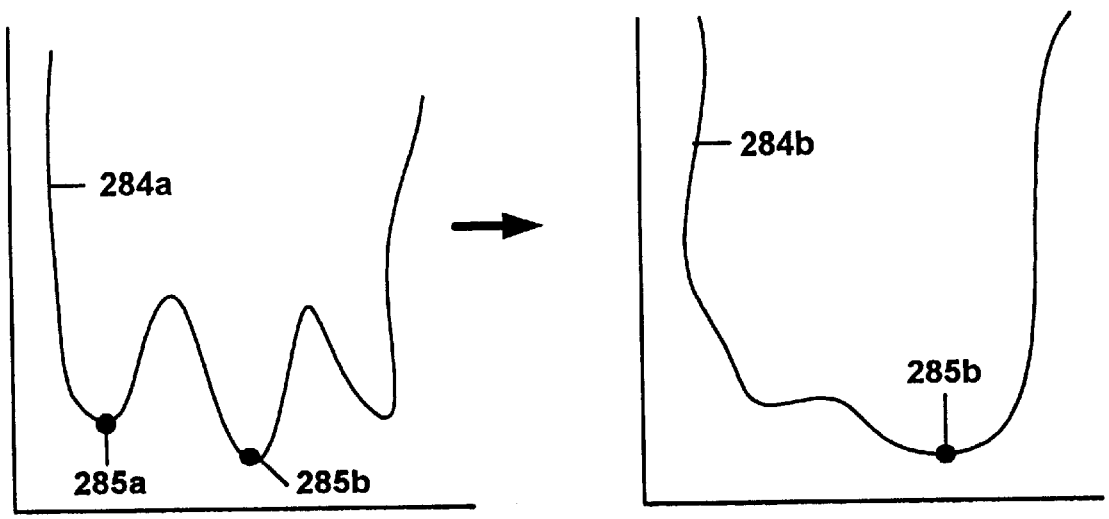

FIGS. 9A, 9B and 9C illustrate these effects pictorially. A non-differentiable function 280a such as f(x)=abs(x) can be made differentiable by rounding the corner, as shown in function 280b of FIG. 9A. This can be accomplished by low-pass filtering the function 280a or by smoothing, e.g., by patching a parabola on the corner. The patched parabola matches the function value and function slope at the patch points 281. The parabola has half-width equal to the alpha value. The smooth-length, alpha, specifies the resolution of smoothing or low-pass filtering of the function. With respect to FIG. 9B, the constraint x>=0 can be implemented as a penalty function or a barrier function, see "Linear and Nonlinear Programming," second edition, by David Luenberger, Addison-Wesley Publishing, Reading, Mass., 1989, ISBN 0-201-15794-2, pages 365–378. For example, to implement a penalty function consider the penalty function below:

$$\text{penalty } (x, alpha) = \begin{array}{l} 0, \text{ if } x \geq 0 \\ \text{or} \\ (x/alpha)^2, \text{ if } x < 0 \end{array} \quad (7)$$

Adding penalty(x) into the MOF, with an appropriate weight, causes the constraint to be respected in the optimization. Again, alpha is the smooth-length and specifies the amount of resolution of smoothing or low-pass filtering of the constraint. Smoothing or low-pass filtering the components of the MOF usually also has the beneficial effect of smoothing out local minima, thereby helping the optimization process of the present invention escape local minima 285a and converge toward a global minimum 285b as shown in FIG. 9C.

The following describes the manner in which the smooth-length, alpha, is selected in accordance with the present invention. A large alpha gives the beneficial effects of fast convergence because it makes the function f closer to parabolic, rounds better any non-differentiable points and constraints and helps the optimization process of the present invention escape local minima. However, larger alpha gives poor function accuracy. A small alpha gives good function accuracy, but slow convergence and a strong tendency to trap in bad local minima. The preferred embodiment gets the best of both possibilities by making many optimization passes, each with successively smaller smooth lengths.

FIG. 8 illustrates the coarse placement ("optimization") process 300 performed by the present invention. Optimization process 300 is implemented as instruction code stored within computer readable memory units of system 112. Process 300 calls the CG process 210 through multiple iterations, each time using a different value of alpha. On each call, process 210 generates a new solution. Each new solution is determined based on the solution of the prior call of process 210. Generally, the first pass through optimization process 300 uses an alpha value that is large enough to get the advantages of a large smooth-length (as discussed above). The last pass through process 300 uses a smooth-length alpha small enough to get the advantages of small smooth length (as discussed above). On each subsequent pass, the value of alpha is reduced by a predetermined amount (e.g., divided in half. The result of each optimization is used as the starting point for the next optimization.

At step 260 of the optimization process 300, the present invention receives a circuit design netlist having an initial placement in (x, y) coordinates and an initial cell size. Based on these values, a solution is defined to contain the initial values. At step 262, the optimization process 300 sets an initial value for the smooth length variable, alpha. At the first pass through, the initial value is large, representing a large amount of smoothing character for the MOF. The preferred embodiment uses CG process 210 to minimize the smoothed MOF. At step 210, the CG process of FIG. 7 is called to determine a solution of the smoothed MOF based on the initial values of step 260 and the current value of alpha. Process 210 outputs a new solution 215 (see also FIG. 6) that includes cell size and a new placement, e.g., (x, y) coordinates for each cell.

With respect to the weight variables, wb, wd, wL, wT and wp, of the MOF, equation (3) above, the weights related to constraints wb and wd are changed between CG optimization passes in the preferred embodiment. More specifically, the weights, wb and wd, are low on the start passes and become higher on each pass. On the last pass, they become quite high.

At step 266 of FIG. 8, the current solution is set equal to the new solution as output from process 210. At step 268, the alpha value is updated to decrease its size. In one embodiment, the alpha value is divided in half as shown. At step 270, if alpha is sufficiently small, then step 272 is entered and iteration stops. However, if alpha is not sufficiently small, then process 210 is entered again with the new alpha. On each subsequent pass through process 210, a new alpha is given and the current solution (e.g., the solution from the previous pass through process 300 ) is used as a starting point for the CG process 210. At step 272, the final solution from optimization 300 is output for use. This solution typically includes a final placement in (x, y) coordinates and cell size information.

Figure 10A:
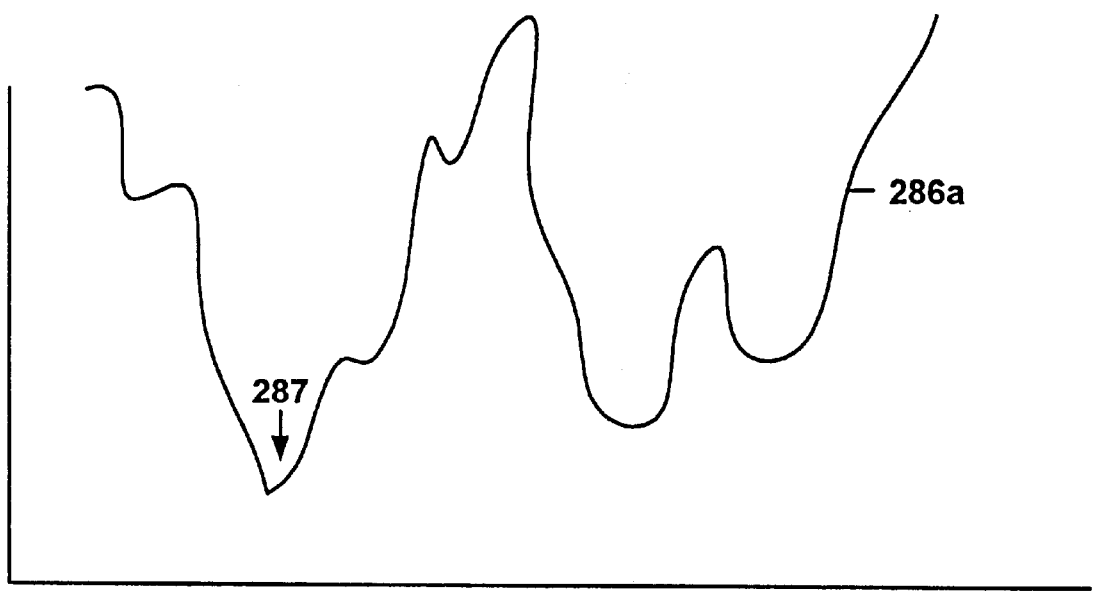
FIG. 10A illustrates an exemplary MOF and FIG. 10B, FIG. 10C and FIG. 10D illustrate results from smoothing and applying the conjugate gradient method for different values of alpha.
Figure 10B:
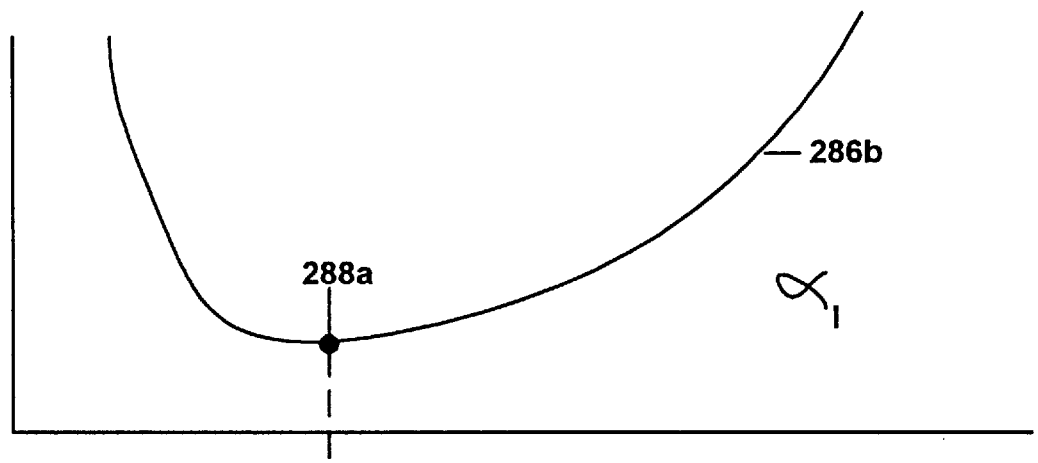

FIGS. 10A–10D illustrate an example of an MOF being optimized by the optimization process 300 of the present invention. FIG. 10A illustrates an exemplary MOF 286a having at least one non-differentiable location 287 (that is also the global minima) and also having several local minima. On the first pass through optimization process 300, alpha1 is high and the resulting smoothed MOF 286b is shown in FIG. 10B. The CG process 210 determines that point 288a is the minima of the smoothed MOF 286b. It is appreciated that the CG process 210 avoided the local minima due to the large alpha1 value. Smoothing also allowed point 287 to become differentiable.

Figure 10C:
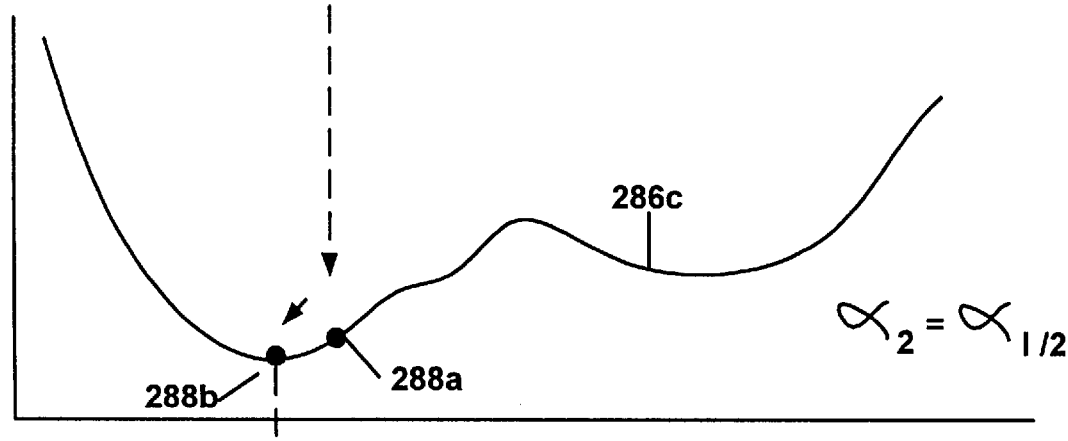
Figure 10D:
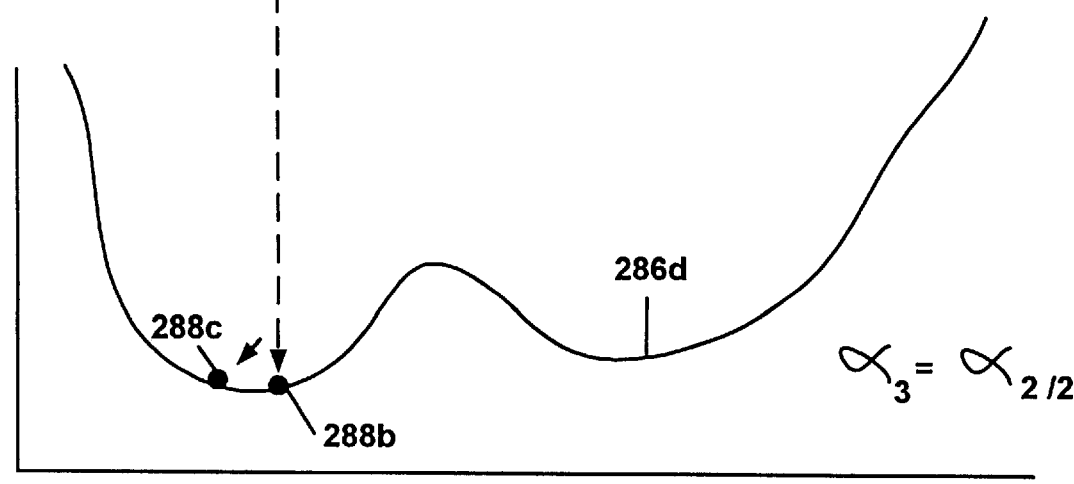

FIG. 10C illustrates the result on a second pass through optimization process 300 resulting in a smoothed MOF 286c based on alpha2, which is half of alpha1. Less smoothing is performed and the CG process 210 uses, as a starting point, the minima 288a as determined from the previous pass and generates a new solution 288b (closer to the true global minima 287). The CG process 210 uses the gradient function to determine a new search direction to locate the new minima 288b. Again, FIG. 10D illustrates the result on a third pass through optimization process 300 resulting in a smoothed MOF 286d based on alpha3, which is half of alpha2. Even less smoothing is performed and the CG process 210 uses, as a starting point, the minima 288b as determined from the previous pass and generates a new solution 288c (closer to the true global minima 287).

Although process 300 can be implemented using a variety of methods and instructions, an example pseudo-code is shown below:

```
main300().
{
    solution <- initial_value;
    for (alpha = large; alpha >= small; alpha *= ½)
    {
        start_solution <- solution;
        solution <- cg_optimize (start_solution, alpha);
    }
}
``` where cg_optimize is process 210 and solution is the placement and/or size result as discussed above.

In one embodiment, the power and timing metrics can be excluded from the MOF and the resulting program optimizes only for wire-length. All variables except (x, y) coordinates can be excluded, and the resulting program optimizes only cell placement and not cell size, buffer insertion, and timing-driven structuring. In this alternative embodiment, the solution does not include cell size information.

The preferred embodiment optimizes wire length and timing metrics shown in the MOF, equation (3), using placement, sizing, and buffering variables. Consequently, the preferred embodiment can trade off wire length, and circuit timing using cell position, cell size, and buffer insertion as variables. The preferred embodiment is free to choose whether to use placement, sizing, or buffering or a combination to fix timing problems.

Functional Parts of the MOF

In what follows, the functions are described in detail that are used to implement the various pieces of the MOF. When describing the function, it is assumed that the rules of symbolic differentiation from calculus (the chain rule, etc.) are used to find the gradient, *g, of the function. Of course, the present invention has both a subroutine to compute the function and a subroutine to compute the gradient because the CG process 210, as described above, requires both the function and its gradient. Therefore, within the discussion to follow, where the gradient of a function is not well known, the function's gradient is described in detail.

A. Wire Length Objective of MOF

The MOF, equation (3) above, includes the following functional portion:

$$wL * wire\_len(*vars)$$

where *vars includes at least (x, y) coordinates of cells, pins for cell placement The wire length and routibility of the chip is known exactly only after the chip is placed and the automatic router has finished. Wire length and routibility depends not only on the cell placement, but also on the technology details of the chip and the details of the routing software. It is necessary to estimate wire length and/or routibility in the placer and these estimates are necessarily approximate.

Figure 11:
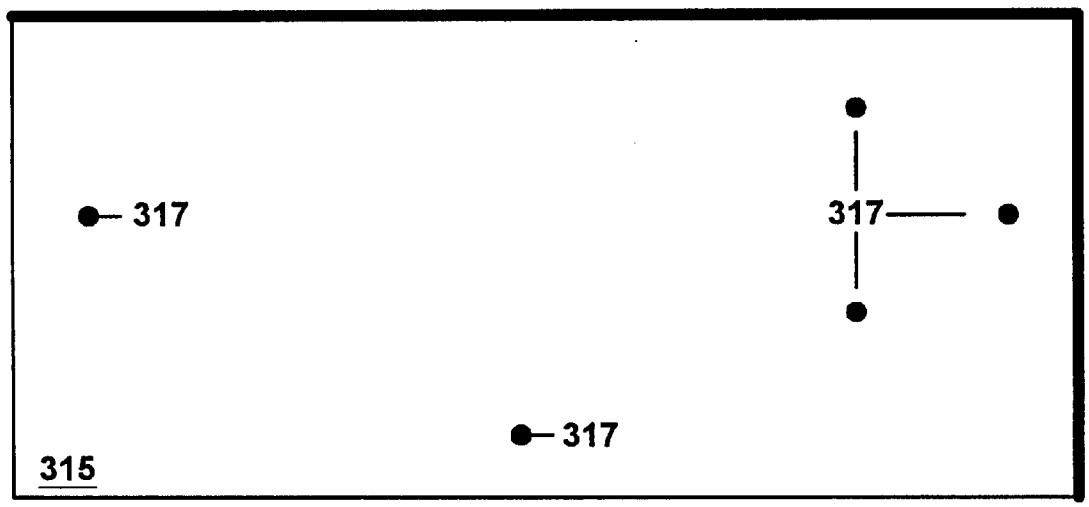
FIG. 11 illustrates a half-perimeter of a smallest rectangle that encompasses a set of coupled pins (also called a net).

The preferred embodiment assumes that better wire length gives better routibility, and therefore does not attempt to measure routibility directly. The preferred embodiment computes the total wire length as a weighted sum of net wire lengths. A net is a set of pins that are connected by a wire. FIG. 11 illustrates a set of pins 317 that are within a net. A net wire length is computed as the half-perimeter 315 of the smallest rectangle that encloses all the pins on the net as shown in FIG. 11. The total wire length is computed according to the below relationship:

$$wire\_len\_total\_ = \sum_{nets} wire\_len(net) \times net\_weight \quad (8)$$

where nets are the number of nets in the netlist design and wire_len(net) represents the half perimeter of a particular net and net_weight is the length weight, wL, described above. Total wire length is part of the MOF as shown above.

In accordance with the present invention, the half-perimeter for a particular net, or wire_len(net), is computed by the below equation:

$$wire\_len(net) = \max_{pins}(pin.x, alpha) - \quad (9)$$

$$\min_{pins}(pin.x, alpha) +$$

$$\max_{pins}(pin.y, alpha) - \min_{pins}(pin.y, alpha)$$

where max( ) determines the maximum coordinate of the coordinates of the pins of the net and min( ) determines the minimum coordinate of the coordinates of the pins of a net.

Standard min and max functions are not differentiable, therefore, in accordance with the present invention, they are smoothed according to the relationships described to follow. The preferred embodiment implements the smoothed min and max functions as shown below, introducing alpha into each relationship. Alpha is the smooth-length mentioned above. The maximums are determined by:

$$\max_i(x_i, alpha) = log\_sum\_exp_i(x_i, alpha) \quad (10a)$$

$$\max_i(y_i, alpha) = log\_sum\_exp_i(y_i, alpha) \quad (10b)$$

The minimums are determined by:

$$\min_i(x_i, alpha) = log\_sum\_exp_i(x_i, -alpha) \quad (11a)$$

$$\min_i(y_i, alpha) = log\_sum\_exp_i(y_i, -alpha) \quad (11b)$$

This "log_sum_exp" implementation of smoothed min and max is used in other parts of the preferred embodiment as well and is determined according to:

$$log\_sum\_exp_i(x_i, alpha) = alpha \times \log\left[\sum_i e^{(xi/alpha)}\right] \quad (12a)$$

$$log\_sum\_exp_i(y_i, alpha) = alpha \times \log\left[\sum_i e^{(yi/alpha)}\right] \quad (12b)$$

The derivative of the log_sum_exp function with respect to an input is used in the gradients of functions involving log_sum_exp( ). The derivative of the log_sum_exp function with respect to a variable is shown in FIG. 12A, where j represents the total pins of a particular net and i represents a particular pin. An analogous relationship exists for y.

The gradient, *g, of the wire length is the vector of partial derivatives of wire length with respect to each x and y coordinate of each cell. The partial derivative of the wire length with respect to an x coordinate of a cell is the sum of the partial derivatives of individual net lengths with respect to the x coordinate of a cell for all nets which include a pin from that cell. Similarly, for the y coordinate of a cell, the partial derivative of the wire length with respect to a y coordinate of a cell is the sum of the partial derivatives of individual net lengths with respect to the y coordinate of a cell for all nets which include a pin from that cell. The partial derivative of an individual net length with respect to the particular x coordinate of a cell is shown in FIG. 12B. This is the gradient with respect to a particular x. An analogous relationship exists for the partial derivative of an individual net length with respect to the y coordinate of a cell. This would be the gradient with respect to a particular y. The preferred embodiment of the present invention uses, by default, wire weights which depend on the number of pins in the net as shown below:

$$\text{wire\_weight or "net\_weight"} = \text{square\_root (number of pins)} + 1 \quad (13)$$

The preferred embodiment allows the user to input wire weights which are multiplied by the default weights to give the final wire weights. Other wire length metrics are possible, including the quadratic metrics.

It is also possible to directly estimate the routibility and use this routibility estimate to drive the placer instead of wire length. This can be performed in one embodiment of the present invention. One method is the cut metric. A set of horizontal and vertical cut lines are selected and the number of wires of a placement that cuts these lines are counted. These counts are used to compute the final metric. One way is to sum the squares of the counts. Another way is to consider only the cut-counts that are larger than a max count or cut capacity. The amount of over-capacity can be squared and summed for all cuts. Other similar methods are possible.

The preferred embodiment wire-length objective is convex. It is appreciated that convexity is a sufficient condition for global convergence of an optimization.

B. Boundary Objective of MOF

The MOF, equation (3) above, includes the following functional portion related to the boundary or "barrier" objective:

$$wb*\text{barrier}(*\text{vars})$$

where *vars includes at least (x, y) coordinates of cells, pins for cell placement The boundary objective ensures that during optimization process 300 all cells are placed on the chip area and not off the chip area. The preferred embodiment uses penalty functions (see equation above 7) to keep cells on the chip. The penalty function of equation 7 includes smoothing and accepts alpha as an input. In accordance with the present invention, the penalty function implements the constraint shown below:

$$\text{chip\_left\_edge\_}x <= \text{cell\_}x <= \text{chip\_right\_edge\_}x \quad (14a)$$

$$\text{chip\_bottom\_edge\_}y <= \text{cell\_}y <= \text{chip\_top\_edge\_}y \quad (14b)$$

where chip_left_edge_x is the left coordinate (x) edge of the substrate area of the chip, chip_right_edge_x is the right coordinate (x) edge, chip_bottom_edge_y is the bottom coordinate (y) edge and chip_top_edge_y is the top coordinate (y) edge, cell_x and cell_are the (x, y) coordinates of an arbitrary cell in the netlist design. It is also possible to use barrier functions to implement these constraints, see "Linear and Nonlinear Programming", second edition, by David Luenberger, Addison-Wesley Publishing, Reading, Mass., 1989, ISBN 0-201-15794-2, pages 365–378.

Similarly, the preferred embodiment uses penalty functions to implement minimum and maximum sizes for cells. Barrier functions could be used instead. All of these metrics are convex. More particularly, there are four penalty terms for each cell and, within the boundary objective, each of these four terms are summed up for all cells of the netlist. The penalty function, pen(x), that can be used is shown above as equation 7. Assuming the bottom edge (chip_bottom_edge_y) is be, the top edge (chip_top_edge_y) is te, the left edge (chip_left_edge_x) is le and the right edge (chip_left_edge_x) is re, the following penalty terms are used for a given cell(i):

$$\text{penalty\_total\_for\_cell}(i) = \text{pen}(x_i\text{-}le, \text{ alpha}) + \text{pen}(re\text{-}x_i, \text{ alpha}) + \text{pen}(y_i\text{-}be, \text{ alpha}) + \text{pen}(te\text{-}y_i, \text{ alpha}) \quad (15)$$

Therefore, the total penalty for all cells of the netlist is then expressed as the penalty summation over all cells or:

$$\text{penalty\_total} = \sum_{all\ cells} \text{penalty\_total\_for\_cell}(i) \quad (16)$$

It is appreciated that the weight value, wb, can be applied to the total summation of the penalty function to arrive at the result as shown below:

$$\text{penalty\_total} = wb \sum_{all\ cells} \text{penalty\_total\_for\_cell}(i) \quad (17a)$$

Alternatively, each cell can be assigned its own weight value and then the individual products are summed over the entire netlist to arrive at the penalty total as shown below:

$$\text{penalty\_total} = \sum_{all\ cells} wb(i) * \text{penalty\_total\_for\_cell}(i) \quad (17b)$$

It is appreciated further that the gradient, *g, of the penalty total, can readily be determined by performing partial derivatives of the above penalty function. CG process 210 uses this gradient.

C. Density Objective of MOF

The MOF, equation (3) above, includes the following functional portion related to the density of cell distribution within the chip:

$$wd*\text{density}(*\text{vars})$$

where *vars includes at least (x, y) coordinates of cells, pins for cell placement The density metric of the present invention measures how evenly the cells are spread across the chip area. Including the density metric in the MOF places a penalty on uneven distribution of cells and thereby forces the optimization to spread cells evenly across the chip. Without a density objective, the wire length objective would tend to place all cells in a bunch, thereby making routing difficult or impossible to complete. In other words, most other metrics, such as wire-length and timing, tend to pull cells in toward the center of the chip. Therefore, the density metric is an important part of the MOF of the present invention.

The density metric is fundamentally not convex. Consider that the equal-weighted convex combination of all well-spread placements is the placement with all cells in the center of the chip. This is not well spread and what is desired is the density metric to heavily penalize it, but simultaneously allow all well-spread placements. The goal in the design of the density metric function in the present invention is to limit the damage inflicted by the necessary non-convexity.

The preferred embodiment uses a density function that assigns a contribution or influence of each cell to a set of neighboring grid points. The grid points are assigned over the entire area of the chip. By varying the degree or distance of influence each particular cell has within the chip area, the present invention is able to mathematically "blur" the cell positions to different degrees. Within the present invention, different amounts of blurring take place through different iterations of the CG process 210, with the larger amount of blurring taking place at the start and lesser degrees taking place at the final iterations. The discussion below illustrates the manner in which a grid field is designed within the present invention, the way in which influence or "potential" is assigned to a set of neighboring grid points for a particular cell and the manner which these potentials are accumulated for all cells of a netlist and then used to arrive at a final density value. The purpose of the density objective is to evenly distribute the cells over the chip area and to place a penalty on uneven distributions. This is accomplished using a density function is that fast to compute, continuous and differentiable.

Figure 13A:
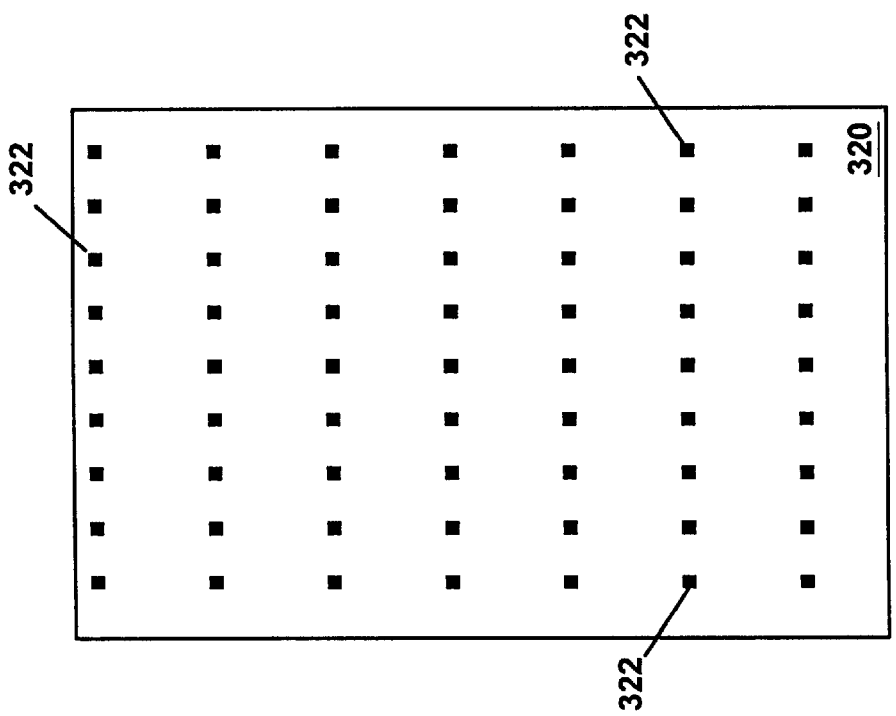
FIG. 13A is an illustration of a set of grid points within a chip boundary used in the density objective portion of the MOF of the present invention.

FIG. 13A illustrates an exemplary chip area 320 that is filled with discrete grid points 322 that form a grid field within the chip 320. Each grid point 322 is evenly spaced from neighboring grid points as shown in FIG. 13A. The number of grid points selected impacts the speed of computation of the density function. Within discussions herein, a particular grid point is indicated by (i) and the total number of grid points within a chip 320 is (j).

As described in more detail below, for a given cell of the netlist, the present invention functions to assign potential to a particular grid point based on (1) the grid point's distance from the cell, measured in (x, y), and also (2) based on a global variable, radius. A "potential function" relates these values. Radius indicates the level or distance of influence each cell has on its neighboring grid points. The larger the value of radius, the larger is each cell's distance of influence. These are described in more detail below.

Figure 13B:
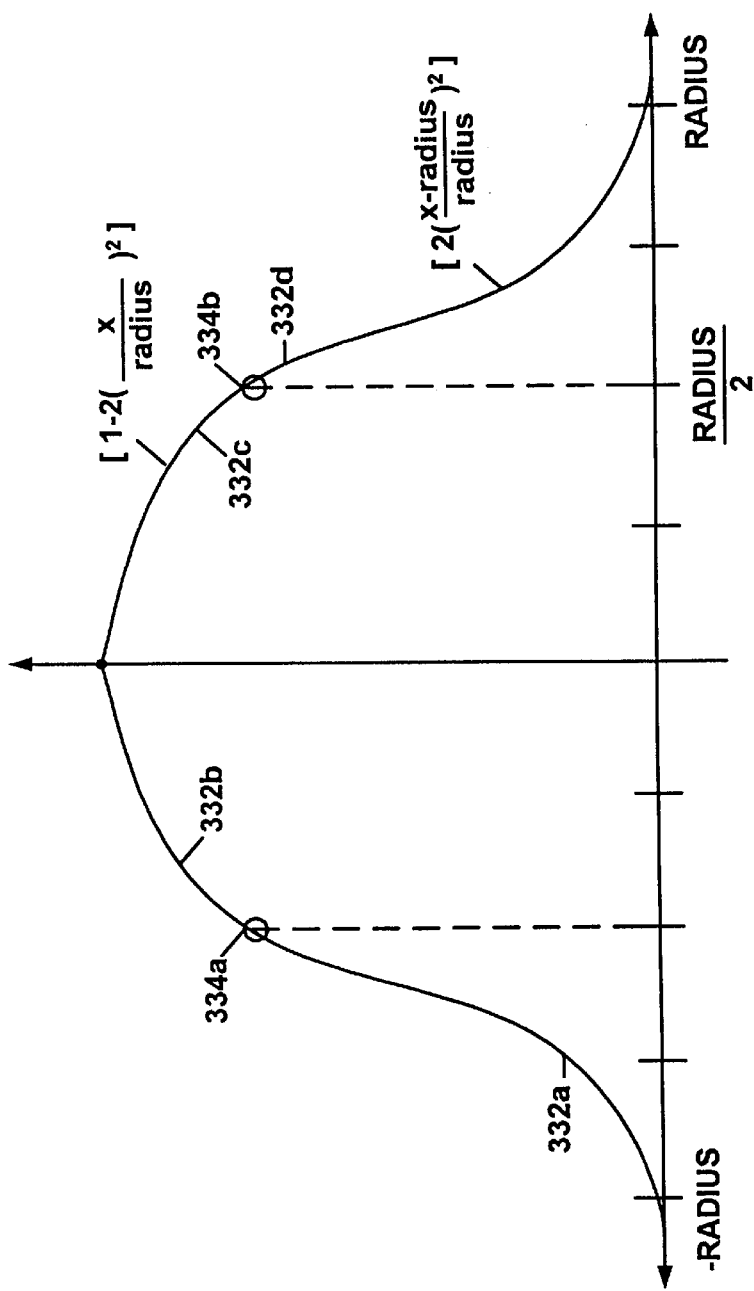
FIG. 13B is a function illustrating the different portions of the potential function used to assign potential values to individual grid points measuring the coverage or influence of a netlist cells.

FIG. 13B illustrates the potential function 330 used in one embodiment of the present invention. Each cell is surrounded by a potential function. A cell's potential function has values for all (x, y) points in space. The potential falls off with the distance from the cell, and becomes 0 at a distance from the cell called the radius of the potential function. The integral of a cell's potential function over all space equals the area of the cell. Potential functions from all cells are summed over the chip area. If cells are spread well, the "actual" summed potential of the grid points 322 will have the same value everywhere. The "expected" summed potential is equal to the sum of cell areas divided by the chip area and is the ideal result for a uniform distribution objective. The potential of a grid point (from a single cell) is based on an (x, y) coordinate and radius, but as shown below, can be broken down into separate terms of potential_x that each rely on only one coordinate value and radius:

$$\text{potential}(x, y, \text{radius}) = \text{potential\_}x(x, \text{radius}) * \text{potential\_}x(y, \text{radius}) \quad (18)$$

To determine the actual summed potential for a given grid point, the potentials from all cells to that grid point are added up.

Referring to FIG. 13B, the potential function 330 is potential_x and is symmetric about the vertical axis. For all x greater than or equal to zero and less than radius/2, the potential_x is shown by 332c. For all x greater than or equal to radius/2 and less than radius, the potential_x is shown by 332d. Potential_x is zero for all x greater than or equal to radius. Function 330 is selected so that points 334a–334b are each continuous and differentiable. Portion 332b corresponds to portion 332c and portion 332a corresponds to portion 332d. This is also represented by the equation below:

$$\text{potential\_}x(x, \text{radius}) = \text{if } (x<0) \text{ then potential}(-x, \text{radius}) \text{ if } (x>= \text{radius}) \text{ then zero if } (0<=x<=\text{radius}/2) \text{ then } [1-2(x/\text{radius})^2] \text{ if } (\text{radius}/2<=x<\text{radius}) \text{ then } [2((x-\text{radius})/\text{radius})^2] \quad (330)$$

Within the potential_x function 330, the entire function is continuous and differentiable. The radius therefore defines an area within which the potential is nonzero between a given grid point and a given cell.

Figure 14:
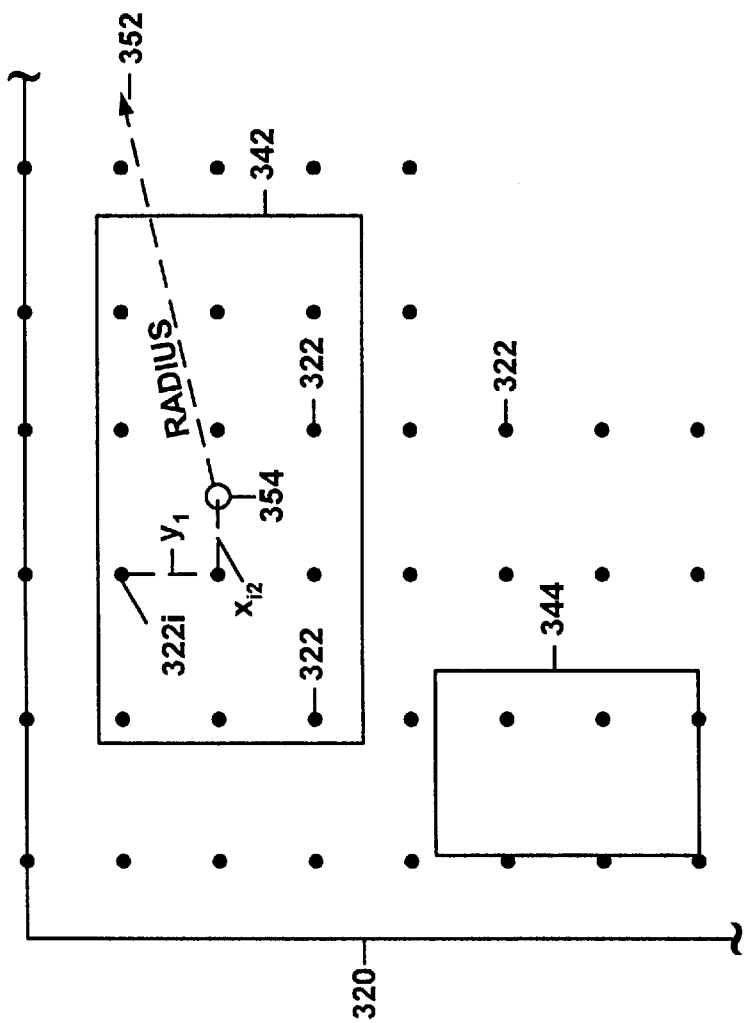
FIG. 14 is a diagram illustrating the mechanism in which potential is assigned to neighboring grid points with respect to a single exemplary cell of the netlist.

FIG. 14 illustrates the mechanism by which the present invention assigns potential values to grid points with respect to a particular cell. It is appreciated that the term "radius" is used herein even though the cell potentials are rectangular in shape. The value of radius is determined according to a formula discussed further below. However, radius is measured in units of grid points (e.g., 0, 1, 2, 3, 4, etc.). FIG. 14 illustrates the upper left corner of an exemplary chip area 320 including an exemplary cell 342 and an exemplary cell 344. A grid field is also shown including grid points 322. Cell 342 has a center 354.

To compute the potentials for each grid point with respect to cell 342 of FIG. 14, the distance (in x, y) of each grid point is measured from the center 354 of cell 342. For instance, the distance in xi and yi are measured between exemplary grid point 322i and center 354. This is done for all grid points that lie within the radius distance from center 354 since grid points that lie outside the radius have zero potential. Therefore, when radius=2, 16 grid points are considered for each cell, e.g., 16 grid points receive a nonzero potential for each cell. When radius=3, 36 grid points are considered for each cell and when radius equals 1, 4 grid points are considered for each cell, etc. The radius is measured from the center 354 of an exemplary grid point 342. In the particular example shown in FIG. 14, radius=3 and applies to all cells for a given iteration of the CG process 210. To determine the potential for grid point 322i with respect to cell 342, the below equation (18) is used:

$$\text{potential}322i(xi, yi, \text{radius}) = \text{potential\_}x(xi, \text{radius}) * \text{potential\_}x(yi, \text{radius})$$

Where the values, xi and yi, are measured between the (x, y) coordinates of exemplary grid point 322i and the center 354 of the cell. After the potentials are computed for each pertinent grid point with respect to cell 342, the same is done for cell 344. Potentials for the grid points are accumulated.

As discussed above, the size of each cell is known before optimization process 300 is executed and the total number of grid points, j, is also known. Therefore, the exact summation of potential for each grid point (also called the "average summed potential" or "average_potential") can be computed by dividing the total cell area by the number of grid point, j. After the potentials are computed for the grid points over all cells (the "summed_potential"), the present invention computes the density metric as the sum-of-squared deviations of the summed potential, for each grid point, from the average potential for each grid point. This is a two-sided penalty and for a given grid point its penalty is expressed as:

$$\text{penalty\_for\_grid\_point} = (\text{summed\_potential} - \text{average\_potential})^2 \qquad (19)$$

The total penalty is then the summation of the penalties for each grid point over all of the grid points, j, or:

$$\text{total\_penalty} = \sum_{j=\text{all grid points}} \text{penalty\_for\_grid\_point}(i) \qquad (20)$$

In an alternative embodiment, it is also possible to use a 1-sided penalty function, where too much is penalized but having too little is not, such a 1-sided penalty function is shown below:

$$\text{penalty\_for\_grid\_point} = \text{if (summed\_potential} > \text{average\_potential) then (summed\_potential} - \text{average\_potential})^2 \text{ else, then zero} \qquad (21)$$

This penalty function sums squared positive deviations, but ignores negative deviations. It is appreciated that equation (21) can be used in place equation (19) in the computation of total_penalty, equation (20). Non-quadratic penalty functions are also possible.

The preferred embodiment uses a potential grid of floating-point numbers to store the summed potential, as discussed above. This an approximation to the ideal of summing potential functions everywhere in space. Therefore, the finer the grid, the better the approximation. As discussed above, the preferred embodiment uses equation 330 for the cell potential function. The preferred embodiment density function can be computed in O(N) time, where N is the number of cells, because each cell is summed into only a small number of potential grid points. The value O representing some time constant. Therefore, in accordance with the present invention, the computation time advantageously does not grow quadratically for an increase in cell number.

The radius value is computed according to the following method. The density objective has a number of free parameters including the number of grid points and the size of the radius. The grid_len is the distance between grid points (e.g., in microns) and the grid_len times the number of grid points (along one dimension of the chip) yields the dimension of the chip (e.g., in microns). The radius times the grid_len yields the scope of influence of a given cell in units of distance of the dimension of the chip (e.g., microns). Within the present invention, a relationship between alpha and radius exists as shown below:

$$\text{alpha} = \text{radius} \times \text{grid\_len} \qquad (22)$$

A tradeoff exists within the density objective between radius and the grid_len. As radius increases, grid_len decreases and more grid points enter into the computation for the influence of a given cell. The finer grid increases computation time but decreases artifacts. Although a number of different mechanisms can be used to arrive at adequate radius values, the following is one example used by one embodiment of the present invention. During the first few passes through the CG process 210, (and most of the passes thereafter) the present invention uses a radius=2. The last few passes use a radius=3, and, on the final passes, a radius=4 is used. During these passes, the grid_len is tuned to accommodate the alpha values (which change through each pass of the CG process 210, see FIG. 8, step 268). Under this approach, the finer grid is used on the last passes (e.g., with the lightly smoothed MOF) and the smaller radius values are used on the highly smoothed MOF at the start of the optimization process.

Figure 15:
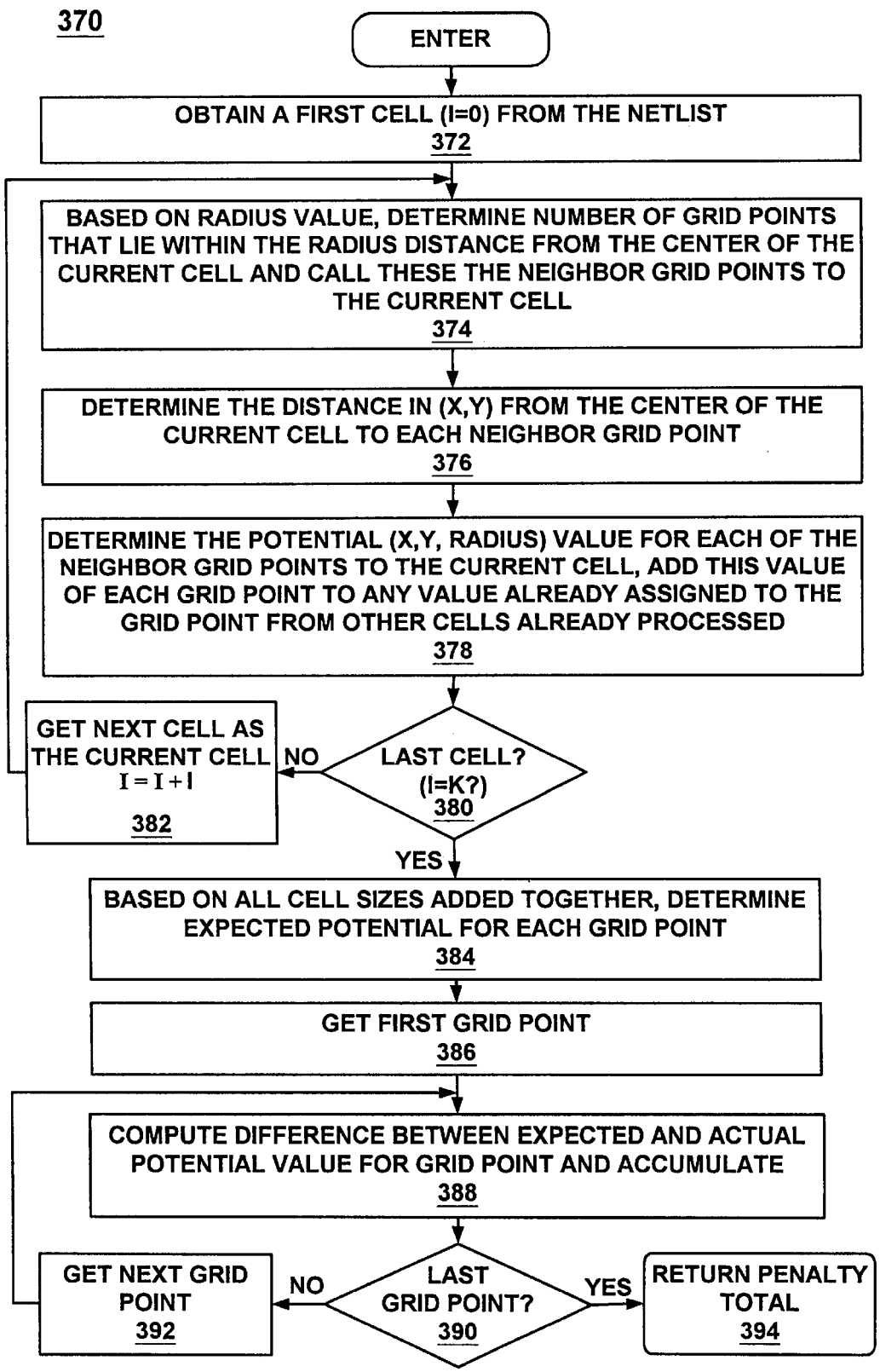
FIG. 15 is a flow diagram illustrating steps performed by the present invention to assign potential values to all grid points (j) of a netlist design taking into consideration all cells.

FIG. 15 is a flow diagram of the computation process 370 of the total_penalty (for a given radius) which utilizes the above concepts together. At step 372 a first cell (l=0) is obtained from the netlist, its center is obtained and a radius is obtained. At step 374, based on the radius, the present invention identifies the number of grid points that lie within the radius of the current cell (e.g., that lie within a radius distance from the cell's center). These are called the current cell's neighbor grid points. At step 376, the present invention determines the (x, y) coordinate distance of each neighbor grid point to the current cell's center.

At step 378, the present invention uses equation (18) above to determine the potential at each neighbor grid point of the current cell. The (x, y) values computed at step 376 and radius are used in this computation. These potential values are added to any potential values already assigned to the neighbor grid points, e.g., from previously processed cells (on the first pass, there are no previously processed cells). The result is the "summed potential" for the grid point. With respect to steps 372–382, k refers to the total number of cells of the netlist. At step 380, if this is not the last cell, then the next cell in the netlist is obtained (l=l+1) and step 374 is entered to compute the pertinent potentials for this new cell. The potentials computed during this loop are called the grid points' summed potentials.

At step 380 of FIG. 15, if all k cells have been processed, then the present invention determines the penalty for each of the j grid points on the chip. At step 384, the present invention determines the average (or "expected") potential for each grid point using the total area of the k cells and the number of grid points, j. At step 386, the first grid point is selected as the current grid point. At step 388, a penalty is determined according to equation (19) above. This involves a function of the difference between the summed potential and the average potential at the current grid point. This value is summed with the previous penalty value obtained from the previous grid point. At step 390, the next grid point is obtained (at 392) and step 388 is entered again to compute the penalty of the next grid point, etc. If the last grid point was processed, then step 394 is entered where the total penalty is returned as an output value.

It is appreciated that based on the above density objective function discussion, the gradient of the density objective function can readily be determined by well known mathematical theorems.

In summary, the preferred embodiment of the present invention utilizes a density objective function that: (1) assigns a penalty to non-uniform distribution of cells; (2) computes the cell density; (3) has a linear increase in computational work for a linear increase in cell number; and (4) is continuous and differentiable.

Gridless Method. A gridless method for the density metric is used in an alternative embodiment of the present invention. In this gridless embodiment, the final density metric is a symbolic integral of the penalty over the chip, for example, FIG. 16A (taking the limit as the number of grid points go to infinity). This integrates the penalty over the entire chip. Using the 2-sided sum-of-squares penalty gives the equation in FIG. 16B. Expanding the squared term and ignoring constant terms (because the optimization does not change with or without the constant terms) and switching the order of the sum and the integrals and noting that the integral is 0 for cells whose potentials do not intersect, gives the equation in FIG. 16C. FIG. 16C illustrates the result summed over all cell pairs (cell1 and cell2) where cell1 does not equal cell2 and cell1's potential intersects cell2's potential. The integral is solved symbolically and then sum the symbolic integral over all pairs of cells that intersect.

It is appreciated that pairs of cells which intersect are found by the present invention using geometric data structures, e.g., a dd-tree as described in journal article entitled "Multidimensional Binary Search Trees Used For Associative Searching," by Jon Bently, appeared in "Communications of the ACM," vol. 18, no 9, September 1975, pages 509–517, or by using a quad-tree as described in a journal article entitled "Quad-trees-A data structure for retrieval on composite keys," by R. Finkel and J. Bently, appeared in "Acta Informatica," vol. 4, no 1–9, 1974, or by other geometry data structure for fast rectangle queries.

D. Timing/Delay Objective of MOF

The MOF, equation (3) above, includes the following functional portion related to the timing of signals within the chip:

$$wT* \ \text{delay}(*vars)$$

where *vars includes at least (x, y) coordinates of cells, pins for cell placement and size of cells and buffers for sizing This is the delay objective function. The present invention in the computation of the delay objective function uses an estimate of the worst path delay through the input netlist as the timing objective. Delay objective function is computed in terms of cell location and size and therefore the optimization process 300 of the present invention can optimize cell size and cell location for timing objectives. It is appreciated that one embodiment of the present invention provides a powerful tool in that cell sizing can be performed during the optimization process of the cell placer 300.

Figure 17:
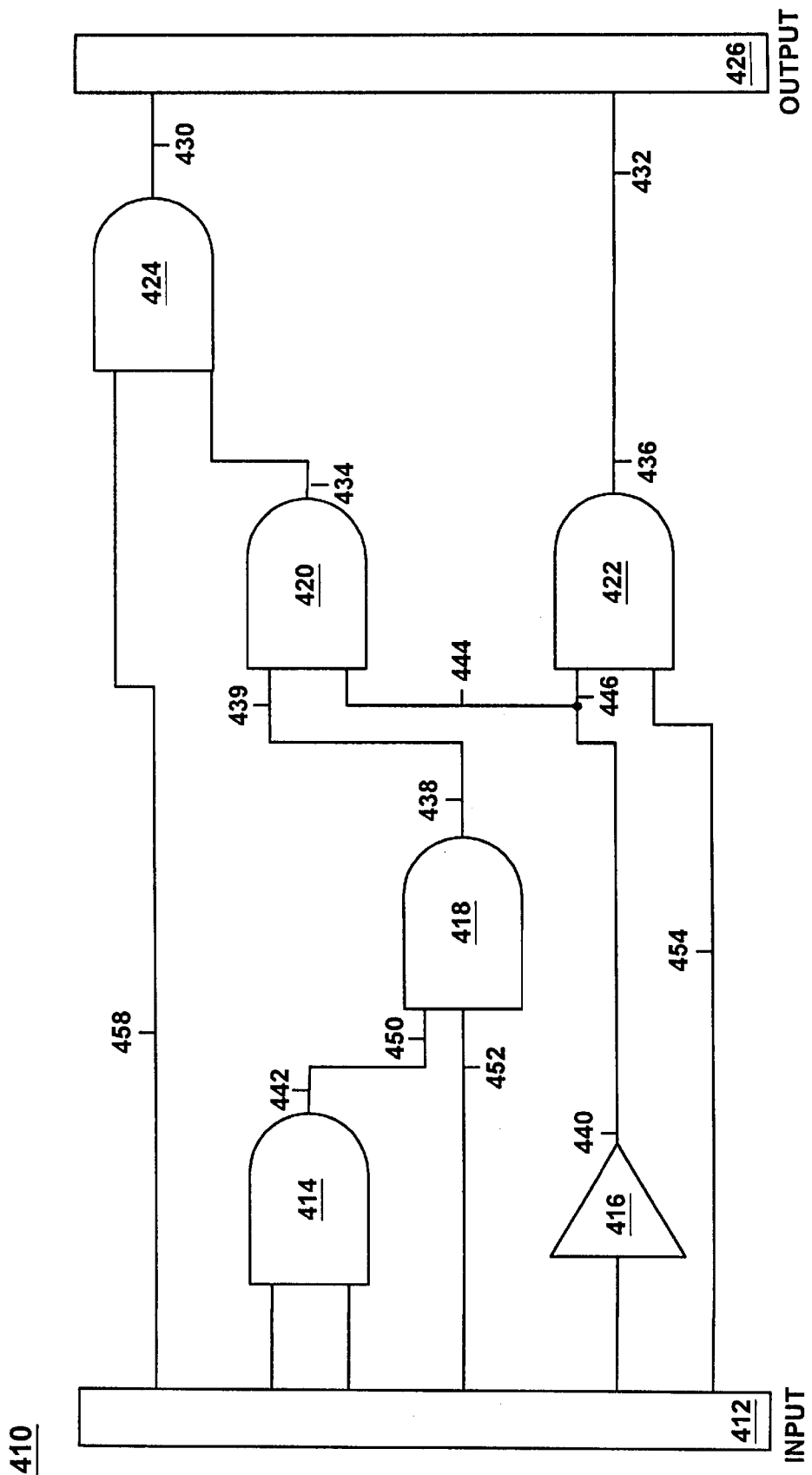
FIG. 17 is a schematic of an exemplary circuit used to describe aspects of the timing/delay objective function in accordance with the present invention.

FIG. 17 illustrates a small and exemplary netlist circuit 410. The circuit contains gates 414–424 coupled between input pins 412 and output pins 426. The timing objective computation is similar in some respects to the timing computation that a static timing analyzer, e.g., see conference paper entitled, "Timing Analysis and Timing Analysis Program," by Robert Hitchcock, appeared in "Proceedings of the 19th Design Automation Conference," 1982, paper 34.2, pages 594–604, uses to compute the worst path delay. It is appreciated that a timing graph can be made from the circuit 410 by replacing each output pin of each gate with a node and replacing each wire (including cell input/output paths) with a timing connection ("arc") between the relevant nodes, as is well known in the art.

To compute the worst path delay of a circuit, the combinatorial logic 410 of FIG. 17 is traversed from timing start points 412, e.g., inputs and register outputs, toward the timing end points 426, e.g., outputs and register inputs via a breadth-first traversal. When two paths reach a gate, the worst timing path is selected to compute the worst path timing for the gate output. Initially, only the worst path delays of the timing start points are known. The worst-path delay of a pin can be computed only when worst path delays of pins immediately preceding it in the timing graph become known. For example, the worst-path delay of output pin 434 can only be determined when the worst-path delays of output pins 438, 440 and input pin 454 are known, because these pins feed into gate 420 which generates output pin 434.

One way to compute the worst path delay of a pin is by using the relationship shown in FIG. 18. Here, the worst_path_delay (of an output pin) is computed as the maximum delay value (of all pins in the timing graph immediately preceding the output pin in question) and the delay for each eligible pin is computed as its delay value plus the stage delay from the pin to the output pin in question. The stage delay is the signal propagation delay ("delay") from an immediately preceding pin to a receiving pin. Techniques to compute stage delay include Asymtotic Waveform Expansion or AWE, see journal article entitled "Asymtotic Waveform Evaluation for Timing Analysis," by Lawrence Pillage, Ronald Rohrer, that appeared in "IEEE Transactions on Computer Aided Design," Vol. 9, No 4, April 1990, pages 352–366 or Elmore-Rubenstein-Penfield, see journal article: "Signal Delay in RC Tree Networks," by Jorge Rubinstein, Paul Penfield, Mark Horowitz, that appeared in "IEEE Transactions on Computer Aided Design," Vol. CAD-2, July 1983, pages 202–211.

The delay objective function of the present invention differs from the classical static timing analyzer in many respects. The delay objective function of the present invention needs to be very fast to compute because it executes thousands of times during the optimization, unlike a static timing analyzer, which generally runs one per query. Static timing analysis requires a max function to be computed whenever timing paths converge (see FIG. 18). The delay objective function of the present invention is continuous and differentiable because it is used in a function which is optimized by the CG process 210. The max function used by the present invention is smoothed to make it differentiable everywhere. In the preferred embodiment, this smoothing is controlled by the smooth-length parameter, alpha, described above. In addition to using a computer process to compute the delay objective function value, the present invention also requires a computer program to compute the gradient of the delay objective function respect to every variable of the optimization.

As shown in FIG. 19A, the preferred embodiment substitutes the log_sum_exp function (equations 12a and 12b) in place of the max function in the worst path delay computation. The resulting expression used by the present invention for computing the worst path delay of a pin is shown in FIG. 19A and the alpha term is introduced with the log_sum_exp function. It is appreciated that in the computation of FIG. 19A, all pins (of the timing graph) that are immediately preceding the out_pin are considered in the log_sum_exp function. It is appreciated that other smoothed max functions are possible.

The preferred embodiment computes the final worst path delay for the circuit according to the equation shown in FIG. 19B which, in combination with the equation of FIG. 19A, is used to implement the delay objective function. According to the delay objective function, the worst_delay is based on the log_sum_exp of the end points of the netlist (e.g., 430 and 432). To locate these values, the equation of FIG. 19A is used on each end point, which requires the prior results of FIG. 19 on each other previous pin in the timing graph. Therefore, in accordance with the present invention, the delay objective function proceeds breadth-first from the start 412 until timing (e.g., "delay") values are known at the end points (e.g., 430 and 432 of FIG. 17). The delay values are then input to the log_sum_exp function (along with alpha) of FIG. 19B to obtain the actual worst delay ("worst_delay") through the circuit 410. The mechanisms used by the present invention to compute stage delay at a point within a circuit (e.g., circuit 410) are described in more detail below, including the mechanisms for modeling the netlist according to number of wire length parameters (R and C) and the methods used to determine the wire length parameters based on the netlist geometry.

Figure 20:
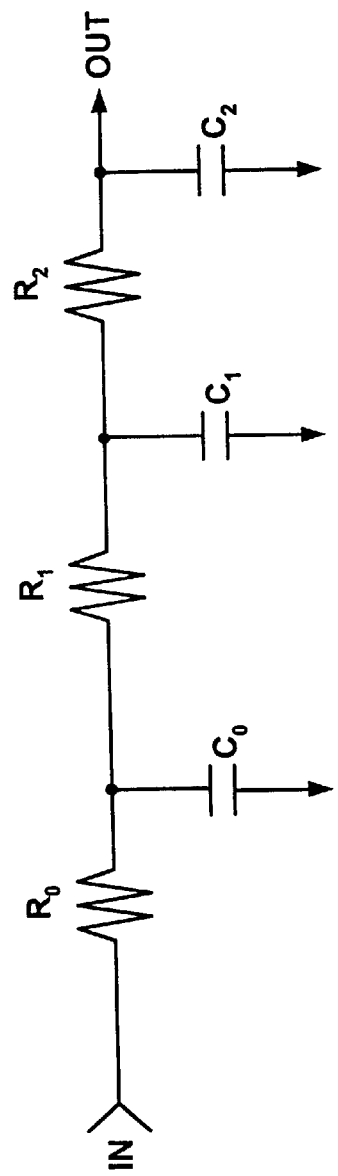
FIG. 20 is a resistor-capacitor pi-network model circuit used by the present invention to describe signal delay.

It is appreciated that the preferred embodiment models a stage as a resistor-capacitor pi-network 460, as shown in FIG. 20. This network 460 is modeled after the Elmore-Rubenstein-Penfield (ERP) formula to compute the stage delay, see journal article entitled "Signal Delay in RC Tree Networks," by Jorge Rubinstein, Paul Penfield, Mark Horowitz, which appeared in "IEEE Transactions on Computer Aided Design," Vol. CAD-2, July 1983, pages 202–211. Circuit 460 contains N-1 stages of resistors (R0–R2) and capacitors (C0–C2) with the capacitors coupled to ground (between the resistors) and the resistors coupled in series between an input and an output. The equation used in the ERP model is shown in FIG. 21 and involves two summations over RiCj products. In this case, the number of stages, N, is 3. This equation is used to model the delay from one point to another point in a circuit.

Figure 22A:
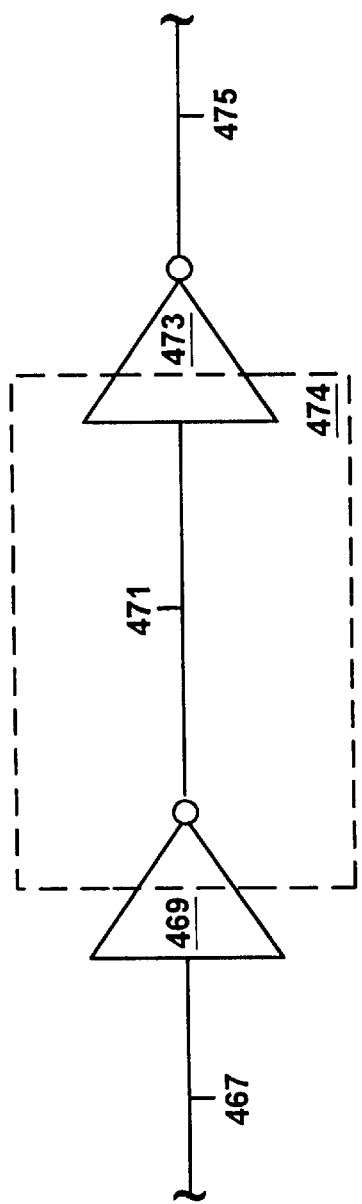
FIG. 22A illustrates an exemplary driver or "output" gate coupled to an exemplary receiver or input gate using a wire length.
Figure 22B:
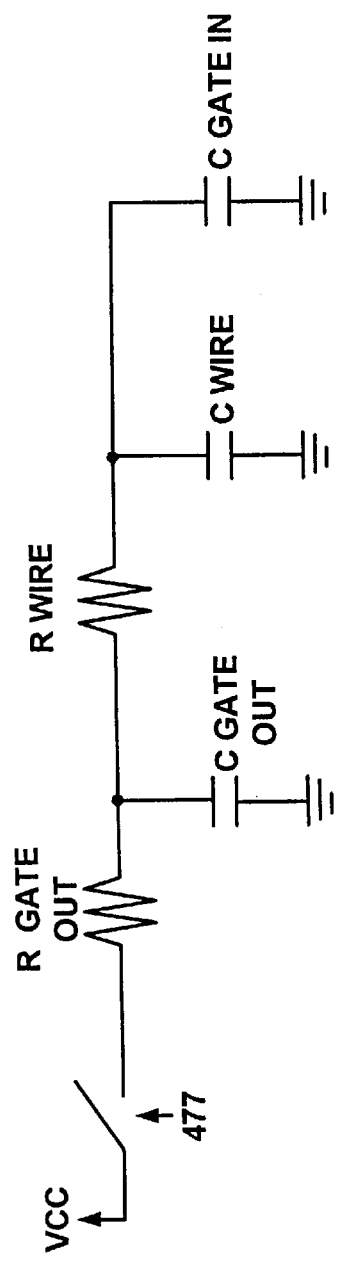
FIG. 22B is a circuit model used by the present invention to model signal delay through the exemplary circuit of FIG. 22A.

FIG. 22A and FIG. 22B illustrate the delay models and computations used to determine the delay through coupled gates in accordance with the present invention. FIG. 22A illustrates a circuit 465a including a driving or output gate 469 coupled to a receiving or input gate 473. Herein, the stage delay refers to the delay associated with the circuit portion of the dashed box 474 including the output circuitry of gate 469 and the input circuitry of gate 473 (and wire 471). Gate 473 drives output 475 and gate 469 receives input at 467. Gate 469 and gate 473 are coupled by wire length 471. As shown by the model 465b of FIG. 22B, the gate output 469 is modeled as a switched voltage source, Vcc, with a drive resistance, Rgateout, and drive capacitance, Cgateoutput. Switch 477 is shown. The wire 471 coupling gates 469 and 473 is modeled as a single resistance, Rwire, and capacitance, Cwire. The input gate 473 is modeled as a single capacitance, Cgatein. The delay through the stage of circuit 465a is determined by the ERP formulation discussed above.

The preferred embodiment uses the following equations to compute the wire parameters, R and C. The value of Rwire of FIG. 22B is determined according to:

$$Rwire = Krwire * Mn \tag{23}$$

where Krwire is a constant and Mn is a length measured as the manhattan distance from the input pin to the output pin.

FIG. 23 illustrates an example circuit 480 including an output gate 484 coupled to input gates 486–490. The manhattan distance is that part of the net 496 that directly couples the gates in question, e.g., the minimum length required of the net 496 to provide the coupling. The resistance, Rwire, between gate 484 and gate 488 is therefore only based on the length of the wire portion within box 494 (exaggerated in width). The manhattan distance is taken to be the half perimeter of box 494 (which also equals the length of the portion of net 496 that is directly coupled between gates 484 and 488).

However, when computing the wire capacitance, Cwire of FIG. 22B, the length of all of the net 496 is considered. The value of Cwire is determined according to:

$$Cwire = Kcwire * Hp \tag{24}$$

where Kcwire is a constant and Hp is a length measured as the half perimeter of the smallest box around the pins of the net between the gates.

FIG. 23 illustrates net 496 coupling gate 484 and gate 488. The smallest box surrounding all pins of the net 496 is shown as box 492. The value of Cwire is therefore computed based on the length of all of the wires of net 492 using the above equation. The values of the constants, Krwire and Kcwire, depend on the chip technology.

The preferred embodiment performs automatic gate sizing by modeling the other parameters of FIG. 22B as linear functions of the gate size. Herein, the gate size refers to the width of the transistors used in the gate logic. Referring to the circuit model 465b of FIG. 22B, the resistance, Rgateout, is related to the gate size according to:

$$Rgateout = (Krout/size\_out\_gate) \tag{25}$$

where size_out_gate is the size of the output gate 469 of FIG. 22A and Krout is a constant that depends on chip technology and the type of gate being modeled. The capacitance, Cgateout is related to the gate size according to:

$$Cgateout = (K1cout * size\_out\_gate) + K2cout \tag{26}$$

where size_out_gate is the size of the output gate 469 of FIG. 22A, K1cout and K2cout (the intercept constant) are both constants that depend on chip technology and the type of gate being modeled. The capacitance Cgatein of FIG. 22B is related to the size of input gate 473 (FIG. 22A) according to:

$$Cgatein = (K1cin * size\_in\_gate) + K2cin \tag{27}$$

where size_in_gate is the size of the input gate 473 of FIG. 22A, K1cin and K2cin (the intercept constant) are both constants that depend on chip technology and the type of gate being modeled. Other functions are possible and, for embodiments of the present invention that do not perform automatic gate sizing, the above R and C values are treated constants which depend on the gate type.

The delay objective function of the present invention is globally convergent in the gate sizes, but not convex. The preferred embodiment uses the transformation equation shown below with respect to gate size.

$$size(i) = e^{v(i)} \tag{28}$$

The above transformation makes the delay objective function convex as a function of the variables, v(i), seen by the conjugate-gradient optimization process 210 of the present invention. Herein, size[i] is the gate size of gate i, and v[i] is the variable seen by the conjugate-gradient process 210 which controls the gate size. By performing the transformation, better convergence is reached of the MOF.

The above discussion outlines the delay objective function (FIG. 19A and FIG. 19B) of the present invention. What follows is a discussion on the determination of the gradient of the delay objective function.

The Gradient of the Delay Objective Function. FIG. 24 illustrates a computer implemented process 510 that is performed according to the preferred embodiment to compute the gradient of the delay objective function. The result of this process 510 is supplied to the CG process 210 described above. This process 510 operates by evaluating the symbolic derivatives numerically. The required symbolic expressions are derived using a massive application of the "chain rule" from calculus:

$$D(f(g(x))) = (Df(g(x)) \times (Dg)(x) \tag{29}$$

The derivation of these symbolic expressions will be detailed below. The process 510 starts at step 512 where a forward breadth-first traversal is performed over the input netlist (e.g., exemplary netlist 410 of FIG. 17). The breadth-first traversal starts from timing start points 412 to timing endpoints 426 and computes the worst path delay at every pin of the netlist 410. Steps 514 and 516 then make a backward breadth-first traversal (from timing end points 426 to timing start points 412) that computes the derivative of the delay objective function with respect to the worst path delay at each pin.

At step 514 of FIG. 24, the preferred embodiment computes the derivative of the delay objective function with respect to the timing endpoint worst path delay (e.g., endpoint_delay$_i$) using the expression obtained by differentiating the MOF and the equation of FIG. 19B (e.g., worst delay objective). This yields the equation of FIG. 25B including a first term representing the partial derivative of the MOF with respect to the circuit delay (which is wT as shown by FIG. 25A) and a second term which is the partial derivative of the worst_delay function with respect to endpoint_delay$_i$. Combining with the equation of FIG. 12A yields the last term of FIG. 25B. This formula is used at step 514 to determine the required derivative formulas for the end points (e.g., 430, 432 which are also referred to herein collectively as 426) of the netlist 410. The required endpoint_delay values can be determined from step 512.

Step 516 of FIG. 24 then operates to compute the derivative of the objective function with respect to the pin worst path delays for each other pin (e.g., those pins that are not end points) in the netlist 410. In order to compute the required partial derivatives for the remainder of the pins, a reverse breadth-first traversal is required. The breadth-first backward traversal is performed using the expression obtained by differentiating the equation of FIG. 19A (e.g., the worst pin delay) giving equation shown in FIG. 26A. Incorporating the equation of FIG. 12A yields the equation shown in FIG. 26B which is used at step 516 for each pin.

At step 516, in order to compute the partial derivative of the MOF with respect to a pin delay, the following process is performed. The process is explained with reference to an example shown in FIG. 17 and the equations of FIG. 26A and FIG. 26B. It is appreciated that the example is shown for one pin and that step 516 performs the subject matter of the example for all pins of the netlist 410 (that are not end points). Assume the derivative is to be computed for pin 440 of FIG. 17, e.g., the output of gate 416. First, all of the fanned-out pins to pin 440 are determined. For step 516, the definition of the fanned-out pins are the outputs of the gate fed by the pin at issue. For pin 440, the fanned-out pins are pins 434 and 436 which are the outputs of gates 420 and 422, respectively.

At step 516, a summation is then performed of terms that are each associated with a fanned-out pin. Each term in the summation includes: (1) the derivative of the MOF with respect to the delay of the fanned-out pin (which should be known as a result of prior operations of step 516 due to the reverse breadth-first traversal process); and (2) a partial derivative with respect to the delay of pin 440 of the log_sum_exp function over all pins immediately preceding the fanned-out pin in the timing graph (see FIG. 26A).

Following the example above, one of the fanned-out pins is pin 434. The pins preceding pin 434 in the timing graph are the inputs to AND gate 420 which are pins 439 and 444. The derivative of the log_sum_exp function is taken with respect to the delay of pin 440 as shown in FIG. 26. The log_sum_exp function is done over all pins(i) where "all pins(i)" includes pins 444 and 439 for the fanned-out pin 434. Within the log_sum_exp function, delay_of_pin(i) refers to pin 439 and then pin 444. The stage delay function takes arguments (pin 439, pin 434, alpha), then takes arguments (pin 444, pin 434, alpha). The above is then repeated for the other fanned-out pin, e.g., pin 436. The term "all pins(i)" for fanned-out pin 436 includes pin 446 and pin 454. Step 516 is repeated for each pin within the netlist that is not an end point.

At the completion of step 516 and step 514, partial derivatives are known of the MOF with respect to each output pin delay, however, what is now required is a mechanism to relate this information in terms of cell locations (x, y) and cell size for the CG process 210.

Step 518 and Step 520 of FIG. 24 then compute the derivative of the MOF with respect to stage delays in an effort to relate the gradient to cell locations (x, y) and cell sizes. The preferred embodiment computes the derivative of the MOF with respect to stage delays using the following equation:

$$\frac{d(MOF)}{d(\text{stage\_delay})} = \frac{d(MOF)}{d(\text{delay\_of\_out\_pin})} \tag{30}$$

Using the values computed in the above steps, the preferred embodiment, at step 520, backcomputes the derivative of the MOF with respect to net ("wire") resistances and capacitances and gate drive resistances and capacitances and gate input capacitances by differentiating the equation of FIG. 21, equations 23 and 24 (R and C of wire), equation 25 and 26 (R and C of gate drive), equation 27 (C of input gate), and equation 8 (for the half perimeter of wire) and then applies the chain rule to combine the results.

More specifically, differentiating the equation of FIG. 21 (Elmore delay) with respect to Ri and Ci gives:

$$\frac{d(\text{stage\_delay})}{d(Ri)} = \sum_{j=i}^{N-1} Cj \tag{31a}$$

$$\frac{d(\text{stage\_delay})}{d(Ci)} = \sum_{j=0}^{i} Rj \tag{31b}$$

equation 30

Further, at step 522 of FIG. 24, the present invention differentiates equations 23 and 24 (R and C of wire) with respect to x and y coordinates of cells which gives (for x):

$$\frac{d(Rwire)}{d(xout)} = Krwire \times \frac{d(\text{wire\_length}((xin, yin), (xout, yout)))}{d(xout)} \tag{32a}$$

$$\frac{d(Rwire)}{d(xin)} = Krwire \times \frac{d(\text{wire\_length}((xin, yin), (xout, yout)))}{d(xin)} \tag{32b}$$

$$\frac{d(Cwire)}{d(xi)} = Kcwire \times \frac{d(\text{wire\_length}(all\ points\ on\ net))}{d(xi)} \tag{32c}$$

Differentiating equation 23 and 24 (R and C of wire) with respect to y coordinates of cells gives:

$$\frac{d(Rwire)}{d(yout)} = Krwire \times \frac{d(\text{wire\_length}((xin, yin), (xout, yout)))}{d(yout)} \tag{32d}$$

$$\frac{d(Rwire)}{d(yin)} = Krwire \times \frac{d(\text{wire\_length}((xin, yin), (xout, yout)))}{d(yin)} \tag{32e}$$

$$\frac{d(Cwire)}{d(yi)} = Kcwire \times \frac{d(wire\_length(all\ points\ on\ net))}{d(yi)} \quad (32f)$$

The derivative of the wire half-perimeter ("wire_length") with respect to x coordinates is given by the equation of FIG. 12B, the same equation used for wire-length calculation.

Further with respect to step 522, resistance and capacitance equations are differentiated with respect to cell sizing, e.g., differentiating equation 25 and 26 (R and C of gates) gives:

$$\frac{d(Rgateout)}{d(size\_out\_gate)} = -Krout \times size^{-2} \quad (33a)$$

$$\frac{d(Cgateout)}{d(size\_out\_gate)} = -K1cout \quad (33b)$$

$$\frac{d(Cgatein)}{d(size\_out\_gate)} = K1cin \quad (33c)$$

Finally, at step 522, differentiating the sizing transform equation 28 gives:

$$\frac{d(sizei)}{d(Vi)} = e^{Vi} \quad (34)$$

At step 524, the present invention combines the equation of FIG. 25B, the equation of FIG. 26B, equation 30, equations 31a–31b, and equations 32a–f using the chain rule gives the contribution to the gradient from the (x, y) coordinates through the delay. Combining the equation of FIG. 25B, the equation of FIG. 26B, equation 30, equations 31a–31b, equations 33a–33c, and equation 34 using the chain rule gives the contribution to the gradient from the size variables through the delay. Therefore, step 524 provides a gradient computation of the delay objective function in terms of (x, y) cell locations and cell sizing. This information is used in the CG process 210 during optimization.

E. Power Objective Function of MOF

The MOF also contains elements for considering power during the placement and cell sizing optimization process. The power objective function is referred to within the MOF as the following term:

wp* power(*vars)

where wp is the power weight. The power objective function utilizes some of the equations and concepts discussed above (with respect to capacitance computations) and to the extent possible, equations used above are referred to herein in the discussion of the power objective function.

Power computation within one embodiment of the present invention is based on the power objective function. The power objective function considers the power dissipated by gates and this value is a function of the nets within the input netlist design. The power objective function is shown as the following relationship:

$$power = \sum_{all\ nets} (power\_of\_net)$$

where the power of each net is summed over all the nets of the netlist. The power dissipated by a single net, power_of_net, is determined according to the below relationship:

power_of_net=net_switching_frequency*total_net_capacitance where net_switching_frequency is the switching frequency of the input signals on the net (this is a given value) and total_net_capacitance is determined according to the below relationship:

$$total\_net\_capacitance = wire\_capacitance + \sum_{\substack{all\ output \\ pins\ on\ net}} output\_pin\_capacitance + \sum_{\substack{all\ input \\ pins\ on\ net}} input\_pin\_capacitance$$

where wire_capacitance is determined by equation (24), the term:

Σoutput_in_capacitance
all output
pins on net is determined by equation (26) and the term:

Σinput_pin_capacitance
all input
pins on net is determined by equation (27).

$$Pgate = \sum_{all\ gates} (input\ switching\ frequency) \times (output\ load\ capacitance)$$

It is appreciated that net_switching_frequency is a value that is typically given to the present invention by a power analysis tool, e.g., an example of one that can be used within the present invention is available from Synopsys, Inc. of Mountain View Calif.

The wire_capacitance is the capacitance of the net and can be determined by the half perimeter of the net ("wire") multiplied by a constant. This is shown as equation 24. Equation 24 can be used to directly relate the capacitance of the output load to the (x, y) coordinates of the cells. Equation 26 can be used to determine the output capacitance, output_pin_capacitance, of a driver gate with respect to the gate size. Equation 27 can be used to determine the input capacitance, input_pin_capacitance, of a receiver gate with respect to the gate size. Therefore, as shown above, equations 24, 26 and 27 can be used to relate the output capacitance of a gate to the (x, y) coordinates and to the gate size. Therefore, the MOF of the present invention utilizes the above relationships to compute the total power of the network in terms of the cell location (x, y) and cell size. In so doing, the power objective function is used as a part of the MOF of the present invention to take power into consideration during placement optimization.

Power Gradient. The gradient of the power objective function contains the following terms. The partial derivative of the power objective function includes the input switching rate of the gate times the partial derivative of the total capacitance of the net in terms of x and y coordinates. With respect to wire_capacitance, equation 32c is the partial derivative of the capacitance of a wire in terms of coordinate x. Further, equation 32f is the partial derivative of the capacitance of a wire in terms of coordinate y. The analogous power gradient terms are:

(net_switching_frequency)×(Equation 32c) for x (net_switching_frequency)×(Equation 32f) for y The equation, (net_switching_frequency)×(Equation 32c), is differentiated over all x coordinates of the cells coupled to the gate. The equation, (net_switching_frequency)× (Equation 32f), is differentiated over all y coordinates of the cells coupled to the gate. The gradient of the power objective function also includes the partial derivative in terms of the cell size for the input and output pin_capacitance values. Equation 33b expresses the partial derivative of the output gate capacitance in terms of cell size. Equation 33c expresses the partial derivative of the input gate capacitance in terms of cell size. The analogous power gradient term is:

(net_switching_frequency)×(Equation 33b) for cell size (net_switching_frequency)×(Equation 33c) for cell size The actual gradient computation for the power objective function of the present invention includes all three terms above.

F. Automatic Buffer Insertion

In one embodiment of the MOF, equation (3) above, the present invention considers the buffer area of wire for buffer insertion. In other words, this embodiment of the present invention allows buffers to be added to wire lengths in order to decrease the signal propagation delay during the optimization process 300. The automatic buffer insertion process of the present invention therefore impacts the computations of cell placement and the delay objective function by altering the stage delay function as described to follow.

Generally, automatic buffer insertion of the present invention operates by modifying the stage delay contribution (FIG. 21) from a wire to assume that the wire can be buffered to reduce its delay. Without buffering, the wire length parameters of the Elmore formula of FIG. 21 lead to a delay formulation that is quadratic in wire length (curve 612 of FIG. 27A).

Figure 27A:
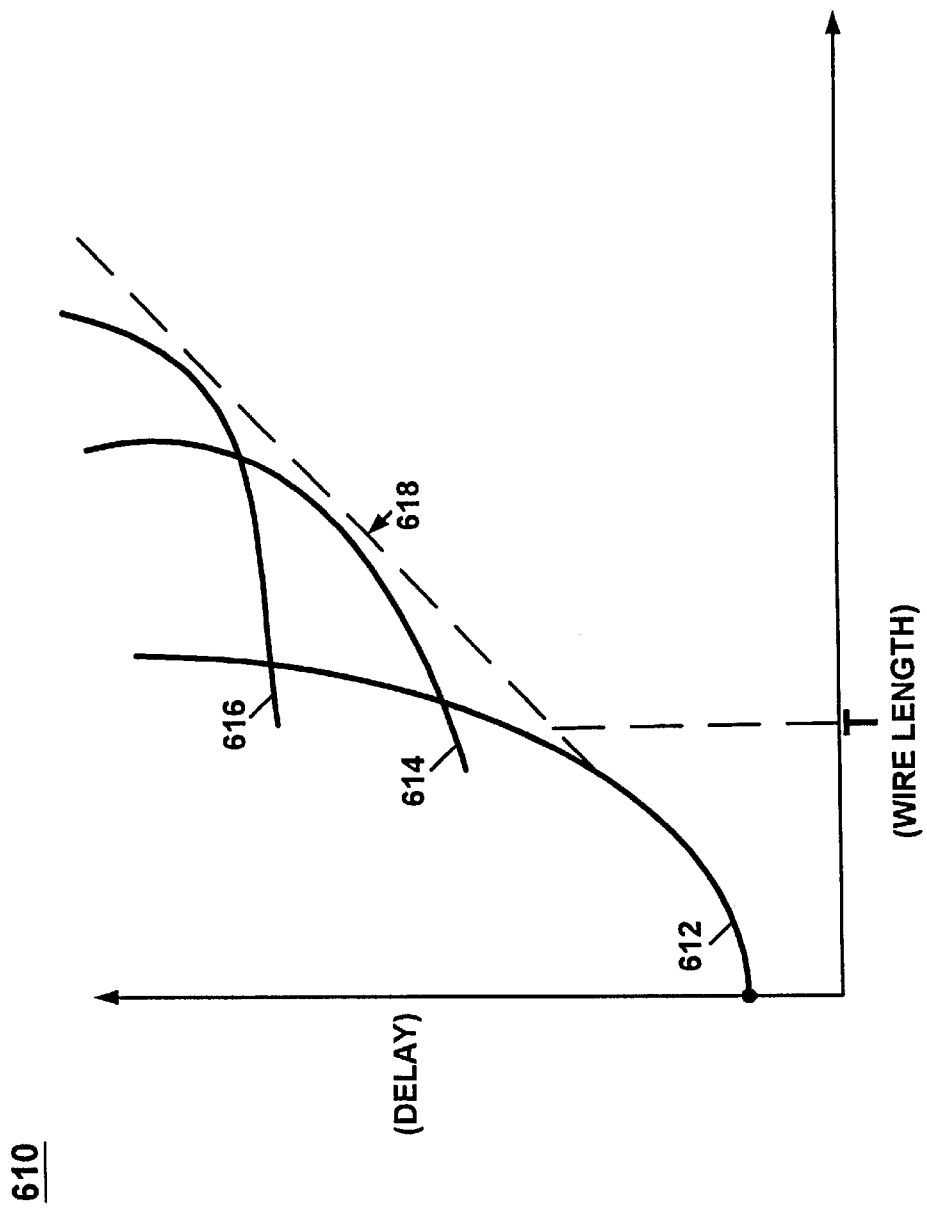
FIG. 27A illustrates a graph of delay as a function of wire length between an input and an output for three cases including using no buffer, using one buffer and using two buffers.
Figure 28A:
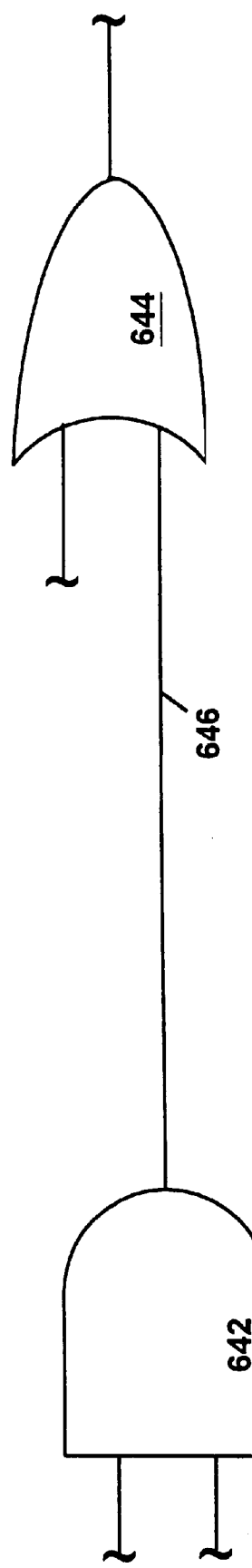
FIG. 28A, FIG. 28B, FIG. 28C and FIG. 28D illustrate a wire length having no buffer, one buffer, two buffers and three buffers, respectively.
Figure 28B:
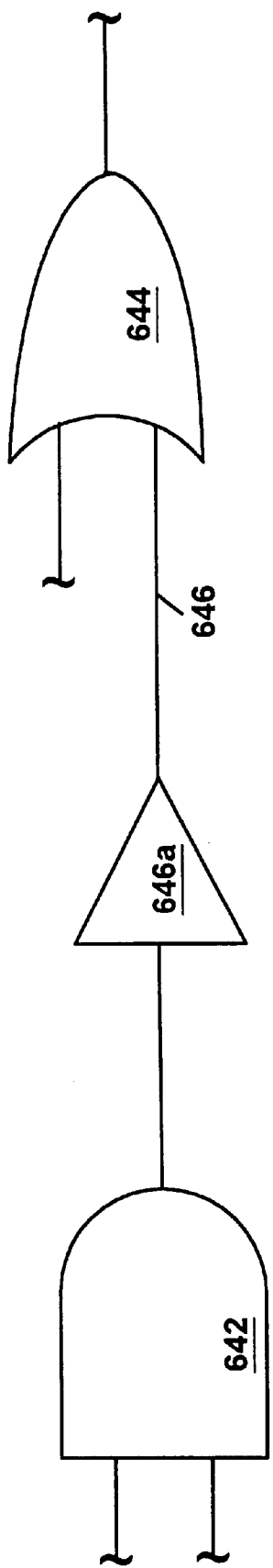

FIG. 27A illustrates a graph 610 having three separate curves. Quadratic curve 612 is the delay over wire length between an input and an output without any buffering. This corresponds to the configuration of FIG. 28A where gate 642 and gate 644 are coupled together via line 646 without any buffers in between. Quadratic curve 614 of FIG. 27A relates to the same input and output but having one buffer circuit ("buffer") placed between. This corresponds to the configuration of FIG. 28B where gate 642 and gate 644 are coupled together via multiple wire segments with buffer 646a placed in between.

Figure 28C:
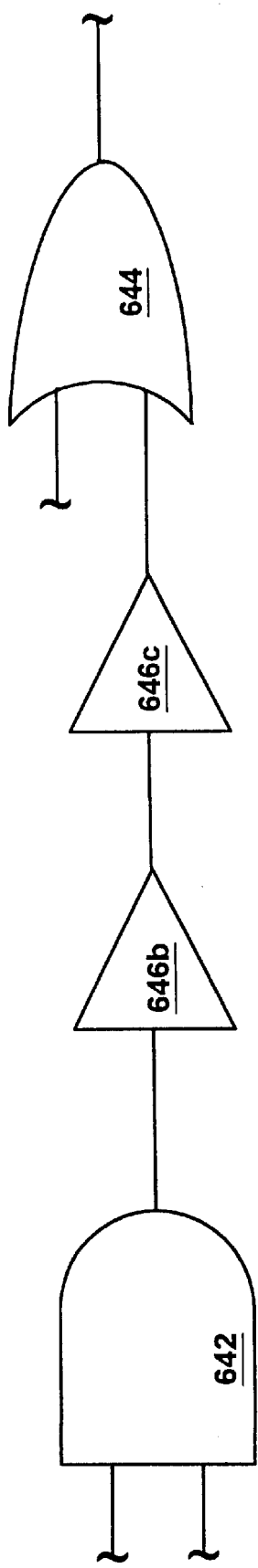
Figure 28D:
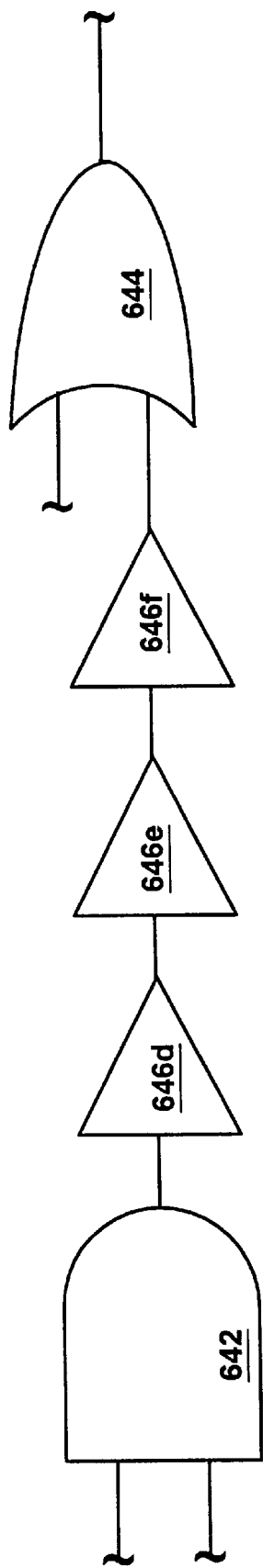

Quadratic curve 616 of FIG. 27A relates to the same input and output but having two buffers distributed between. This corresponds to the configuration of FIG. 28C where gate 642 and gate 644 are coupled together via multiple wire segments with buffers 646b–646c placed in between. Considering the single buffer situation, it can be shown that if the buffer is optimally sized and placed, delay 614, as a function of separation of input from output, is also quadratic. This turns out to be true for any number of inserted buffers as shown by curve 616. This leads to a family of quadratic delay curves, one curve for each number of buffers as shown by FIG. 27A. As each new buffer is added, the delay to wire length function improves (e.g., delay is reduced) over the configurations having fewer buffers. The dashed line 618 represents an envelope under the family of curves 612, 614 and 616.

Figure 27B:
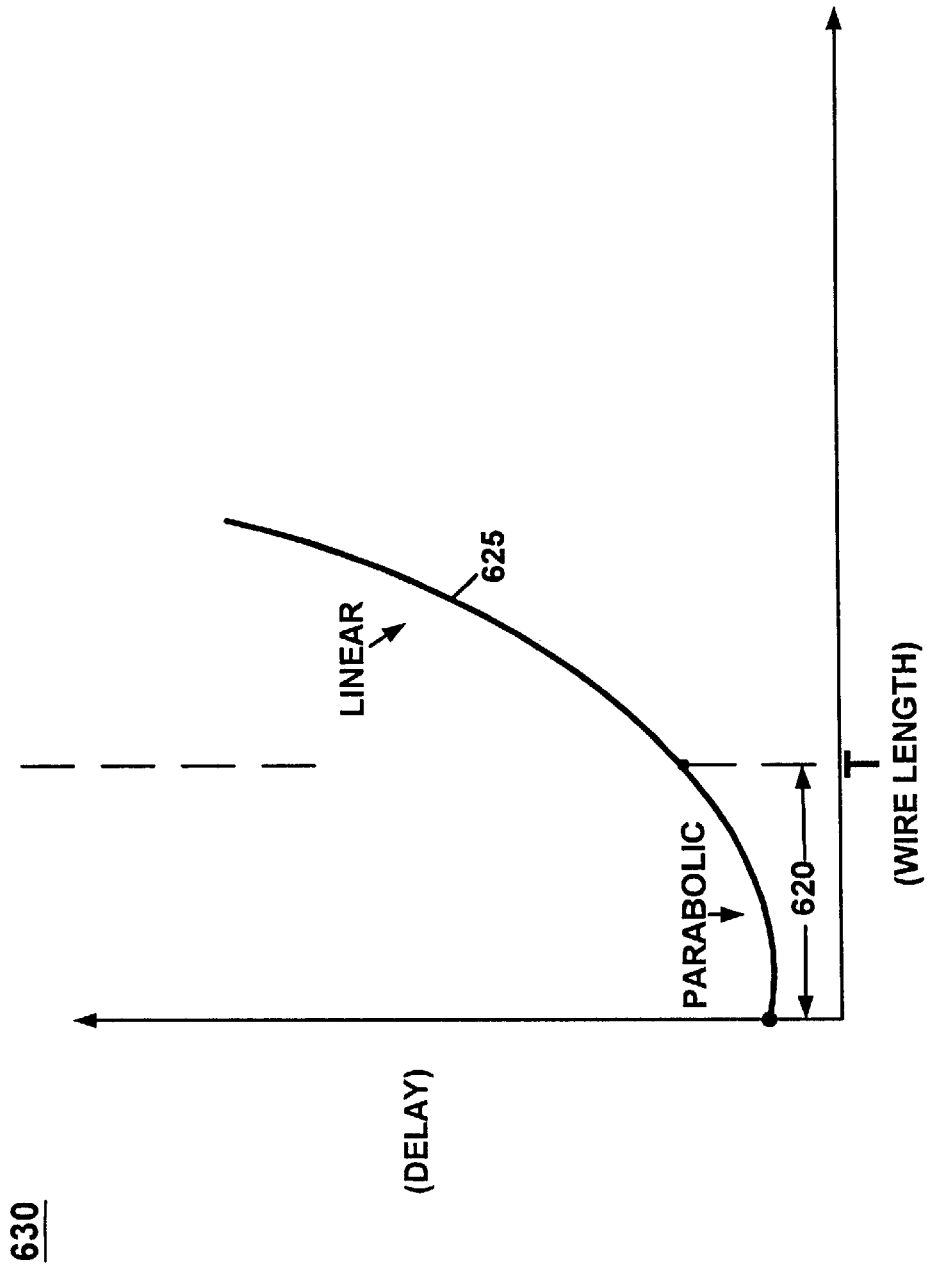
FIG. 27B is a graph illustrating a delay function of delay over wire length in accordance with the automatic buffer insertion optimization of the present invention.

The curves of FIG. 27A, as a combination, are not differentiable at their intersections. The present invention models this family of curves by a single curve 630 as shown in FIG. 27B. Curve 630 contains a parabolic region 620 and also a linear region 625 that approximates the envelope under the curve family discussed in FIG. 27A. The curve 630 is differentiable and includes a parabola which becomes a line for distance x greater than threshold delay value T (which can be predetermined or input by a user at optimization time). The delay value and its slope match at T. This function can be written as:

$$\text{delay}(x) = \begin{matrix} \text{if}(0 \le x \le T) \text{ then, } (ax^2 + bx + c) \\ \text{if}(x \ge T) \text{ then, } (dx + e) \end{matrix} \quad (35)$$

where $d=(2aT+b)$ and wherein $e=(-aT^2+c)$. The derivative of the delay(x) function (35) of the present invention is shown below:

$$\frac{d(\text{delay})}{dx} = \begin{matrix} \text{if}(0 \le x \le T) \text{ then, } (2ax + b) \\ \text{if}(x \ge T) \text{ then, } (d) \end{matrix} \quad (36)$$

The parameters a, b and c depend on the chip technology and preferred buffer characteristics.

In accordance with this embodiment of the present invention that performs automatic buffer insertion, the MOF is modified as discussed below. First, within the MOF, equation 35 (above) is used in place of the stage delay equation of FIG. 21. With respect to the computation of the gradient of the MOF, equation 36 is used in place of equations 31a–31b in the gradient evaluation. Once the optimization (optimization process 300) using these new delay functions completes, an optimization with respect to distance is known. Then, the number of buffers required on the wire is computed as:

$$\# \text{ of buffers} = \text{int}\left[\frac{\text{distance}}{T} - \frac{1}{2}\right] \quad (37)$$

where the "distance" is the manhattan distance from output pin to input pin and T is the threshold delay value discussed above and "int" is the integer function that may include rounding up or rounding down to the nearest integer value. In one embodiment, the buffers are spread evenly along the wire in question.

The above process attempts to optimize wire lengths for every case. In an alternative embodiment, a choice can be made between buffer addition and other optimization. Functions other than those described above are possible. In particular, another class of methods assigns a conjugate-gradient variable per wire. This variable signifies the sum of the total area consumed by buffers. These methods provide the optimizer 300 with the flexibility of using less than the minimum delay buffering on a wire.

G. Synthesis Estimation and Buffer Tree Balancing Estimation

The present invention gives the option of correcting timing estimation of logic timing to assume that a synthesis system does timing-driven-structuring on logic and buffer tree balancing on buffering. In other words, the coarse placer of the present invention can make an estimate as to the timing properties of the particular gate structure a synthesizer will use in cases where one or more circuit structures can be used to implement the same logic. The present invention estimates, within a fanout tree logic structure, what the synthesizer will conclude based on tradeoffs between delays from the inputs to the outputs of the circuit to minimize delay. By using the estimated delay information, the coarse placer yields cell placement that works better in processes involving circuit synthesis. The corrected timing is used in place of the stage delay circuit of FIG. 21 in the timing driven placement optimization process 300. The variables of the MOF considered in this embodiment of the present invention are (1) the buffer tree depth on wire branch for buffer tree balancing and (2) the logic tree depth on logic tree input for timing driven structuring.

Figure 29A:
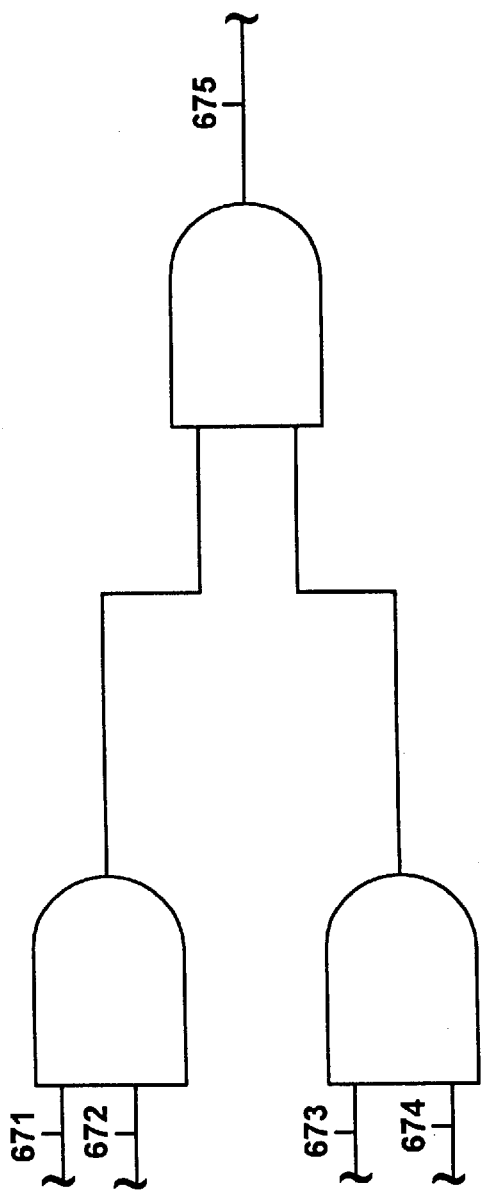
FIG. 29A and FIG. 29B illustrate two different gate structures that can be used to realize a fan-out free logic circuit.
Figure 29B:
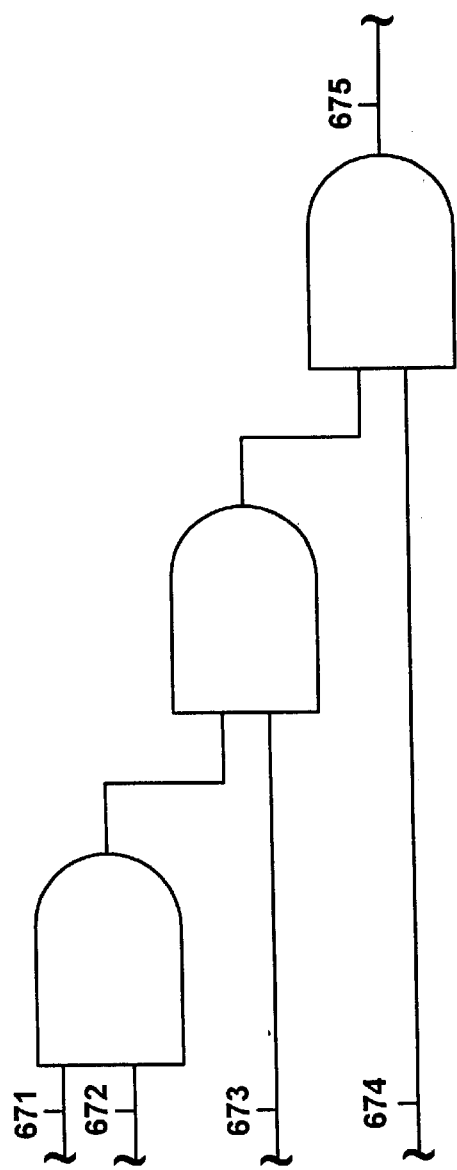

Discussed below are the formulas used by the preferred embodiment to estimate timing tradeoffs in timing-driven-placement. FIG. 29A and FIG. 29B illustrate two different gate structures for realizing the same logic function. Consider the possible implementations of a 4 input AND gate using 2 input AND gates, as shown in FIG. 29A. Another implementation is shown in FIG. 29B. One embodiment of the present invention performs synthesis estimation with respect to these logic structures. The goal of synthesis estimation is to accurately model the set of possible topologies that implement a given logic function. Typically, it is the synthesizer that selects the actual circuit topology used, however, the present invention can optimize cell placement by estimating what the synthesizer will synthesize and using the timing results that come from the synthesis.

Fan-Out Free Trees. For instance, assume the delay through a 2-input AND gate is 1. The implementation 670 of FIG. 29A has 4 inputs, all with delay 2. The implementation 680 of FIG. 29B has 2 inputs with delay 3, one with delay 2, and one with delay 1. The best implementation largely depends on environment. That is, if all inputs 671–674 arrive at about the same time, then implementation 670 is best. However, if the inputs 671–674 arrive at different delays (with inputs 673–674 arriving later), it may be better to use implementation 680. Normally the synthesis system selects the proper implementation to optimize circuit timing.

It can be shown that all possible implementations of an N input AND gate using 2 input AND gates satisfies the relation:

$$1 = \sum_i (1/(2^{(di/T)})) \quad (38a)$$

$$di/T \geq 1 \quad (38b)$$

where the summation is made over all of the circuit's inputs, i, and d[i] is the delay from input i to the output and T is the delay of a 2-input AND gate. Equation 38a holds not only for AND gates, but for any commutative-associative operation such as AND, OR, XOR. Equation 38a also holds for base logic with other than 2 inputs, if T is modified appropriately. Equation 38b implies that at least one delay is present.

In accordance with the present invention, equation 38a has also been found empirically to apply approximately to non-commutative, non-associative fanout-free trees of logic that are rebalanced using a synthesis system to optimize circuit timing. One embodiment of the present invention uses equation 38 to model the behavior of an external synthesis system on logic timing.

Disregarding equation 38b, e.g., to form an approximation, equation 38a implies that when optimized correctly by the synthesis tool, the optimized logic satisfies equation 39b and will have this delay. This, then, is the estimate used by this embodiment of the present invention for delay computations. The actual delay computation used by the timing-driven synthesis estimator embodiment of the present invention is shown below:

$$Aout = T \log_2 \left( \sum_i 2^{(Ai/T)} \right) \quad (39a)$$

Reducing yields:

$$Aout = T/\log(2) \times \log \left( \sum_i e^{[(\log(2)/T) \times Ai]} \right) \quad (39b)$$

Which can be rewritten using the log_sum_exp function, described above, as:

$$Aout = T/\log(2) \times \log\_\underset{i}{sum}\_exp\,((\log(2)/T) \times Ai)) \quad (39c)$$

where Aout=arrival time at the output of the circuit (e.g., output 675 of FIG. 29A and FIG. 29B) and Ai=arrival time at the input i. Equation 39c is the direct equation which allows the placer to determine, given the arrival times of the inputs, the best output delay achievable by the synthesizer. This is a forward computation.

In particular, the preferred embodiment decomposes the circuit into fanout-free-trees, and then uses equation 39c in place of the stage delay equation of FIG. 21 to estimate the delay through the fanout-free-tree using a forward computation. The delay estimation is thereby used in the placement optimization for this embodiment of the present invention. It is appreciated that the formulation used by the preferred embodiment uses no additional variables to handle rebalancing of fanout-free-trees. Other embodiments can use equation 38a directly, by assigning a conjugate-gradient variable for each d[i] variable.

Buffer Tree Balancing. Buffer trees are well known circuit structures. Assume a first gate is coupled to supply a signal to many other gates in large net. It may be that circuit conditions are such that intermediate buffers are placed between the first gate and the other gates to help provide the signal with required timing, loading, etc. The particular circuit implementation for buffer trees can become complex because a hierarchical organization can be implemented where one buffer follows another, etc., within the tree. In some cases, it may be required to balance the buffer tree, e.g., to maintain timing requirements over certain critical paths, etc.

The present invention handles buffer tree balancing in a similar manner, but in the case of buffer trees, the tree to balance is a fanout tree rather than a fanin tree. Equation 38a holds here also, but with d[i] defined to be the delay from the input of the buffer tree to each output of the buffer tree.

Since the fan-out free computation is a forward computation, the preferred embodiment assigns one conjugate-gradient variable per output, and calculates the stage delay to the output d[i] as a function of the conjugate-gradient variable v[i] according to the below equation:

$$di = \frac{T}{\log(2)} \log\_\underset{i}{sum}\_exp\left(\frac{\log(2)}{T} \times vi\right) - vi \quad (40)$$

Equation 40 is an indirect equation and could also be used for the stage delay of the logic-tree balancing estimation, in place of equation 39c, but is less economical because it requires additional variables. Equation 39c cannot be used for buffer tree balancing because the direction of calculation of arrival times is forward through the circuit.

An alternative embodiment calculates required times backward through the circuit, and uses equation 39c for the buffer tree calculation and equation 40 for the logic tree balancing calculation.

In summary, if a forward traversal is performed, then timing-driven synthesis does not utilize variables and the buffer tree rebalancing does use variables within the MOF. However, if a reverse traversal is performed, then timing-driven synthesis does utilize MOF variables and the buffer tree rebalancing does not use variables within the MOF.

Exemplary Placements of the Present Invention

The following illustrations are outputs generated by the placer 300 of the present invention for various exemplary input netlists. It is appreciated that the lines shown in the following FIGS. 30A–33E represent wire connections and the cells are located (generally) at the intersections of the wires.

Figure 30A:
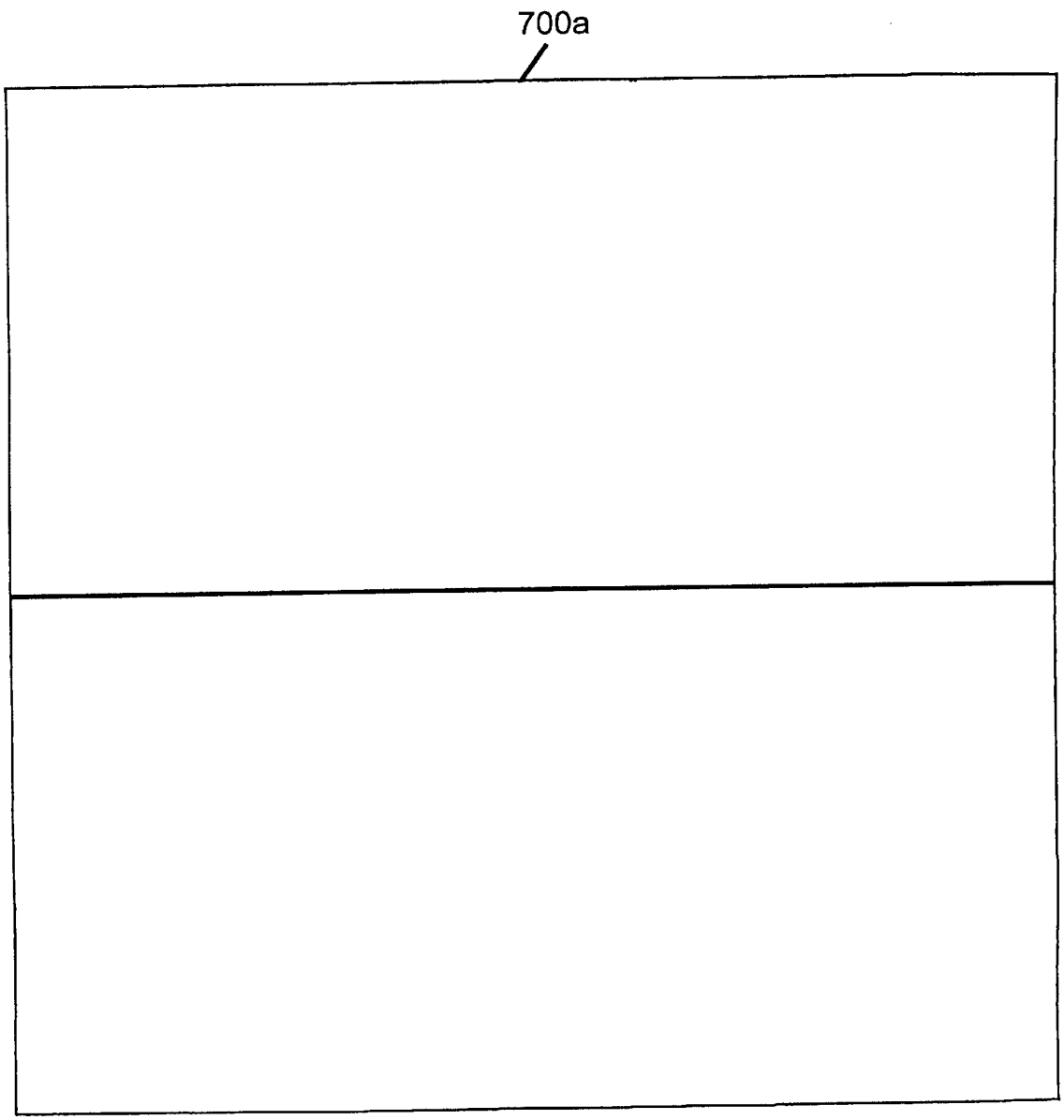
FIGS. 30A, 30B, 30C, 30D and 30E illustrate the outputs of the coarse placer optimization process of the present invention for a 64-bit multiplier having two 32-bit inputs through different passes of the optimization process.
Figure 30B:
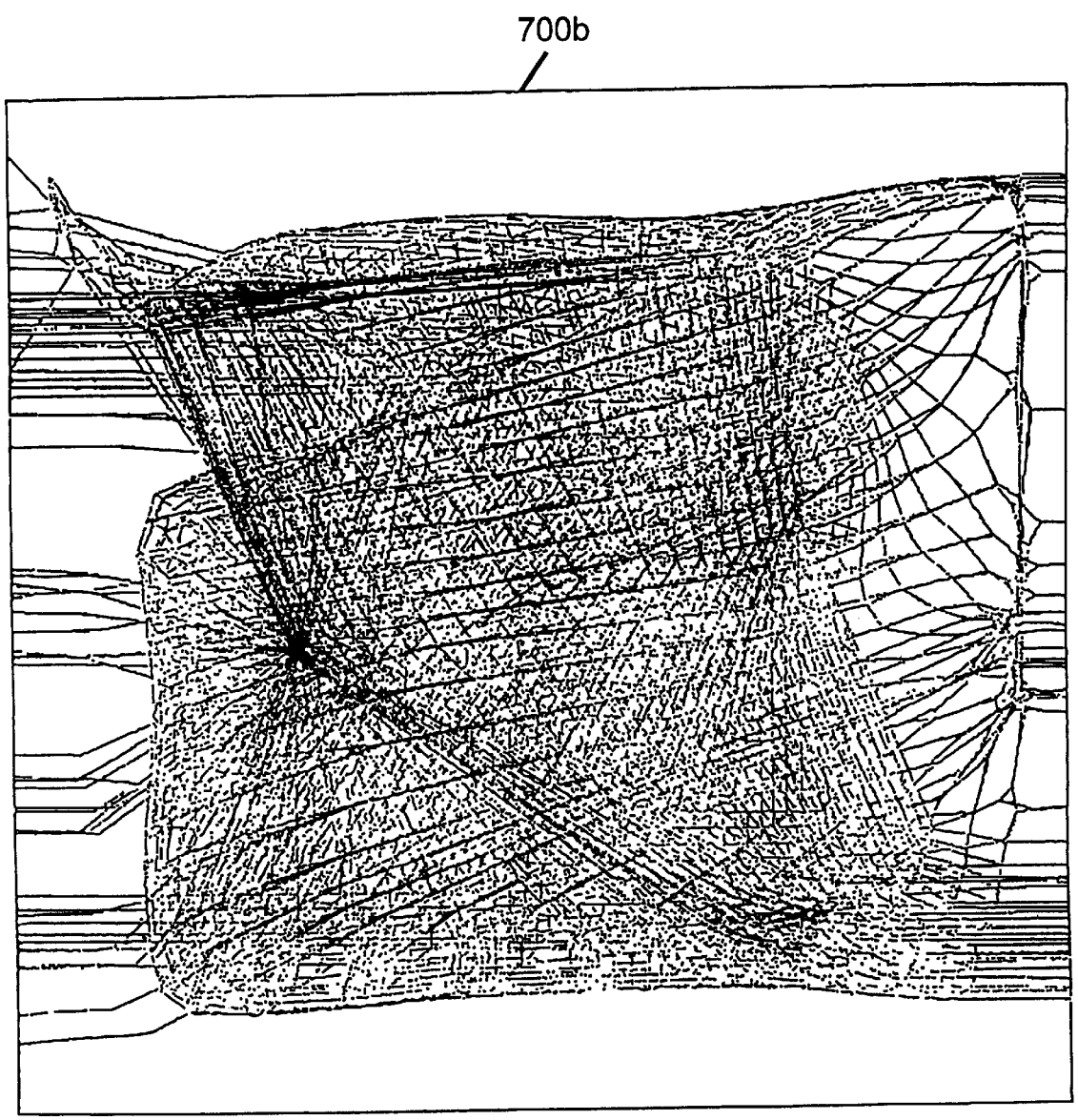
Figure 30C:
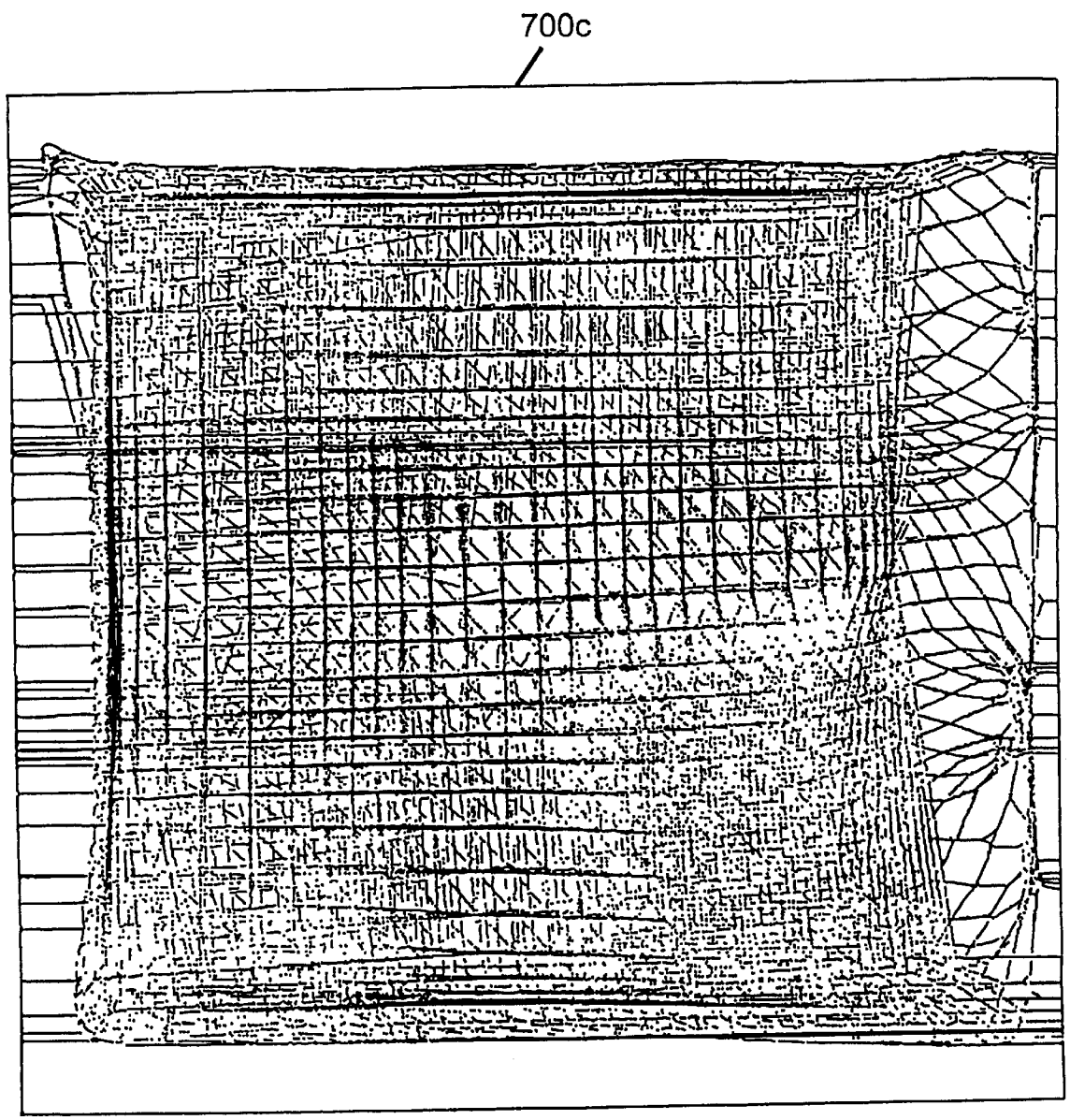
Figure 30D:
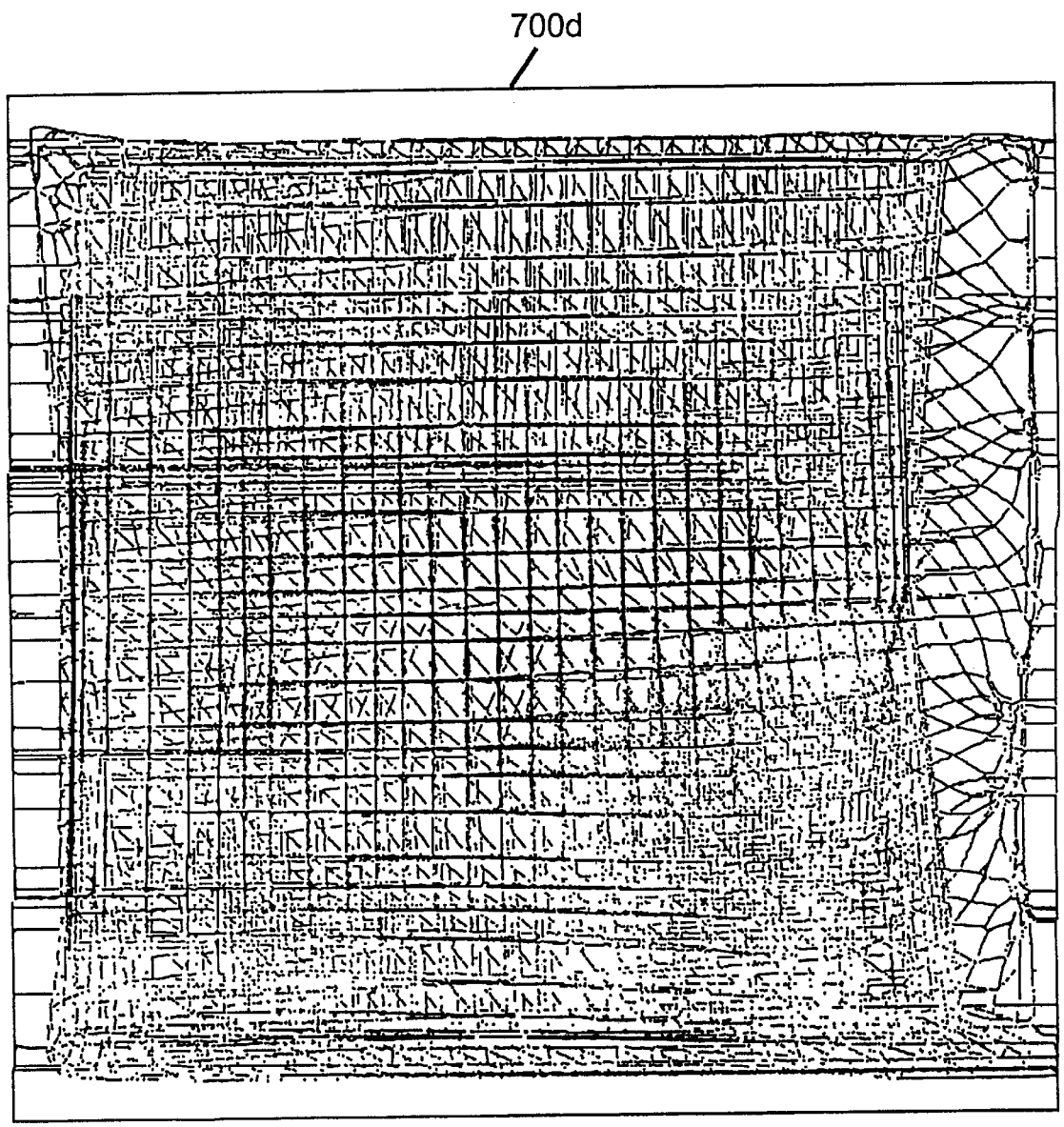
Figure 30E:
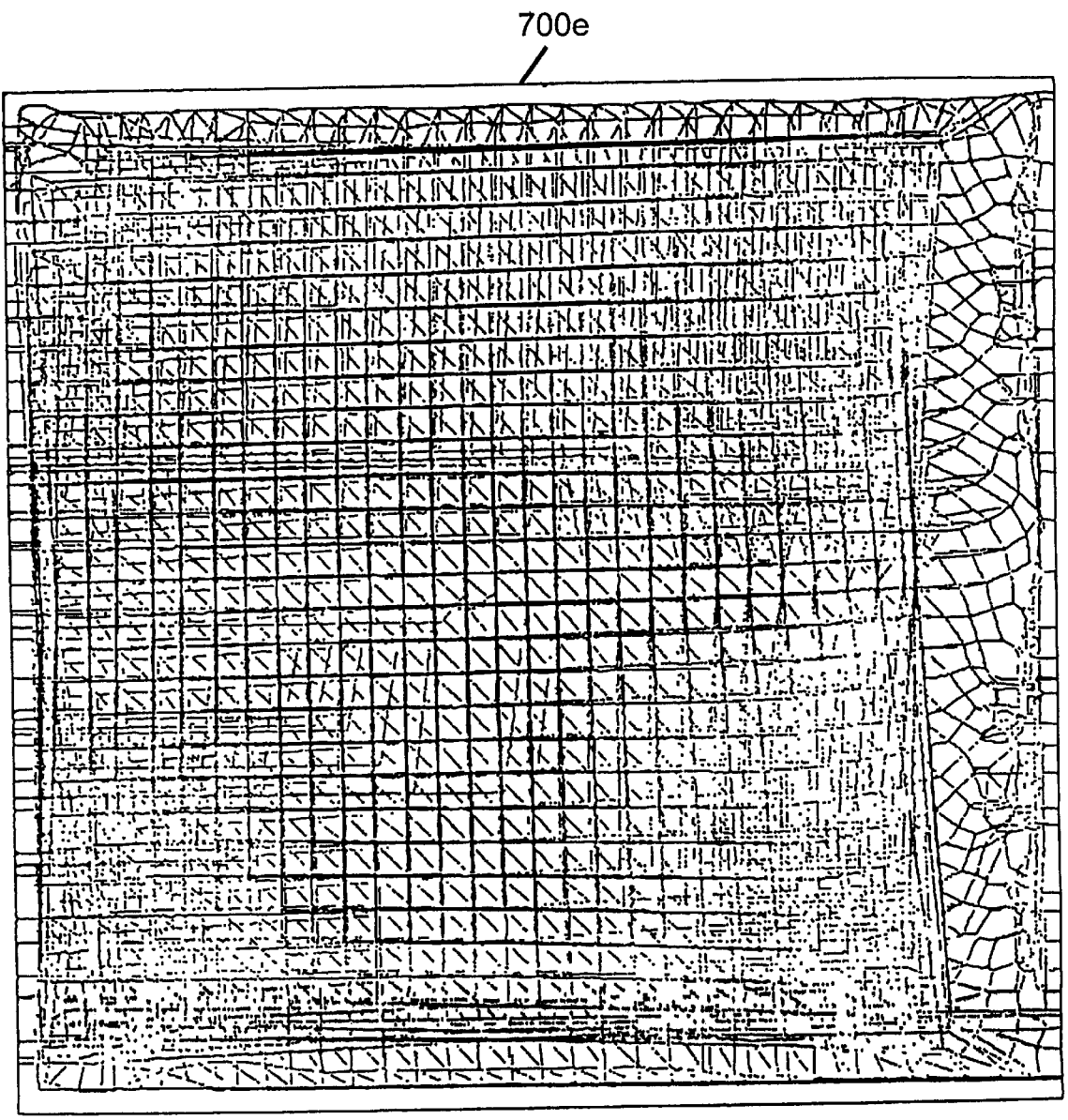

FIGS. 30A, 30B, 30C, 30D and 30E illustrate the outputs of the coarse placer optimization process 300 of the present invention for a 64-bit multiplier having two 32-bit inputs through different passes of the optimization process. On each pass, a different alpha smoothing value is used. FIG. 30A illustrates the starting point placement 700a of the coarse placer optimization process 300 for the exemplary netlist design of the multiplier circuit having two 32-bit inputs and generating a 64-bit output value. The exemplary 64-bit multiplier input netlist was generated using Synopsys' DC Shell product, available from Synopsys, Inc., of Mountain View, Calif. and had an initial cell placement that could be arbitrary. In this case, however, the input placement is along the horizontal line of FIG. 30A.

Figure 31A:
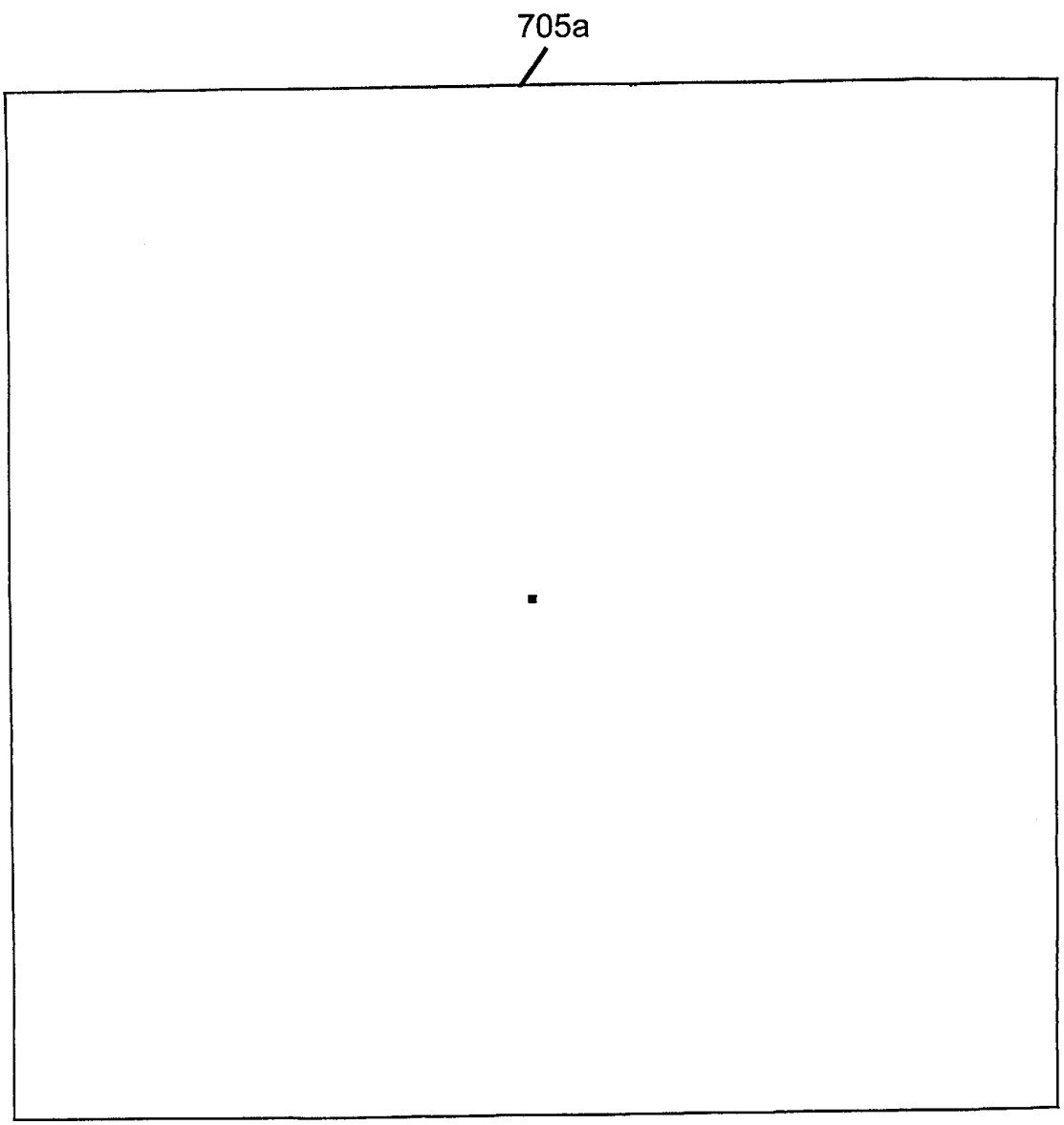
FIGS. 31A, 31B, 31C, 31D, 31E and 31F illustrate the outputs of the coarse placer optimization process of the present invention for a three mesh circuit through different passes of the optimization process.
Figure 31B:
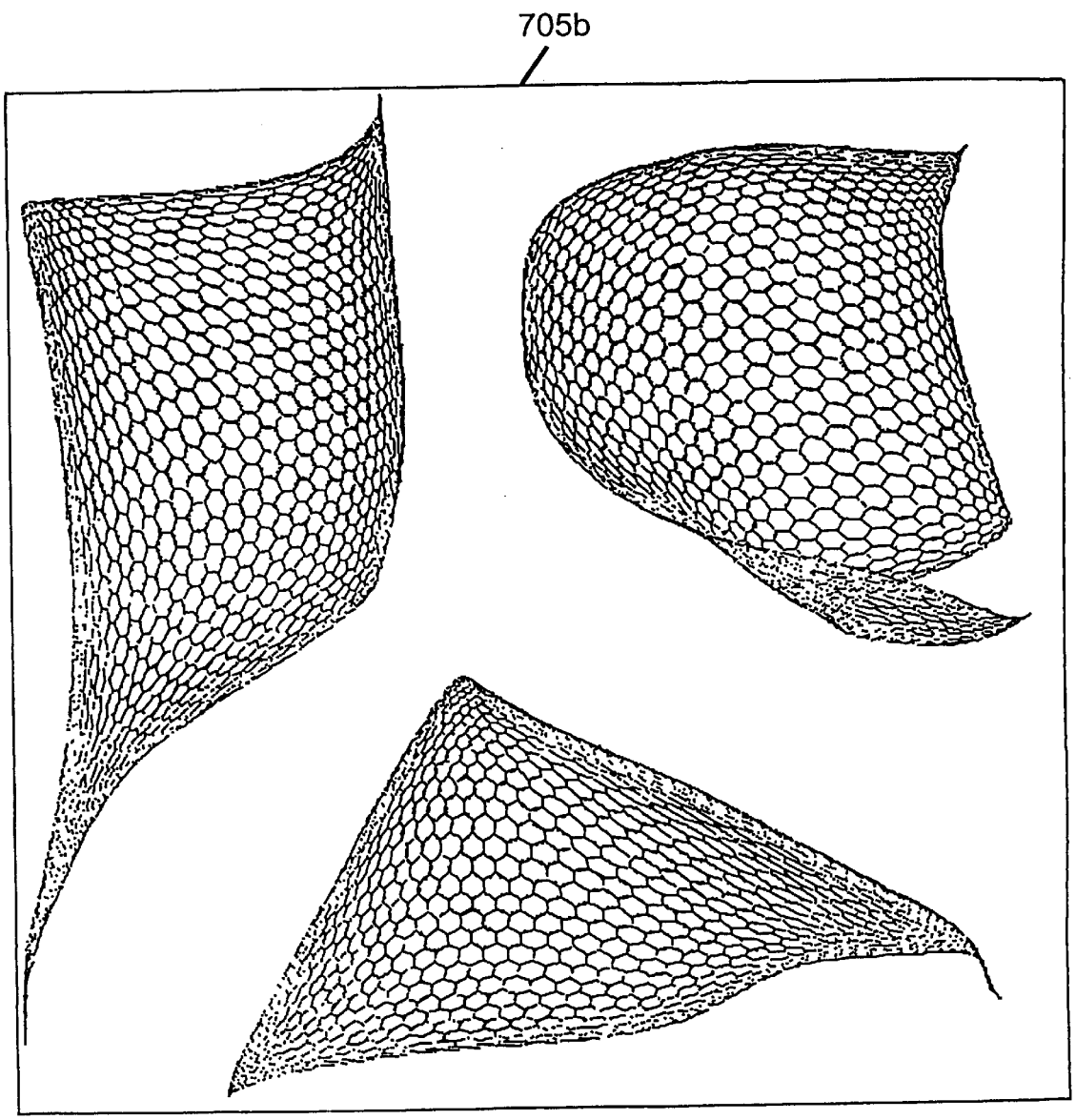
Figure 31C:
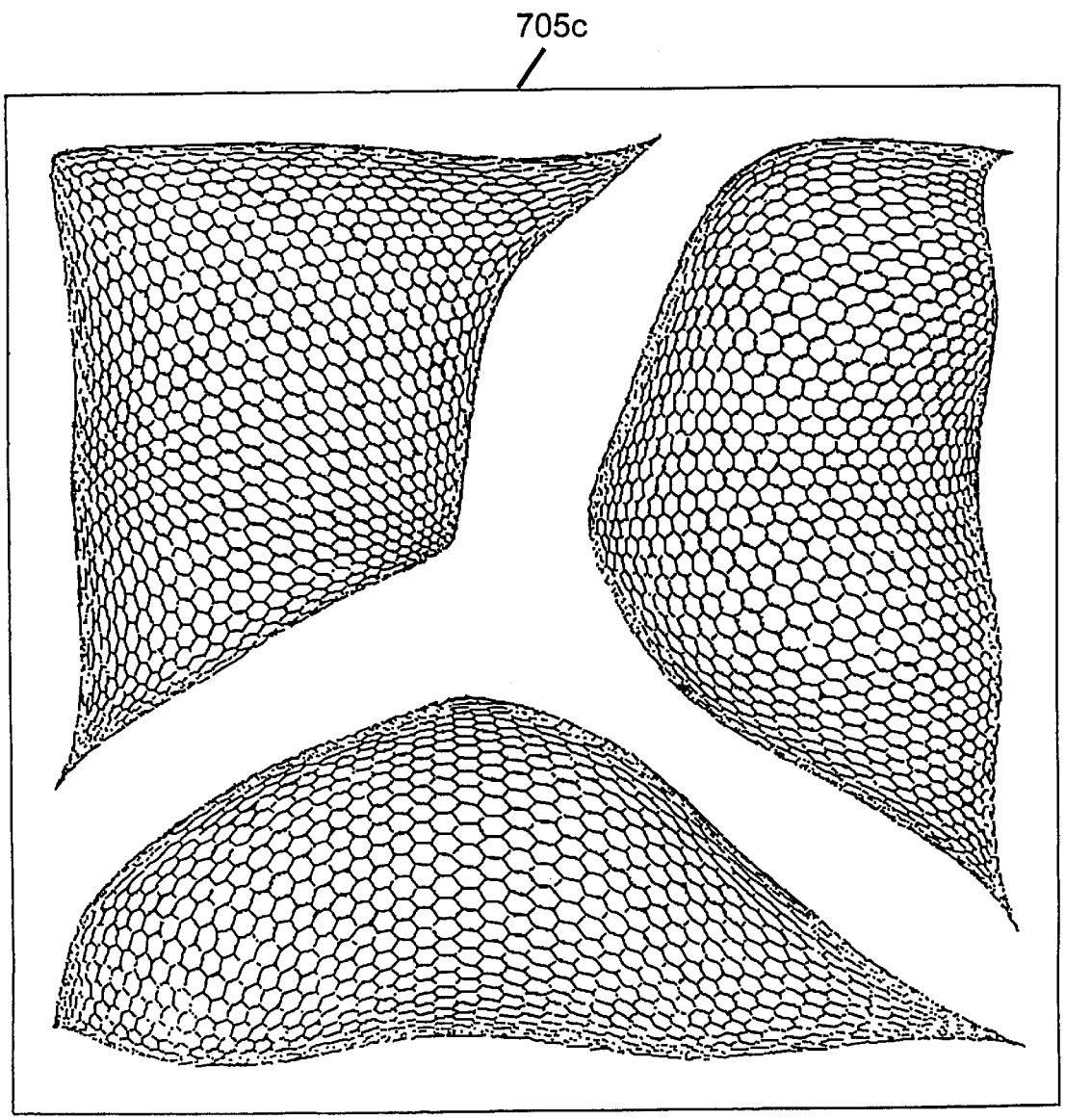
Figure 31D:
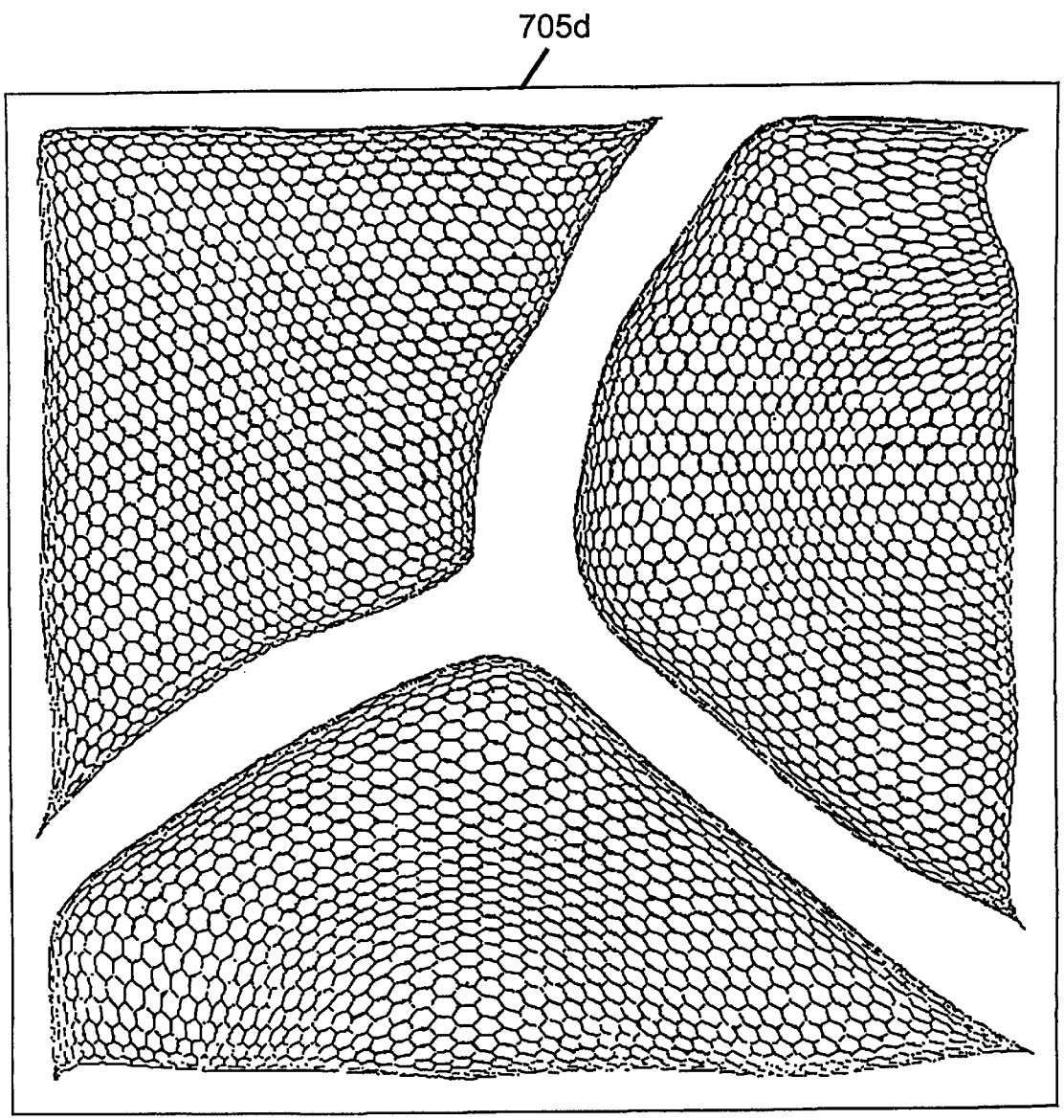
Figure 31E:
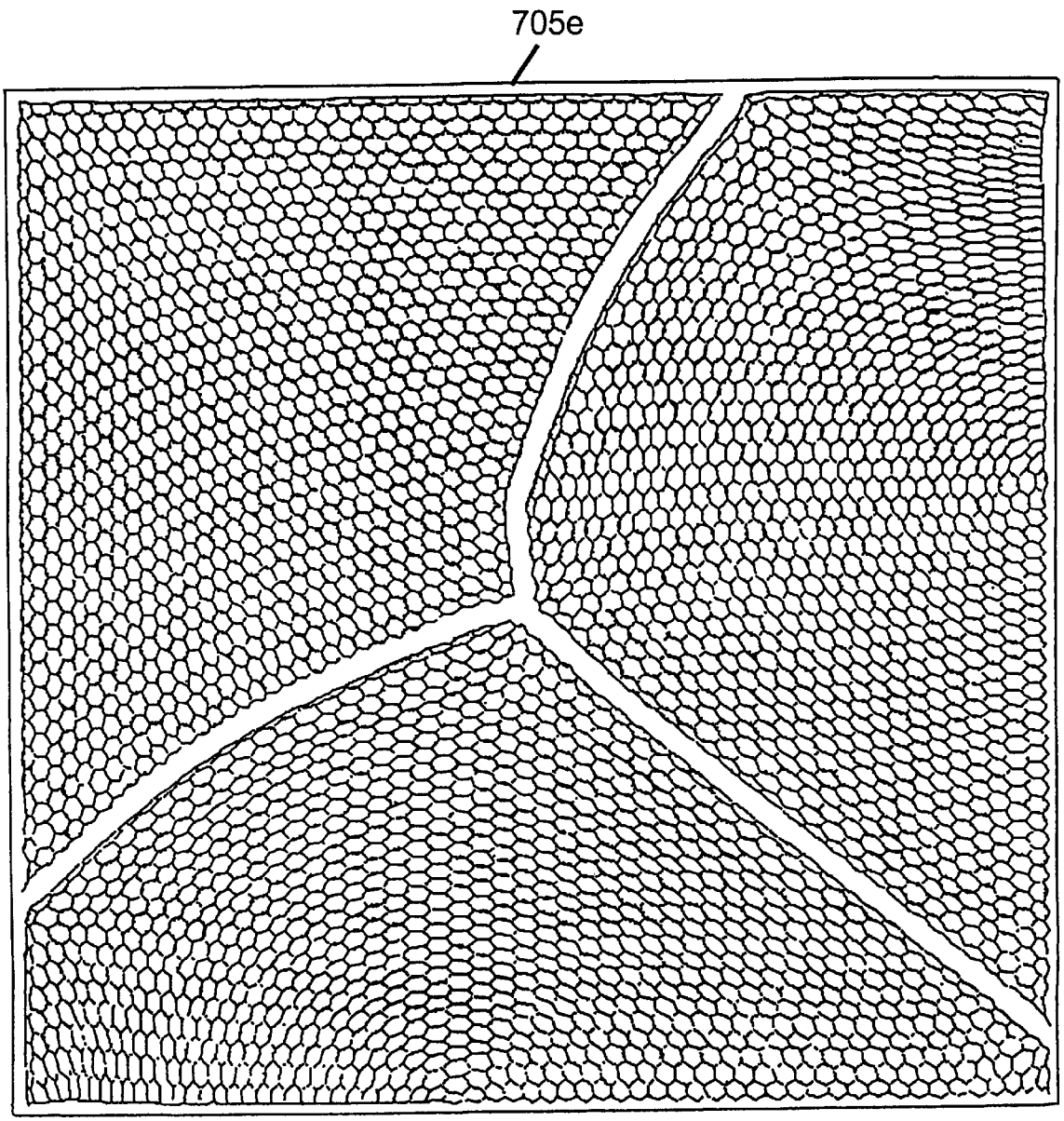

The input netlist placement 700a of FIG. 31A was then placed by the placer 300 of the present invention with the constraint that inputs be on one side and outputs be on the opposite side of the placement. Each placement of placements 700b–700e, of FIGS. 31B–31E, respectively, illustrate outputs of the placer 300 for different passes using a different alpha smoothing value on each pass. As shown within the FIGS. 31B–31E, the placements become more and more ordered through the placement process. In the exemplary placement 700e of FIG. 31E, the two 32-bit inputs are positioned along the left edge and the 64-bit sum outputs are positioned along the right edge. The placed output 700e is highly ordered with the first operand inputs traversing through the placement 700e horizontally. The second operand inputs traverse through the placement 700e vertically. The single bit adders are arranged in a grid fashion with the carry signal lines traversing diagonally through the grid. The cells are points from where wires emanate.

Figure 31F:
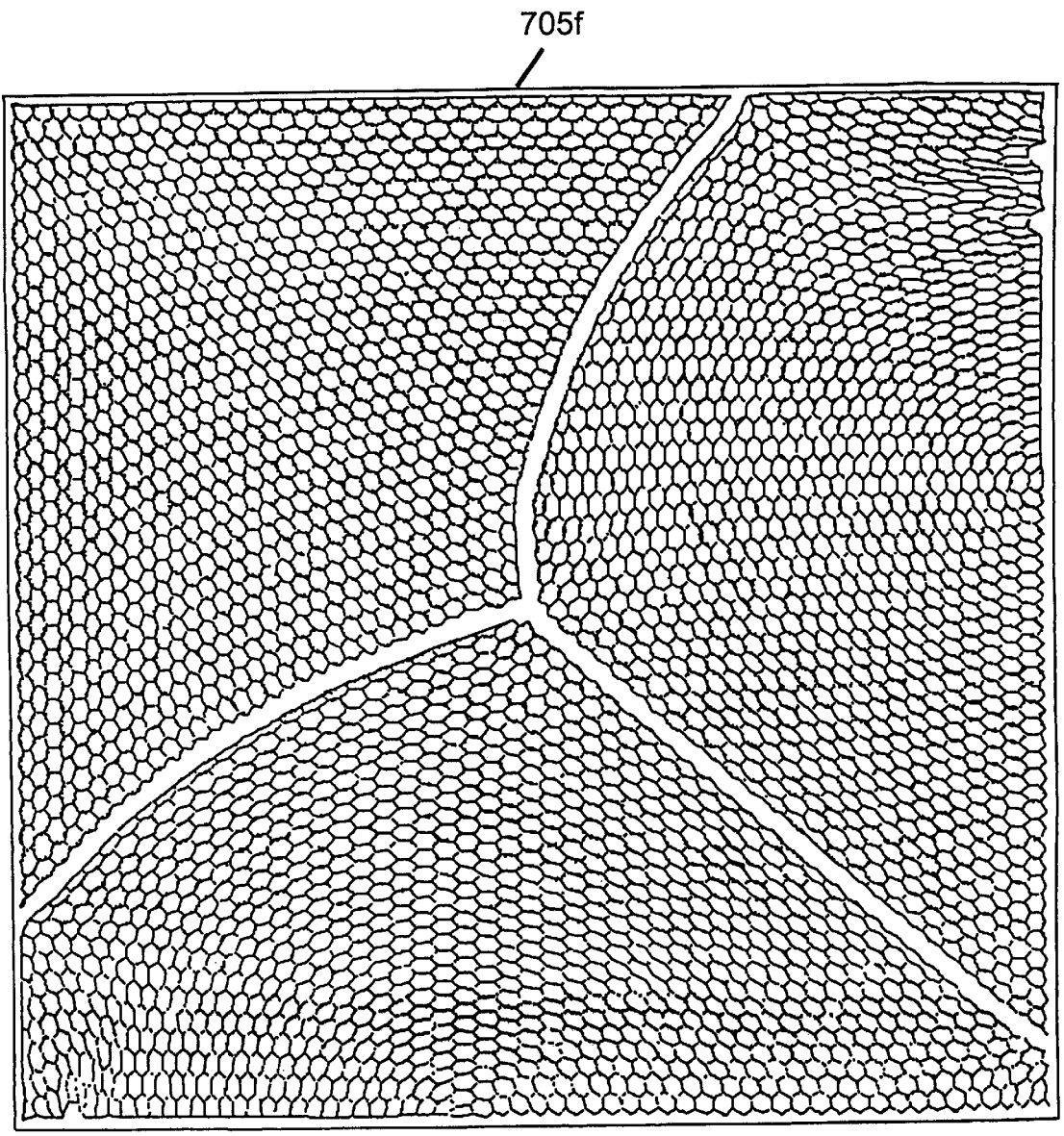

FIGS. 31A, 31B, 31C, 31D, 31E and 31F illustrate the outputs of the coarse placer optimization process of the present invention for an input netlist having three mesh circuits. FIGS. 31A, 31B, 31C, 31D, 31E and 31F illustrate placements through different passes of the optimization process. FIG. 31A illustrates the starting point placement 705a of the coarse placer optimization process 300 of the present invention for an exemplary netlist design of the three mesh circuits with each mesh having a 30×30 cell array. The exemplary input netlist includes three unconnected meshes that were randomly or arbitrarily placed initially. In the example placement 705a of FIG. 31A, the cells are initially placed in the center as shown by the small dot in the center of FIG. 31A. The exemplary netlist was processed through the placer 300 and output placements 705b–705f are shown in FIGS. 31B–31F, respectively. Each different pass of the optimizer 300 uses a different alpha smoothing value. Each mesh is a 30×30 gate mesh circuit (e.g., of NAND gates). As shown in FIG. 31F, the coarse placer 300 of the present invention was able to separate, spatially, the three mesh circuits that are also electrically isolated. Quadratic wire length-based placers are unable to separate mesh circuits as shown in FIG. 31F given the exemplary input described above. Over the passes, the coarse placer 300 of the present invention "unfolds" the initial placement of the mesh circuit until the final result is obtained.

Figure 32A:
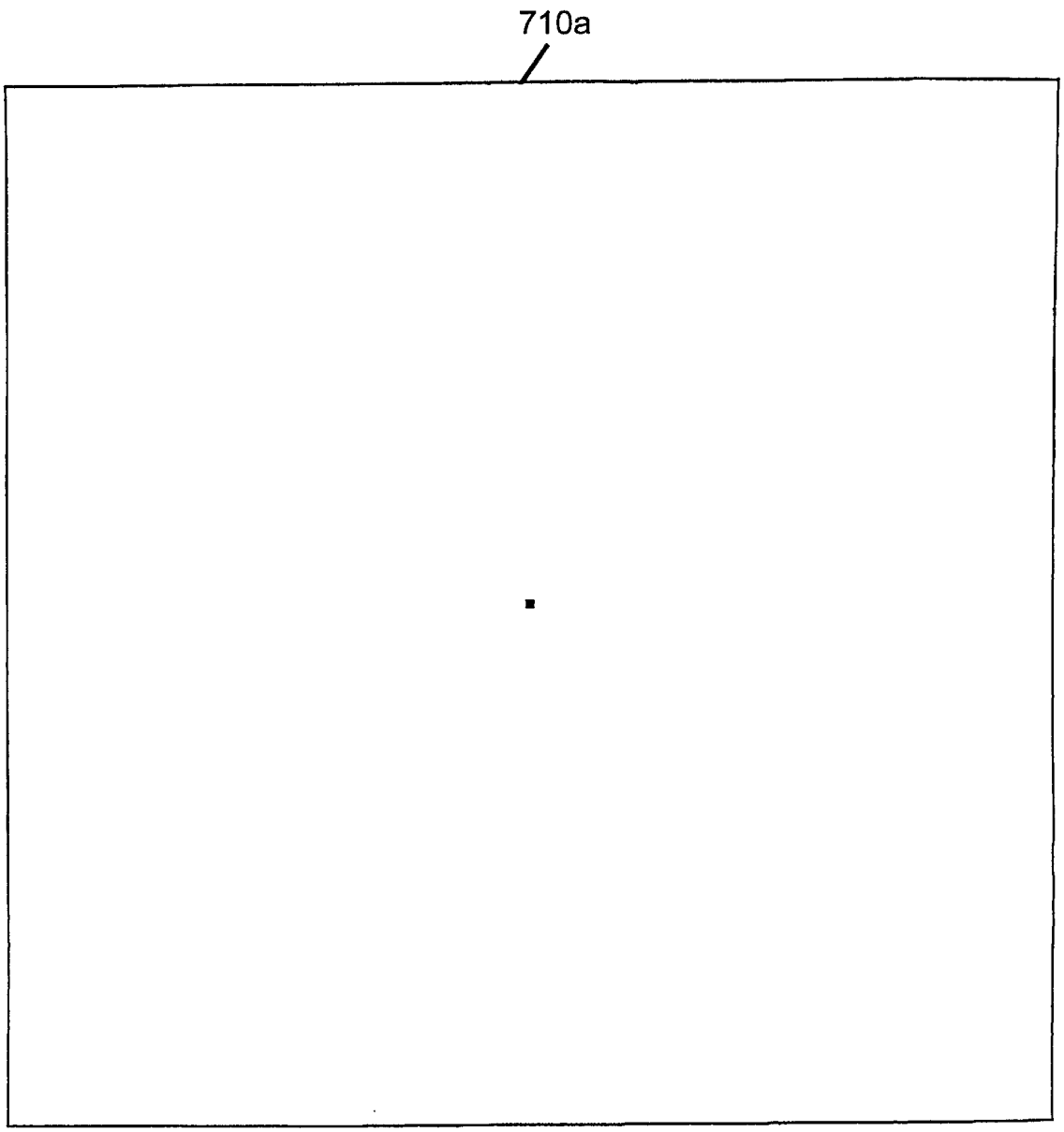
FIGS. 32A, 32B, 32C, 32D, 32E and 32F illustrate the output of the coarse placer optimization process of the present invention for a ripple carry adder circuit through different passes of the optimization process and having unconstrained input/output placement.
Figure 32B:
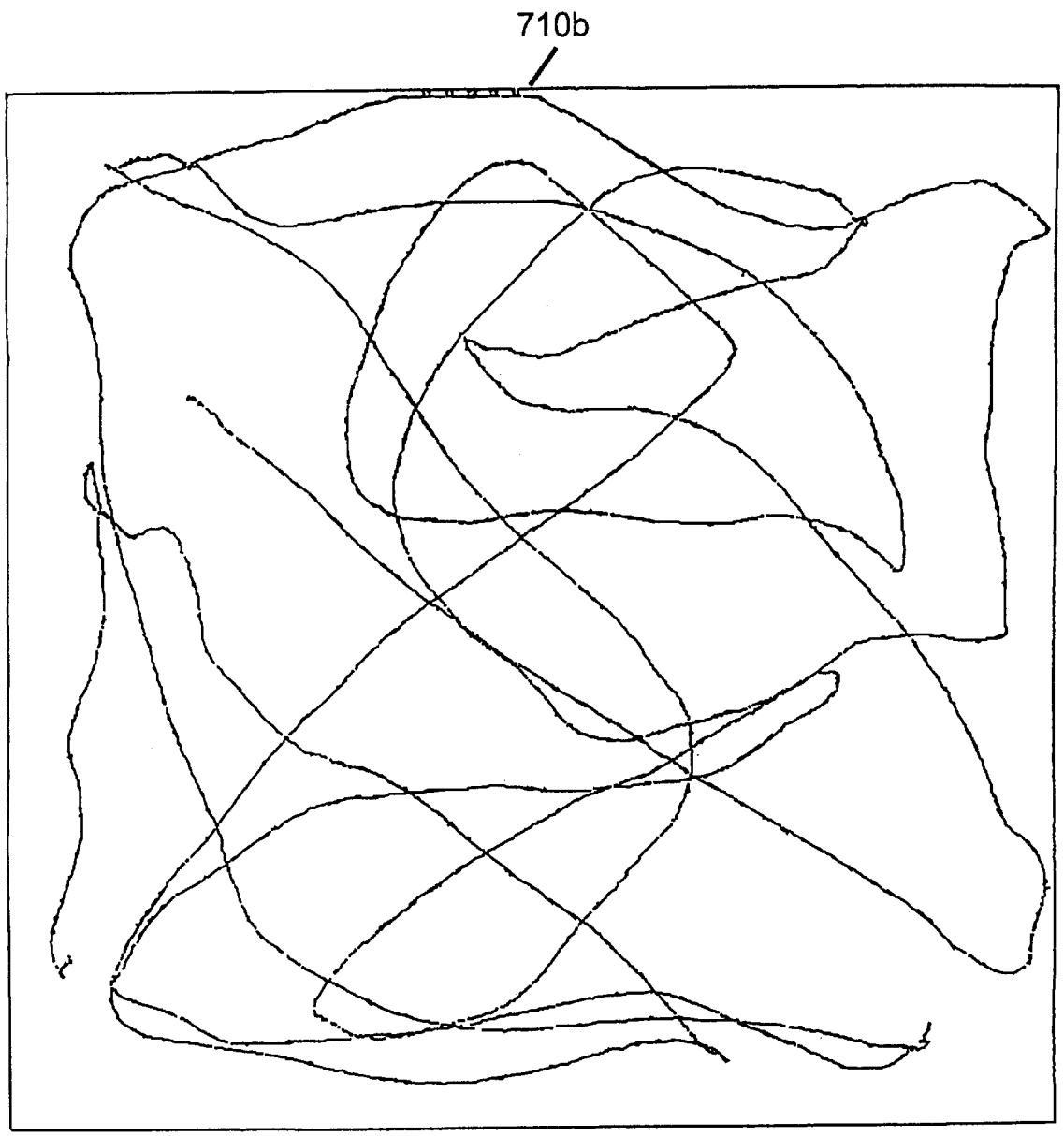
Figure 32C:
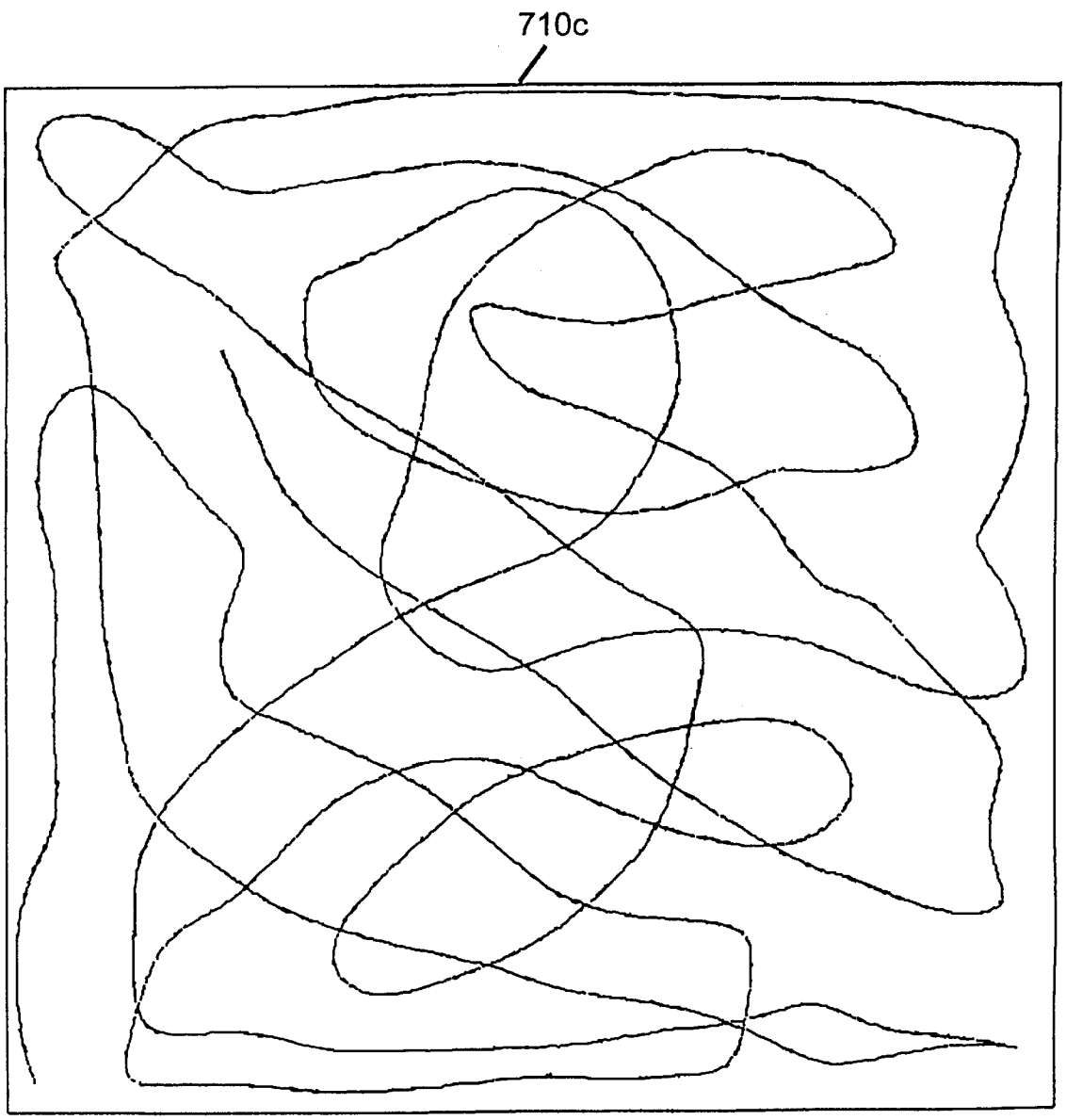
Figure 32D:
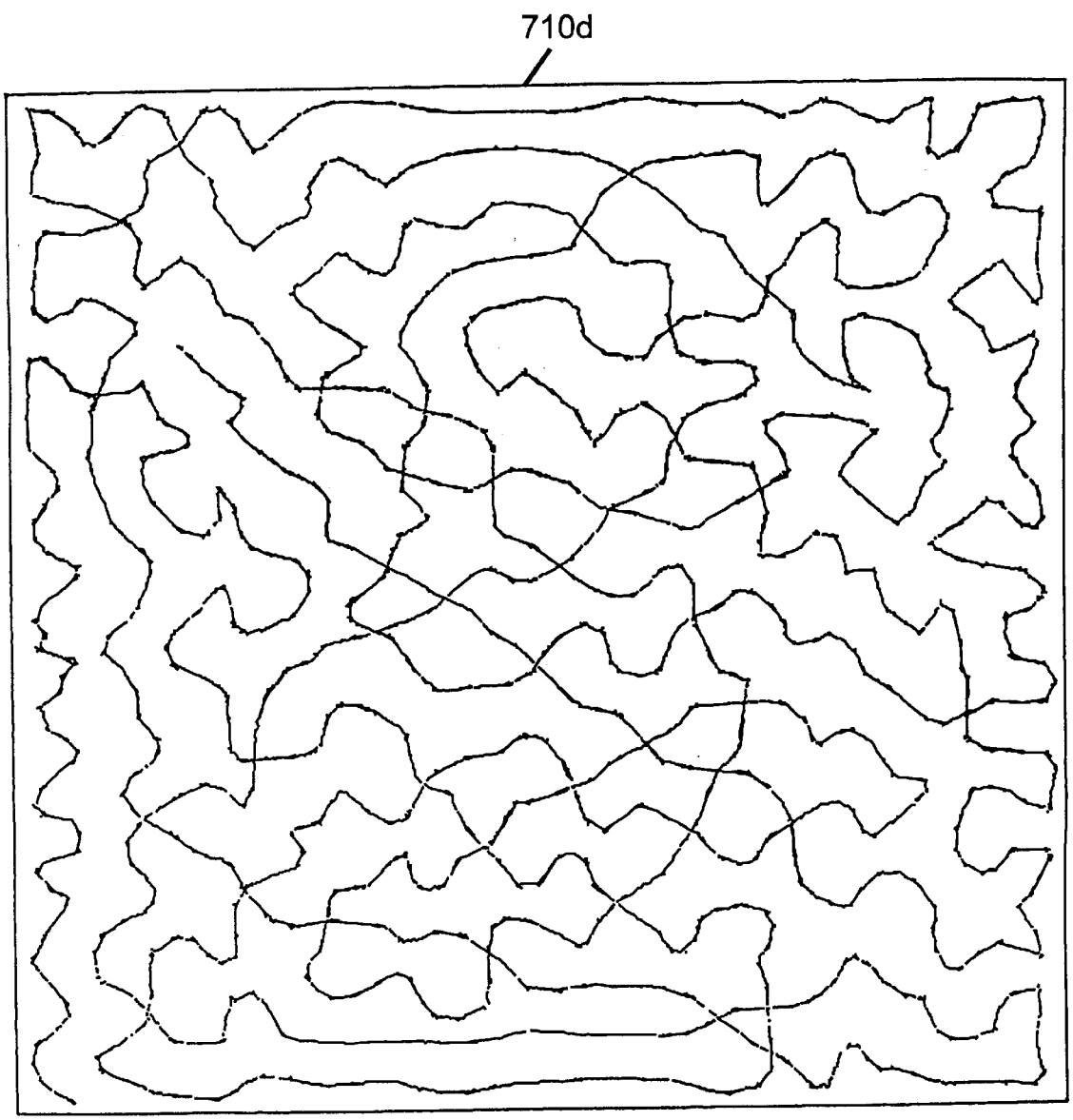
Figure 32E:
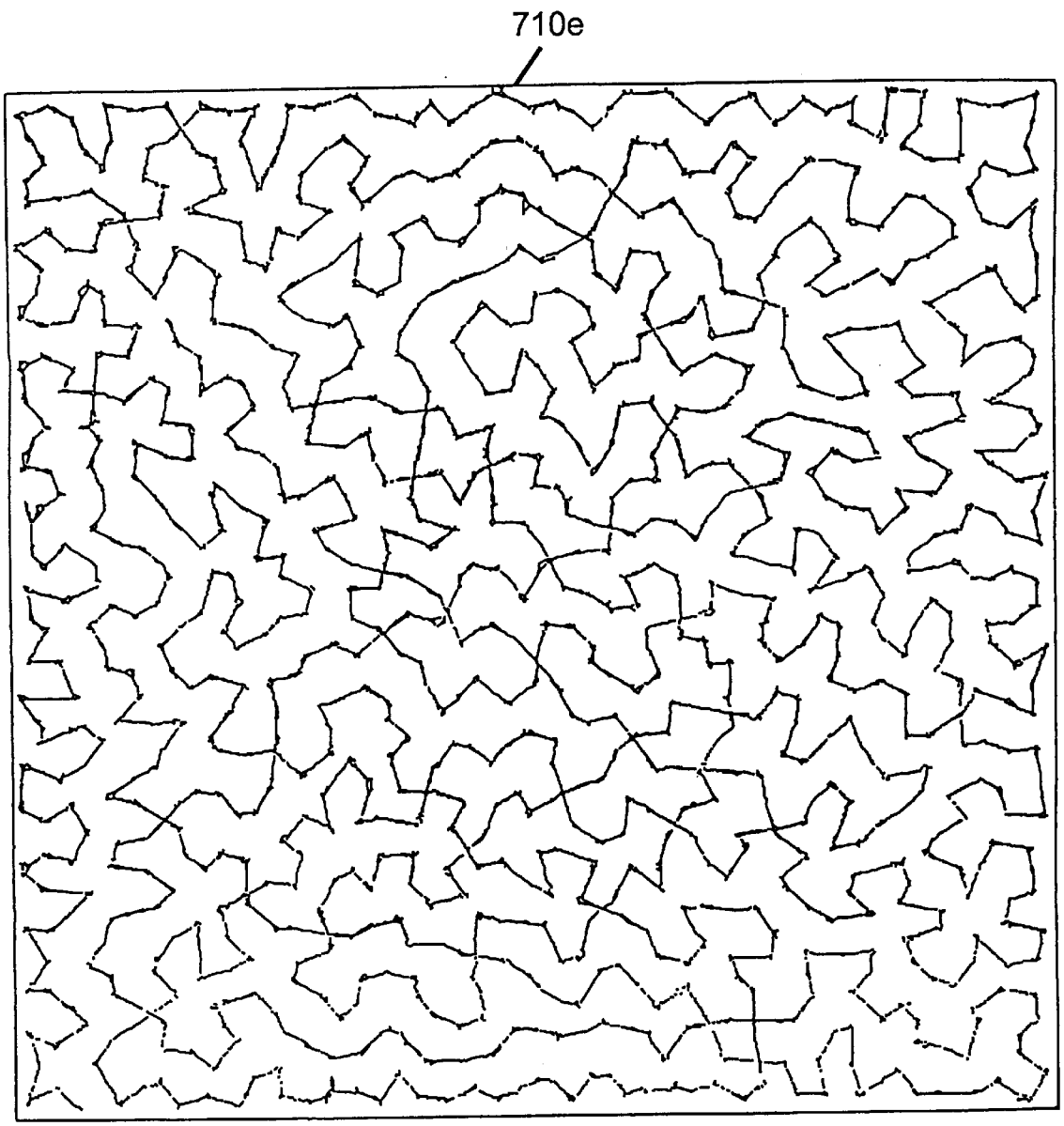
Figure 32F:
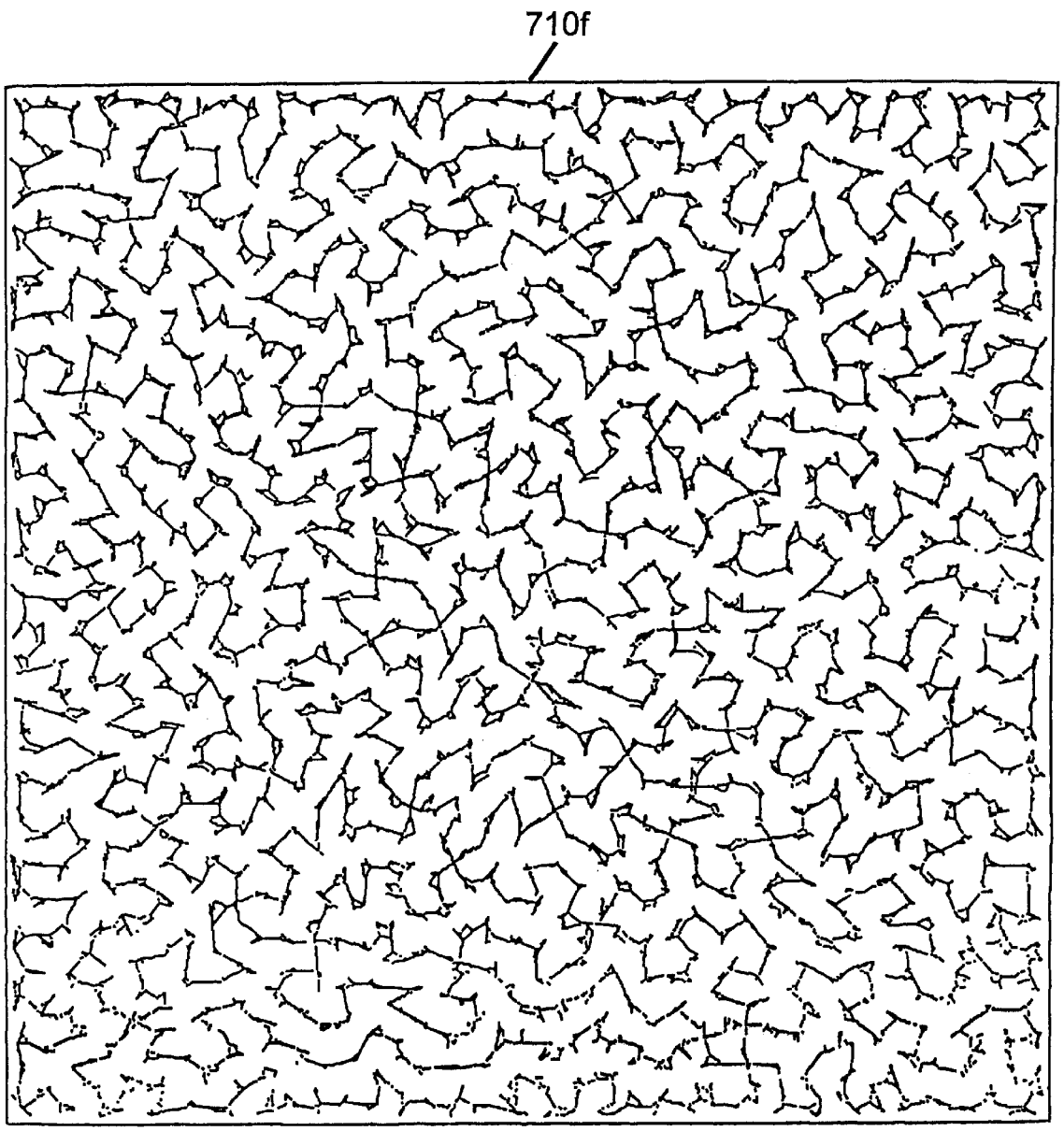

FIGS. 32A, 32B, 32C, 32D, 32E and 32F illustrate the output of the coarse placer optimization process of the present invention for a ripple carry adder circuit through different passes of the optimization process. In this example, the input/output port placement are unconstrained. FIG. 32A illustrates the starting point placement 710a of the coarse placer optimization process 300 for the exemplary netlist design of the ripple carry adder having 1000 bits. The exemplary input netlist includes cells that are randomly or arbitrarily placed initially. In the example placement 710a of FIG. 32A, the cells are initially placed in the center, as shown by the small dot. The exemplary netlist was processed through the placer 300 of the present invention and output placements 710b–710f are shown in FIGS. 32B–32F, respectively. Each pass of the optimizer 300 utilizes a different alpha smoothing value. The cells are very equally distributed within the placement 710f of FIG. 32F. It is appreciated that the carry chain meanders around the chip area and crosses only a very few times for a near optimal solution.

Figure 33:
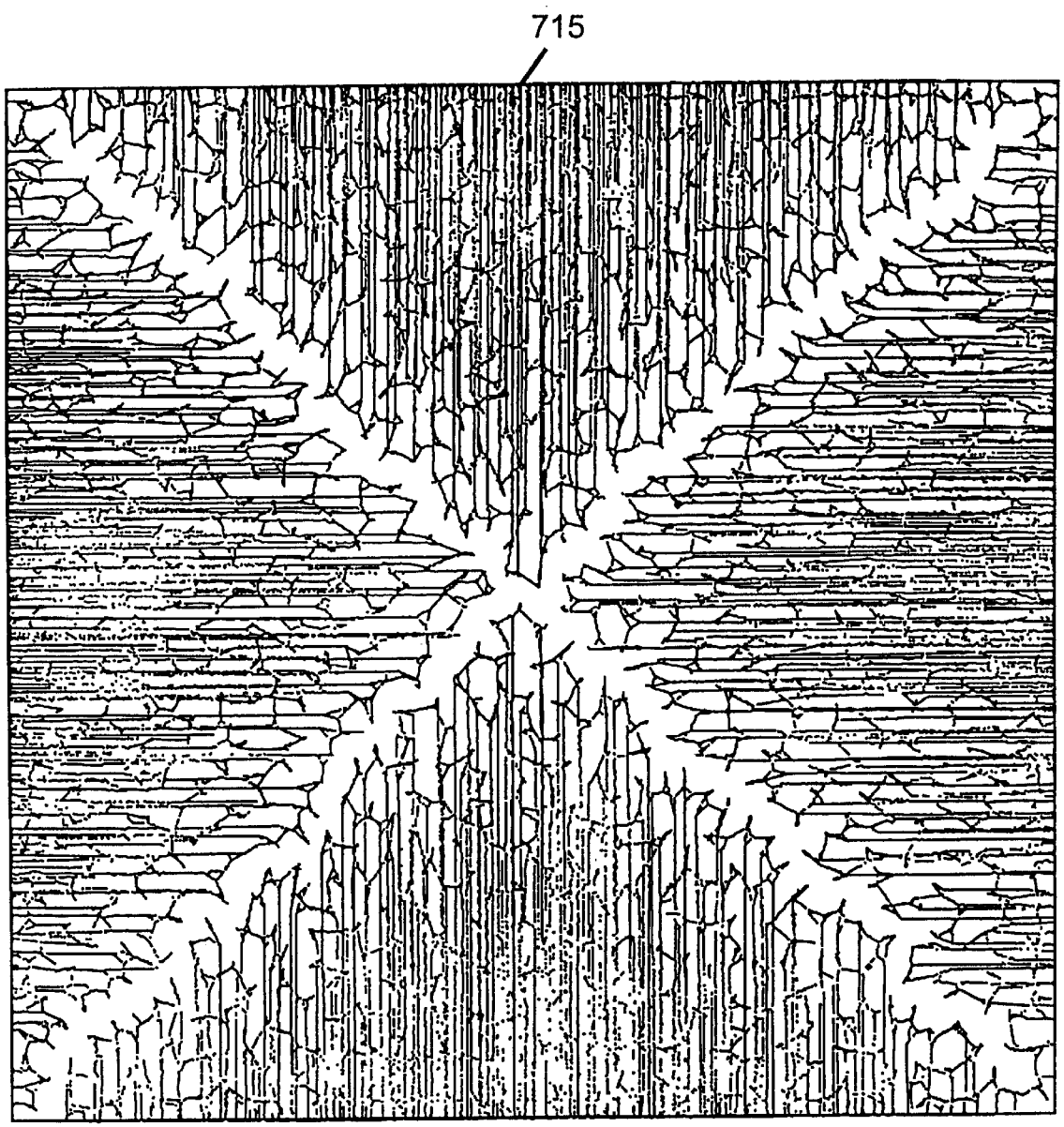
FIG. 33 illustrates the output of the coarse placer optimization process of the present invention for a ripple carry adder circuit through having constrained input/output placement.

FIG. 33 illustrates the output of the coarse placer optimization process 300 of the present invention for a 1000-bit ripple carry adder circuit but having constrained input/output placements. The result after several placement passes is shown as placement 715 in FIG. 33. The inputs and inputs are placed along the edge of the placement 715.

Conclusion

The preferred embodiment of the present invention, a non-linear optimization system for automatic electronic circuit placement, is thus described. While the present invention has been described in particular embodiments, it should be appreciated that the present invention should not be construed as limited by such embodiments, but rather construed according to the below claims.

What is claimed is:

1. A method of placing cells within a netlist, said method comprising the steps of:

a) receiving a netlist describing a circuit to be fabricated on a substrate within a chip area, said netlist comprising a plurality of cells having an initial cell placement and having wire connections between said plurality of cells; and b) determining a cell placement of said plurality of cells using iterations of a non-linear optimization process including an objective function that is differentiable and continuous but is not quadratic in terms of wire length of said wire connections, said objective function including a delay objective function for measuring the worst path signal delay through said netlist in terms of each cell placement and including a wire length objective function for minimizing said wire length of said wire connections, wherein said non-linear optimization process utilizes the conjugate-gradient.

2. A method as described in claim 1 wherein said non-linear optimization process comprises the steps of:

b1) smoothing said objective function according to a variable, alpha, to produce a smoothed function;

b2) computing a negative gradient of said smoothed function;

b3) searching, from a starting point, along said smoothed function in a direction of said negative gradient to determine a current solution;

b4) revising said variable alpha; and b5) repeating steps b1) through b4) a number of times and returning a solution wherein said starting point of step b3), for each respective iteration of step b3), is a solution determined in a last iteration of step b3).

3. A method as described in claim 2 wherein said delay objective function is based on wire parameters that include half-perimeter wire length computations involving a log_sum_exp( ) function that is smoothed based on said smoothing variable, alpha.

4. A method as described in claim 2 wherein said step b2) is computed based on a reverse breadth-first traversal through said netlist computing partial derivatives of said delay objective function with respect to individual cells.

5. A method as described in claim 1 wherein said delay objective function is calculated by a forward breadth-first static timing calculation through said netlist.

6. A method as described in claim 1 wherein said delay objective function includes stage delay computations that are based on wire capacitance and wire resistance, said wire capacitance being based on half-perimeter wire length computations and said wire resistance being based on manhattan distance wire length computations.

7. A method as described in claim 1 wherein said delay objective function includes stage delay computations that are based on Elmore-Rubenstein-Penfield (ERP).

8. A method as described in claim 1 wherein said delay objective function includes stage delay computations that are based on Asymptotic Waveform Expansion (AWE).

9. A method as described in claim 1 wherein said delay objective function includes stage delay computations and further comprising the step of performing automatic cell sizing by basing said stage delay computations on cell sizing within said delay objective function.

10. A method as described in claim 1 wherein said delay objective function includes stage delay computations and further comprising the step of approximating the effects of automatic buffer insertion within said stage delay computations to reduce said worst path signal delay.

11. A method as described in claim 1 further comprising the step of deriving said worst path signal delay using automatic buffer insertion, and wherein said step of deriving said worst path signal delay using automatic buffer insertion is approximated using the equation:

$$delay(x) = \begin{cases} \text{if } (0 \leq x \leq T) \text{ then,} & (ax^2 + bx + c) \\ \text{if } (x \geq T) \text{ then,} & (dx + e) \end{cases}$$

where T is a threshold delay value and a, b, c, d and e are constants.

12. A method as described in claim 1 further comprising the step of computing delay estimates through a gate structure using buffer tree rebalancing and wherein said delay estimates are used in said delay objective function.

13. A method as described in claim 12 wherein buffer tree rebalancing is modeled by the tree-depth relationship:

$$1 = \sum_i (1/(2^{(di/T)}))$$

where di is the delay from input to output and where the summation is performed over all outputs, i.

14. A method as described in claim 12 wherein said buffer tree rebalancing is modeled by additional variables associated with the wire to be buffered and a forward traversal is used.

15. A method as described in claim 12 wherein stage delay to the output, di, of said buffer tree rebalancing is modeled using equation:

$$di = \frac{T}{\log(2)} \log\_sum\_exp_i \left( \frac{\log(2)}{T} \times vi \right) - vi.$$

16. A method as described in claim 12 wherein said buffer tree rebalancing is modeled using the relationship:

$$Ain = T/\log(2) \times \log\_sum\_exp_i ((\log(2)/T) \times Ai))$$

wherein Ai represents required times and i represents outputs.

17. A method as described in claim 1 wherein said delay objective function includes stage delay computations and further comprising the step of estimating the effects of timing-driven-synthesis optimizations and wherein said stage delay computations approximate said effects of timing-driven synthesis optimizations.

18. A method as described in claim 17 wherein said timing-driven synthesis optimization is modeled by the tree-depth relationship:

$$1 = \sum_i (1/(2^{(di/T)}))$$

where di is the delay from input to output and where the summation is performed over all inputs, i.

19. A method as described in claim 17 wherein said timing-driven synthesis is modeled by additional variables and a reverse traversal is used.

20. A method as described in claim 17 wherein stage delay to the output, di, of said timing-driven synthesis is modeled using equation:

$$di = \frac{T}{\log(2)} \log\_sum\_exp_i \left( \frac{\log(2)}{T} \times vi \right) - vi.$$

21. A method as described in claim 17 wherein said timing-driven synthesis optimizations are modeled using the relationship:

$$Aout = T/\log(2) \times \log\_sum\_exp_i ((\log(2)/T) \times Ai))$$

wherein Ai represents arrival times and i represents inputs.

22. A method as described in claim 1 wherein said objective function further includes a density objective function for penalizing uneven cell distributions of said cell placements.

23. A method as described in claim 22 wherein said step b), in solving said density objective function, comprises the steps of:

b1) defining a field of discrete grid points within said chip area;

b2) determining, for each cell, spatial potentials effecting grid points near each cell;

b3) determining a summed potential for each grid point of said chip area by summing the spatial potential contributions from all cells for each grid point; and b4) determining a result of said density objective function by determining an error, at each grid point, between its summed potential and an average potential.

24. A system comprising:

a processor coupled to a bus a memory coupled to said bus and wherein said memory contains instructions that when executed implement a method of placing cells within a netlist, said method comprising the steps of:

a) receiving a netlist describing a circuit to be fabricated on a substrate within a chip area, said netlist comprising a plurality of cells having an initial cell placement, an initial cell sizing and wire connections between said plurality of cells; and b) determining an optimized cell placement and cell sizing of said cells of said netlist using iterations of a non-linear optimization process that performs simultaneous cell placement and cell sizing wherein said non-linear optimization process minimizes an objective function that is differentiable and continuous but is not quadratic in terms of wire lengths of said wire interconnections, said objective function including a wire length objective function and a delay objective function having terms defined with respect to cell placement and cell sizing.

25. A system as described in claim 24 wherein said non-linear optimization process comprises the steps of:

b1) smoothing said objective function according to a variable, alpha, to produce a smoothed function;

b2) computing a negative gradient of said smoothed function;

b3) searching, from a prior solution, along said smoothed function in a direction of said negative gradient to determine a current solution;

b4) revising said variable alpha; and b5) repeating steps b1) through b4) a number of times to arrive at a solution.

26. A system as described in claim 25 wherein cell size is an exponential transform of an associated variable which is given by the relationship:

$$\text{size}(i) = e^{v(i)}.$$

27. A system as described in claim 25 wherein said delay objective function is calculated by a forward breadth-first static timing calculation through said netlist.

28. A system as described in claim 25 wherein said delay objective function is based on wire parameters that include half-perimeter wire length computations involving a log_sum_exp( ) function that is smoothed based on said smoothing variable, alpha.

29. A system as described in claim 25 wherein said delay objective function includes stage delay computations that are based on wire capacitance and wire resistance, said wire capacitance being based on half-perimeter wire length computations and said wire resistance being based on manhattan distance wire length computations.

* * * * *